(12) United States Patent
Lablans

(10) Patent No.: US 10,515,567 B2
(45) Date of Patent: Dec. 24, 2019

(54) CRYPTOGRAPHIC MACHINES WITH N-STATE LAB-TRANSFORMED SWITCHING DEVICES

(71) Applicant: Peter Lablans, Morris Township, NJ (US)

(72) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 276 days.

(21) Appl. No.: 15/442,556

(22) Filed: Feb. 24, 2017

(65) Prior Publication Data

US 2017/0169735 A1    Jun. 15, 2017

Related U.S. Application Data

(63) Continuation-in-part of application No. 15/244,985, filed on Aug. 23, 2016, which is a
(Continued)

(51) Int. Cl.
*H04L 9/08*        (2006.01)
*G09C 1/00*        (2006.01)
(Continued)

(52) U.S. Cl.
CPC ............... *G09C 1/00* (2013.01); *G06F 5/012* (2013.01); *G06F 7/4876* (2013.01); *G06F 7/724* (2013.01);
(Continued)

(58) Field of Classification Search
CPC . G09C 1/00; G06F 5/012; G06F 7/724; G06F 7/4876; G06Q 20/34; G06Q 20/401;
(Continued)

(56) References Cited

U.S. PATENT DOCUMENTS 5,854,759 A * 12/1998 Kaliski, Jr. ............. G06F 7/724
                                                        708/492
6,278,780 B1 * 8/2001 Shimada ............... H04L 9/0668
                                                        380/223
(Continued)

OTHER PUBLICATIONS

FIPS PUB 180-4—Secure Hash Standard (SHS), Aug. 2015, 31 pages, Information Technology Laboratory National Institute of Standards and Technology,Gaithersburg, MD 20899-890.
(Continued)

*Primary Examiner* — Khoi V Le

(57) ABSTRACT

N-state switching tables are transformed by a Lab-transform into a Lab-transformed n-state switching table. Memory devices, processors and combinational circuits with inputs and an output are characterized by the Lab-transformed n-state switching table and perform switching operations between physical states in accordance with a Lab-transformed n-state switching table. The devices characterized by Lab-transformed n-state switching tables are applied in cryptographic devices. The cryptographic devices perform standard cryptographic operations that are modified in accordance with a Lab-transform.

20 Claims, 30 Drawing Sheets

Related U.S. Application Data continuation-in-part of application No. 14/975,841, filed on Dec. 20, 2015, now abandoned, which is a continuation-in-part of application No. 14/622,860, filed on Feb. 14, 2015, now Pat. No. 9,218,158, which is a continuation of application No. 14/064,089, filed on Oct. 25, 2013, now abandoned, which is a continuation-in-part of application No. 12/980,504, filed on Dec. 29, 2010, now Pat. No. 8,577,026, application No. 15/442,556, which is a continuation-in-part of application No. 15/244,985, filed on Aug. 23, 2016, and a continuation-in-part of application No. 14/975,841, filed on Dec. 20, 2015, now abandoned, which is a continuation-in-part of application No. 14/622,860, filed on Feb. 14, 2015, now Pat. No. 9,218,158, which is a continuation of application No. 14/064,089, filed on Oct. 25, 2013, application No. 15/422,556, which is a continuation-in-part of application No. 14/752,997, filed on Jun. 28, 2015, now abandoned, which is a continuation-in-part of application No. 14/324,217, filed on Jul. 6, 2014, now Pat. No. 9,100,166, which is a continuation of application No. 13/118,767, filed on May 31, 2011, now Pat. No. 8,817,928.

(60) Provisional application No. 62/455,555, filed on Feb. 6, 2017, provisional application No. 62/435,814, filed on Dec. 18, 2016, provisional application No. 62/209,331, filed on Aug. 24, 2015, provisional application No. 62/299,935, filed on Feb. 25, 2016, provisional application No. 61/350,247, filed on Jun. 1, 2010.

(51) Int. Cl.
| | | |
|---|---|---|
| *H04L 9/30* | (2006.01) | |
| *H04L 9/06* | (2006.01) | |
| *G06F 5/01* | (2006.01) | |
| *G06F 7/487* | (2006.01) | |
| *G06F 7/72* | (2006.01) | |
| *H03M 7/00* | (2006.01) | |
| *G06Q 20/40* | (2012.01) | |
| *H04L 9/14* | (2006.01) | |
| *H03M 13/11* | (2006.01) | |
| *H03M 13/15* | (2006.01) | |
| *H03M 13/23* | (2006.01) | |

(52) U.S. Cl.
CPC ........ *G06Q 20/40975* (2013.01); *H03M 7/00* (2013.01); *H04L 9/0643* (2013.01); *H04L 9/0841* (2013.01); *H04L 9/14* (2013.01); *H04L 9/302* (2013.01); *H04L 9/3013* (2013.01); *H04L 9/3066* (2013.01); *H03M 13/1102* (2013.01); *H03M 13/1515* (2013.01); *H03M 13/23* (2013.01); *H04L 2209/12* (2013.01)

(58) Field of Classification Search
CPC .... H03M 7/00; H03M 13/1102; H03M 13/23; H03M 13/1515; H04L 9/06; H04L 9/30; H04L 9/0625; H04L 9/0631; H04L 9/3066; H04L 9/0643; H04L 2209/12
See application file for complete search history.

(56) References Cited

U.S. PATENT DOCUMENTS

| | | | |
|---|---|---|---|
| 6,343,305 B1* | 1/2002 | Koc | G06F 7/724 708/492 |
| 6,829,355 B2 | 12/2004 | Lilly | |
| 9,379,891 B2 | 8/2016 | Yoon et al. | |
| 2005/0002523 A1* | 1/2005 | Sonnekalb | H04L 9/003 380/28 |
| 2005/0074120 A1* | 4/2005 | Vidakovic | H04K 1/00 380/255 |
| 2008/0075278 A1* | 3/2008 | Gaubatz | G09C 1/00 380/30 |
| 2009/0092250 A1* | 4/2009 | Lablans | G06F 7/582 380/255 |
| 2009/0168745 A1* | 7/2009 | Ahmadi | H04L 27/2613 370/350 |
| 2009/0285326 A1* | 11/2009 | Lablans | H04J 13/105 375/286 |
| 2010/0057823 A1 | 3/2010 | Filseth et al. | |
| 2012/0284533 A1 | 11/2012 | Assche et al. | |
| 2014/0195782 A1 | 7/2014 | Yap et al. | |

OTHER PUBLICATIONS

Barreto et al.; Whirlwind: a new cryptographic hash function, Des. Codes Cryptogr. (2010) 56:141-162;Apr. 16, 2010, published on-line.
FIPS PUB 202—SHA-3 Standard: Permutation-Based Hash and Extendable-Output Functions, Aug. 2015, 29 pages, Information Technology Laboratory National Institute of Standards.
Bertoni et al. ; Cryptographic sponge functions, version .1, Jan. 14, 2011, 93 pages, published on-line.
FIPS PUB 180-2, Secure Hash Standard (with Change Notice 1), Feb. 25, 2004, 79 pages; Information Technology Laboratory National Institute of Standards and Technology.
NIST SP 800-67, Revision 1, Recommendation for the Triple Data Encryption Algorithm (TDEA) Block Cipher, 2012, Gaithersburg, MD 20899-8930.
FIPS PUB 46-3 Data Encryption Standard (DES), 1999, NIST Gaithersburg, MD 20899-8930.
FIPS PUB 186-4 Digital Signature Standard (DSS), 2015, NIST Gaithersburg, MD 20899-8930.
FIPS PUB 197—Advanced Encryption Standard, (AES), 2001, NIST Gaithersburg, MD 20899-8930.
FIPS PUB 198-1, The Keyed-Hash Message Authentication Code (HMAC), 2008, NIST Gaithersburg, MD 20899-8930.
RSA Laboratories PKCS #1 v2.2: RSA Cryptography Standard, Oct. 27, 2012.
RSA Laboratories PKCS#3: Diffie-Hellman Key Agreement Standard Revised Nov. 1, 1993.
The Elliptic Curve Digital Signature Algorithm (ECDSA), Johnson et al. 2001, Certicom Corporation 2001.
Standards for Efficient Cryptography SEC 1: Elliptic Curve Cryptography, version 2, Certicom Research, 2009.
OpenPGP Message Format, Memo, Callas et al., 2007, RFC4880, downloaded from https://tools.ietf.org/html/rfc4880.
Fast Software Exponentiation in GF(2k), C.Koc and T.Acar, Proceedings, 13th Symposium on Computer Arithmetic, T. Lang, J.-M. Muller, and N. Takagi, editors, pp. 225-231.
Efficient Finite Field Computations for Elliptic Curve Cryptography, Wangchen Dai, University of Windsor, Ontario, Canada, 2013.
Claude Shannon. A Symbolic Analysis of Relay and Switching Circuits Massachusetts Institute of Technology 1940.
Neal Wagner website URLhttp://www.cs.utsa.edu/~wagner/laws/FFM.html 2001.
Bernhard Linke the Fundamentals of an ECDSA Authentication System Maxim Integrated, May 16, 2014.

* cited by examiner

```
>> sc8i-1 ans =

```
>> m8i-1 ans =

```
1    % make aGF(8)
2    inv8=[2 3 4 5 6 7 0 1]+1; % the 8-state inverter
3    % make the reversing inverter rinv8
4    rinv8=zeros(1,8); % initialise
5    sc8i=zeros(8,8);
6    m8i=zeros(8,8);
7    % make rinv8
8    for k=1:8
9        ind=inv8(k);
10       rinv8(ind)=k;
11   end
12   % modify sc8 and m8
13   for i1=1:8
14       for i2=1:8
15           ix=inv8(i1);
16           iy=inv8(i2);
17           aa=sc8(ix,iy);
18           sc8i(i1,i2)=rinv8(aa);
19           bb=m8(ix,iy);
20           m8i(i1,i2)=rinv8(bb);
21       end
22   end
23   % display sc8i and m8i in origin 0
24   sc8i-1
25   m8i-1
```

|   |   |   |   |     |          |   |
|---|---|---|---|-----|----------|---|
| 0 | 0 | 0 | 1 | 1:  |          | 1 |
| 1 | 0 | 0 | 1 | 2:  | x3+      | 1 |
| 1 | 1 | 0 | 1 | 3:  | x3+x2+   | 1 |
| 1 | 1 | 1 | 1 | 4:  | x3+x2+x+1|   |
| 1 | 1 | 1 | 0 | 5:  |          |   |
| 0 | 1 | 1 | 1 | 6.  |          |   |
| 1 | 0 | 1 | 0 | .   |          |   |
| 0 | 1 | 0 | 1 | .   |          |   |
| 1 | 0 | 1 | 1 | .   |          |   |
| 1 | 1 | 0 | 0 | .   |          |   |
| 0 | 1 | 1 | 0 | .   |          |   |
| 0 | 0 | 1 | 1 | .   |          |   |
| 1 | 0 | 0 | 0 | .   |          |   |
| 0 | 1 | 0 | 0 | .   |          |   |
| 0 | 0 | 1 | 0 | 15: | x        |   |
| 0 | 0 | 0 | 1 | 16. |          |   |

FIG. 8

```
>> sc16-1
ans =
     0    1    2    3    4    5    6    7    8    9   10   11   12   13   14   15
     1    0   13   10    5    4   11    9   14    7    3    6   15    2    8   12
     2   13    0   14   11    6    5   12   10   15    8    4    7    1    3    9
     3   10   14    0   15   12    7    6   13   11    1    9    5    8    2    4
     4    5   11   15    0    1   13    8    7   14   12    2   10    6    9    3
     5    4    6   12    1    0    2   14    9    8   15   13    3   11    7   10
     6   11    5    7   13    2    0    3   15   10    9    1   14    8   12    8
     7    9   12    6    8   14    3    0    4    1   11   10    2   15    5   13
     8   14   10   13    7    9   15    4    0    5    2   12   11    3    1    6
     9    7   15   11   14    8   10    1    5    0    6    3   13   12    4    2
    10    3    8    1   12   15    9   11    2    6    0    7    4   14   13    5
    11    6    4    9    2   13    1   10   12    3    7    0    8    5   15   14
    12   15    7    5   10    3   14    2   11   13    4    8    0    9    6    1
    13    2    1    8    6   11    4   15    3   12   14    5    9    0   10    7
    14    8    3    2    9    7   12    5    1    4   13   15    6   10    0   11
    15   12    9    4    3   10    8   13    6    2    5   14    1    7   11    0
```

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 1 | 2 | 3 | 4 | 5 | 6 | 7 | 8 | 9 | 10 | 11 | 12 | 13 | 14 | 15 |
| 0 | 2 | 3 | 4 | 5 | 6 | 7 | 8 | 9 | 10 | 11 | 12 | 13 | 14 | 15 | 1 |
| 0 | 3 | 4 | 5 | 6 | 7 | 8 | 9 | 10 | 11 | 12 | 13 | 14 | 15 | 1 | 2 |
| 0 | 4 | 5 | 6 | 7 | 8 | 9 | 10 | 11 | 12 | 13 | 14 | 15 | 1 | 2 | 3 |
| 0 | 5 | 6 | 7 | 8 | 9 | 10 | 11 | 12 | 13 | 14 | 15 | 1 | 2 | 3 | 4 |
| 0 | 6 | 7 | 8 | 9 | 10 | 11 | 12 | 13 | 14 | 15 | 1 | 2 | 3 | 4 | 5 |
| 0 | 7 | 8 | 9 | 10 | 11 | 12 | 13 | 14 | 15 | 1 | 2 | 3 | 4 | 5 | 6 |
| 0 | 8 | 9 | 10 | 11 | 12 | 13 | 14 | 15 | 1 | 2 | 3 | 4 | 5 | 6 | 7 |
| 0 | 9 | 10 | 11 | 12 | 13 | 14 | 15 | 1 | 2 | 3 | 4 | 5 | 6 | 7 | 8 |
| 0 | 10 | 11 | 12 | 13 | 14 | 15 | 1 | 2 | 3 | 4 | 5 | 6 | 7 | 8 | 9 |
| 0 | 11 | 12 | 13 | 14 | 15 | 1 | 2 | 3 | 4 | 5 | 6 | 7 | 8 | 9 | 10 |
| 0 | 12 | 13 | 14 | 15 | 1 | 2 | 3 | 4 | 5 | 6 | 7 | 8 | 9 | 10 | 11 |
| 0 | 13 | 14 | 15 | 1 | 2 | 3 | 4 | 5 | 6 | 7 | 8 | 9 | 10 | 11 | 12 |
| 0 | 14 | 15 | 1 | 2 | 3 | 4 | 5 | 6 | 7 | 8 | 9 | 10 | 11 | 12 | 13 |
| 0 | 15 | 1 | 2 | 3 | 4 | 5 | 6 | 7 | 8 | 9 | 10 | 11 | 12 | 13 | 14 |

```
26    % determine m16
27 -  m16=zeros(16,16);
28 -  for i1=1:15
29 -      for k=1:15
30 -          m16(i1+1,k+1)=mod(((i1+k-1),16)+(((i1+k-1)>=16)*1));
31 -      end
32 -  end
```

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 3 | 2 | 5 | 4 | 7 | 6 | 9 | 8 | 11 | 10 | 13 | 12 | 15 | 14 |
| 2 | 3 | 0 | 1 | 6 | 7 | 4 | 5 | 10 | 11 | 8 | 9 | 14 | 15 | 12 | 13 |
| 3 | 2 | 1 | 0 | 7 | 6 | 5 | 4 | 11 | 10 | 9 | 8 | 15 | 14 | 13 | 12 |
| 4 | 5 | 6 | 7 | 0 | 1 | 2 | 3 | 12 | 13 | 14 | 15 | 8 | 9 | 10 | 11 |
| 5 | 4 | 7 | 6 | 1 | 0 | 3 | 2 | 13 | 12 | 15 | 14 | 9 | 8 | 11 | 10 |
| 6 | 7 | 4 | 5 | 2 | 3 | 0 | 1 | 14 | 15 | 12 | 13 | 10 | 11 | 8 | 9 |
| 7 | 6 | 5 | 4 | 3 | 2 | 1 | 0 | 15 | 14 | 13 | 12 | 11 | 10 | 9 | 8 |
| 8 | 9 | 10 | 11 | 12 | 13 | 14 | 15 | 0 | 1 | 2 | 3 | 4 | 5 | 6 | 7 |
| 9 | 8 | 11 | 10 | 13 | 12 | 15 | 14 | 1 | 0 | 3 | 2 | 5 | 4 | 7 | 6 |
| 10 | 11 | 8 | 9 | 14 | 15 | 12 | 13 | 2 | 3 | 0 | 1 | 6 | 7 | 4 | 5 |
| 11 | 10 | 9 | 8 | 15 | 14 | 13 | 12 | 3 | 2 | 1 | 0 | 7 | 6 | 5 | 4 |
| 12 | 13 | 14 | 15 | 8 | 9 | 10 | 11 | 4 | 5 | 6 | 7 | 0 | 1 | 2 | 3 |
| 13 | 12 | 15 | 14 | 9 | 8 | 11 | 10 | 5 | 4 | 7 | 6 | 1 | 0 | 3 | 2 |
| 14 | 15 | 12 | 13 | 10 | 11 | 8 | 9 | 6 | 7 | 4 | 5 | 2 | 3 | 0 | 1 |
| 15 | 14 | 13 | 12 | 11 | 10 | 9 | 8 | 7 | 6 | 5 | 4 | 3 | 2 | 1 | 0 |

| x | y |  | x1 + y1 |  |
|---|---|---|---|---|
| 5 | 2 | 0 | 6 | 0 |
| 12 | 4 | 0 | 6 | 0 |
| 11 | 13 | 0 | 6 | 3 |
| 2 | 9 | 0 | 6 | 4 |
| 8 | 16 | 0 | 6 | 5 |
| 7 | 5 | 0 | 6 | 6 |
| 14 | 2 | 0 | 6 | 7 |
| 1 | 2 | 0 | 6 | 8 |
| 14 | 3 | 0 | 6 | 9 |
| 7 | 14 | 0 | 6 | 10 |
| 8 | 14 | 0 | 6 | 11 |
| 2 | 15 | 0 | 6 | 12 |
| 11 | 5 | 0 | 6 | 13 |
| 12 | 10 | 0 | 6 | 14 |
| 5 | 6 | 0 | 6 | 15 |

| P = x | y |   | 2P=x1 | +y1 | 1500 |
|---|---|---|---|---|---|
| 1 | 2 | 1 | 1 | 1 | 1 |
| 5 | 2 | 1 | 12 | 4 | 2 |
| 14 | 2 | 1 | 12 | 10 | 3 |
| 14 | 3 | 1 | 12 | 4 | 4 |
| 12 | 4 | 1 | 2 | 9 | 5 |
| 7 | 5 | 1 | 2 | 15 | 6 |
| 11 | 5 | 1 | 7 | 14 | 7 |
| 5 | 6 | 1 | 12 | 10 | 8 |
| 2 | 9 | 1 | 1 | 2 | 9 |
| 12 | 10 | 1 | 2 | 15 | 10 |
| 11 | 13 | 1 | 7 | 5 | 11 |
| 7 | 14 | 1 | 2 | 9 | 12 |
| 8 | 14 | 1 | 7 | 5 | 13 |
| 2 | 15 | 1 | 1 | 2 | 14 |
| 8 | 16 | 1 | 7 | 14 | 15 |
| 0 | 0 | 0 | 0 | 0 | 0 |
| 0 | 0 | 0 | 0 | 0 | 0 |
| 0 | 0 | 0 | 0 | 0 | 0 |

FIG. 15

```
36    % make multiplicative inverse of m16: minv16
37 -  minv16=zeros(1,16);
38 -  minv16(1:2)=[1 2];
39 -  for i=3:16
40 -      minv16(i)=16-i+3;
41 -  end
```

```
moup(:,:,8) =
```

| | | | | | | | |
|---|---|---|---|---|---|---|---|
| base point P → 5 | 6 | 0 | 0 | 0 | 0 | 0 | 0 |
| 2P → 12 | 10 | 0 | 0 | 0 | 0 | 0 | 0 |
| 2P+P → 11 | 5 | 0 | 2 | 3 | 11 | 5 | 0 |
| 2 | 15 | 0 | 2 | 4 | 2 | 15 | 0 |
| 8 | 14 | 0 | 2 | 5 | 8 | 14 | 0 |
| 7 | 14 | 0 | 2 | 6 | 7 | 14 | 0 |
| 14 | 3 | 0 | 2 | 7 | 14 | 3 | 0 |
| 1 | 2 | 0 | 2 | 8 | 1 | 2 | 0 |
| 14 | 2 | 0 | 2 | 9 | 14 | 2 | 0 |
| 7 | 5 | 0 | 2 | 10 | 7 | 5 | 0 |
| 8 | 16 | 0 | 2 | 11 | 8 | 16 | 0 |
| 2 | 9 | 0 | 2 | 12 | 2 | 9 | 0 |
| 11 | 13 | 0 | 2 | 13 | 11 | 13 | 0 |
| 12 | 4 | 0 | 2 | 14 | 12 | 4 | 0 |
| 5 | 2 | 0 | 2 | 15 | 5 | 2 | 0 |
| 0 | 0 | 0 | 0 | 0 | 0 | 0 | 0 |

```
moup(:,:,2) =
```

| | | | | | | | |
|---|---|---|---|---|---|---|---|
| base point P → 5 | 2 | 0 | 0 | 0 | 0 | 0 | 0 |
| 2P → 12 | 4 | 0 | 0 | 0 | 0 | 0 | 0 |
| 2P+P → 11 | 13 | 0 | 6 | 3 | 11 | 13 | 0 |
| 2 | 9 | 0 | 6 | 4 | 2 | 9 | 0 |
| 8 | 16 | 0 | 6 | 5 | 8 | 16 | 0 |
| 7 | 5 | 0 | 6 | 6 | 7 | 5 | 0 |
| 14 | 2 | 0 | 6 | 7 | 14 | 2 | 0 |
| 1 | 2 | 0 | 6 | 8 | 1 | 2 | 0 |
| 14 | 3 | 0 | 6 | 9 | 14 | 3 | 0 |
| 7 | 14 | 0 | 6 | 10 | 7 | 14 | 0 |
| 8 | 14 | 0 | 6 | 11 | 8 | 14 | 0 |
| 2 | 15 | 0 | 6 | 12 | 2 | 15 | 0 |
| 11 | 5 | 0 | 6 | 13 | 11 | 5 | 0 |
| 12 | 10 | 0 | 6 | 14 | 12 | 10 | 0 |
| 5 | 6 | 0 | 6 | 15 | 5 | 6 | 0 |
| 0 | 0 | 0 | 0 | 0 | 0 | 0 | 0 |

FIG. 18 isc16                                                                                                                              1901

| 11 | 13 | 9  | 4  | 3  | 10 | 8  | 14 | 6  | 2  | 5  | 0  | 15 | 1  | 7  | 12 |
|----|----|----|----|----|----|----|----|----|----|----|----|----|----|----|----|
| 13 | 11 | 14 | 10 | 5  | 4  | 12 | 9  | 15 | 7  | 3  | 1  | 6  | 0  | 2  | 8  |
| 9  | 14 | 11 | 15 | 12 | 6  | 5  | 13 | 10 | 0  | 8  | 2  | 4  | 7  | 1  | 3  |
| 4  | 10 | 15 | 11 | 0  | 13 | 7  | 6  | 14 | 12 | 1  | 3  | 9  | 5  | 8  | 2  |
| 3  | 5  | 12 | 0  | 11 | 1  | 14 | 8  | 7  | 15 | 13 | 4  | 2  | 10 | 6  | 9  |
| 10 | 4  | 6  | 13 | 1  | 11 | 2  | 15 | 9  | 8  | 0  | 5  | 14 | 3  | 12 | 7  |
| 8  | 12 | 5  | 7  | 14 | 2  | 11 | 3  | 0  | 10 | 9  | 6  | 1  | 15 | 4  | 13 |
| 14 | 9  | 13 | 6  | 8  | 15 | 3  | 11 | 4  | 1  | 12 | 7  | 10 | 2  | 0  | 5  |
| 6  | 15 | 10 | 14 | 7  | 9  | 0  | 4  | 11 | 5  | 2  | 8  | 13 | 12 | 3  | 1  |
| 2  | 7  | 0  | 13 | 15 | 8  | 10 | 1  | 5  | 11 | 6  | 9  | 3  | 14 | 13 | 4  |
| 5  | 3  | 8  | 1  | 13 | 0  | 9  | 12 | 2  | 6  | 11 | 10 | 7  | 4  | 15 | 14 |
| 0  | 1  | 2  | 3  | 4  | 5  | 6  | 7  | 8  | 9  | 10 | 11 | 12 | 13 | 14 | 15 |
| 15 | 6  | 4  | 9  | 2  | 14 | 1  | 10 | 13 | 3  | 7  | 12 | 11 | 8  | 5  | 0  |
| 1  | 0  | 7  | 5  | 10 | 3  | 15 | 2  | 12 | 14 | 4  | 13 | 8  | 11 | 9  | 6  |
| 7  | 2  | 1  | 8  | 6  | 12 | 4  | 0  | 3  | 13 | 15 | 14 | 5  | 9  | 11 | 10 |
| 12 | 8  | 3  | 2  | 9  | 7  | 13 | 5  | 1  | 4  | 14 | 15 | 0  | 6  | 10 | 11 | im16                                                                                                                               1902

| 4  | 5  | 6  | 7  | 8  | 9  | 10 | (12) | 13 | 14 | 15 | 11 | 0  | 1  | 2  | 3  |
|----|----|----|----|----|----|----|------|----|----|----|----|----|----|----|----|
| 5  | 6  | 7  | 8  | 9  | 10 | (12)| 13  | 14 | 15 | 0  | 11 | 1  | 2  | 3  | 4  |
| 6  | 7  | 8  | 9  | 10 | (12)| 13 | 14  | 15 | 0  | 1  | 11 | 2  | 3  | 4  | 5  |
| 7  | 8  | 9  | 10 | (12)| 13 | 14 | 15  | 0  | 1  | 2  | 11 | 3  | 4  | 5  | 6  |
| 8  | 9  | 10 | (12)| 13 | 14 | 15 | 0   | 1  | 2  | 3  | 11 | 4  | 5  | 6  | 7  |
| 9  | 10 | (12)| 13 | 14 | 15 | 0  | 1   | 2  | 3  | 4  | 11 | 5  | 6  | 7  | 8  |
| 10 | (12)| 13 | 14 | 15 | 0  | 1  | 2   | 3  | 4  | 5  | 11 | 6  | 7  | 8  | 9  |
| (12)| 13 | 14 | 15 | 0  | 1  | 2  | 3   | 4  | 5  | 6  | 11 | 7  | 8  | 9  | 10 |
| 13 | 14 | 15 | 0  | 1  | 2  | 3  | 4   | 5  | 6  | 7  | 11 | 8  | 9  | 10 | (12)|
| 14 | 15 | 0  | 1  | 2  | 3  | 4  | 5   | 6  | 7  | 8  | 11 | 9  | 10 | (12)| 13 |
| 15 | 0  | 1  | 2  | 3  | 4  | 5  | 6   | 7  | 8  | 9  | 11 | 10 | (12)| 13 | 14 |
| 11 | 11 | 11 | 11 | 11 | 11 | 11 | 11  | 11 | 11 | 11 | 11 | 11 | 11 | 11 | 11 |
| 0  | 1  | 2  | 3  | 4  | 5  | 6  | 7   | 8  | 9  | 10 | 11 | (12)| 13 | 14 | 15 |
| 1  | 2  | 3  | 4  | 5  | 6  | 7  | 8   | 9  | 10 | (12)| 11 | 13 | 14 | 15 | 0  |
| 2  | 3  | 4  | 5  | 6  | 7  | 8  | 9   | 10 | (12)| 13 | 11 | 14 | 15 | 0  | 1  |
| 3  | 4  | 5  | 6  | 7  | 8  | 9  | 10  | (12)| 13 | 14 | 11 | 15 | 0  | 1  | 2  |

FIG. 19

```
16  % determine changed sc16 and m16 is im16 and isc16
17  isc16=sc16; %set format
18  im16=m16;% set format
19  for i1=1:16
20      for i2=1:16
21          k1=inv16(i1);
22          k2=inv16(i2);
23          hh1=sc16(k1,k2);
24          hh2=m16(k1,k2);
25          hr1=rinv16(hh1);
26          hr2=rinv16(hh2);
27          isc16(i1,i2)=hr1;
28          im16(i1,i2)=hr2;
29      end
30  end
```

FIG. 20

```
38    % determine multiplicative inverse munv
39 -  munv=zeros(1,16);
40 -  for i=1:16
41 -      fac=(i>=zero1);
42 -      if i==zero1
43 -          munv(i)=zero1;
44 -      elseif i==one1
45 -          munv(i)=one1;
46 -      else
47 -          gg=mod(one1-plus-i,16);
48 -          gg=(gg==0)*16+gg;
49 -          munv(i)=gg;
50 -      end
51 -  end
52 -      munv;
```

```
66    % determine points on curve in resn
67 -  for y=1:16
68 -      for x=1:16
69 -          t11=x2(y);
70 -          t12=im16(x,y);
71 -          t1=isc16(t11,t12);
72
73 -          t21=x3(x);
74 -          t221=x2(x);
75 -          t22=im16(af,t221);
76 -          t2i=isc16(t21,t22);
77 -          t2=isc16(t2i,bf);
78
79 -          pp=(t1==t2);
80 -          tond=(pp==0)*tel;
81 -          resn(tel,:)=[x y 0 t1 t2 tond pp tel];
82 -          tel=tel+pp*1;
83 -      end
84 -  end
85 -  resn
```

| x | y | | | test | |
|---|---|---|---|---|---|
| 2 | 1 | 0 | 1 | 1 | 0 |
| 7 | 2 | 0 | 1 | 2 | 0 |
| 12 | 2 | 0 | 1 | 3 | 0 |
| 1 | 3 | 0 | 1 | 4 | 0 |
| 4 | 3 | 0 | 1 | 5 | 0 |
| 5 | 3 | 0 | 1 | 6 | 0 |
| 9 | 4 | 0 | 1 | 7 | 0 |
| 13 | 4 | 0 | 1 | 8 | 0 |
| 14 | 4 | 0 | 1 | 9 | 0 |
| 16 | 5 | 0 | 1 | 10 | 0 |
| 10 | 6 | 0 | 1 | 11 | 0 |
| 14 | 6 | 0 | 1 | 12 | 0 |
| 15 | 6 | 0 | 1 | 13 | 0 |
| 10 | 9 | 0 | 1 | 14 | 0 |
| 1 | 10 | 0 | 1 | 15 | 0 |
| 13 | 10 | 0 | 1 | 16 | 0 |
| 16 | 10 | 0 | 1 | 17 | 0 |
| 5 | 13 | 0 | 1 | 18 | 0 |
| 7 | 13 | 0 | 1 | 19 | 0 |
| 15 | 13 | 0 | 1 | 20 | 0 |
| 2 | 14 | 0 | 1 | 21 | 0 |
| 9 | 15 | 0 | 1 | 22 | 0 |
| 4 | 16 | 0 | 1 | 23 | 0 |
| 16 | 16 | 0 | 0 | 24 | 24 |

```
95    % determine 2P
96  - for i=1:(tond-1)
97  - xp=resn(i,1);
98  - yp=resn(i,2);
99
100 - s11=x3(xp);
101 - s12=msumv(s11);
102 - s22=im16(s12,bf);
103 - xr=iscl6(s22,s11);
104
105 - p11=msumv(xp);
106 - p12=im16(yp,p11);
107 - p13=iscl6(xp,p12);
108 - p14=im16(p13,xr);
109 - p15=iscl6(s11,p14);
110 - yr=iscl6(p15,xr);
111 - oupn(i,:)=[xp yp resn(i,7) xr yr i];
112 - end
113 - oupn
114 - bend=i;
```

| xP | yP | | x2P | y2P | |
|---|---|---|---|---|---|
| 2 | 1 | 1 | 2 | 14 | 1 |
| 7 | 2 | 1 | 12 | 2 | 2 |
| 12 | 2 | 1 | 12 | 12 | 3 |
| 1 | 3 | 1 | 7 | 2 | 4 |
| 4 | 3 | 1 | 13 | 10 | 5 |
| 5 | 3 | 1 | 4 | 3 | 6 |
| 9 | 4 | 1 | 4 | 3 | 7 |
| 13 | 4 | 1 | 2 | 14 | 8 |
| 14 | 4 | 1 | 7 | 13 | 9 |
| 16 | 5 | 1 | 10 | 9 | 10 |
| 10 | 6 | 1 | 13 | 4 | 11 |
| 14 | 6 | 1 | 7 | 2 | 12 |
| 15 | 6 | 1 | 10 | 6 | 13 |
| 10 | 9 | 1 | 13 | 10 | 14 |
| 1 | 10 | 1 | 7 | 13 | 15 |
| 13 | 10 | 1 | 2 | 1 | 16 |
| 16 | 10 | 1 | 10 | 6 | 17 |
| 5 | 13 | 1 | 4 | 16 | 18 |
| 7 | 13 | 1 | 12 | 2 | 19 |
| 15 | 13 | 1 | 10 | 9 | 20 |
| 2 | 14 | 1 | 2 | 1 | 21 |
| 9 | 15 | 1 | 4 | 16 | 22 |
| 4 | 16 | 1 | 13 | 4 | 23 |
| 0 | 0 | 0 | 0 | 0 | 0 |

|  | x | y |  |  |  |  |  |  |
|---|---|---|---|---|---|---|---|---|
| P | 9 | 15 | 0 | 0 | 0 | 0 | 0 | 0 |
| 2P | 4 | 16 | 0 | 0 | 0 | 0 | 0 | 0 |
| 2P+P | 14 | 6 | 4 | 4 | 3 | 14 | 6 | 0 |
|  | 13 | 4 | 4 | 10 | 4 | 13 | 4 | 0 |
|  | 16 | 5 | 4 | 10 | 5 | 16 | 5 | 0 |
|  | 7 | 2 | 4 | 13 | 6 | 7 | 2 | 0 |
|  | 15 | 6 | 4 | 13 | 7 | 15 | 6 | 0 |
|  | 2 | 14 | 4 | 1 | 8 | 2 | 14 | 0 |
|  | 1 | 10 | 4 | 3 | 9 | 1 | 10 | 0 |
|  | 10 | 9 | 4 | 6 | 10 | 10 | 9 | 0 |
|  | 5 | 3 | 4 | 13 | 11 | 5 | 3 | 0 |
|  | 12 | 2 | 4 | 2 | 12 | 12 | 2 | 0 |
|  | 5 | 13 | 4 | 3 | 13 | 5 | 13 | 0 |
|  | 10 | 6 | 4 | 9 | 14 | 10 | 6 | 0 |
|  | 1 | 3 | 4 | 10 | 15 | 1 | 3 | 0 |
|  | 2 | 1 | 4 | 14 | 16 | 2 | 1 | 0 |
|  | 15 | 13 | 4 | 6 | 17 | 15 | 13 | 0 |
|  | 7 | 13 | 4 | 2 | 18 | 7 | 13 | 0 |
|  | 16 | 10 | 4 | 5 | 19 | 16 | 10 | 0 |
|  | 13 | 10 | 4 | 4 | 20 | 13 | 10 | 0 |
|  | 14 | 4 | 4 | 6 | 21 | 14 | 4 | 0 |
|  | 4 | 3 | 4 | 16 | 22 | 4 | 3 | 0 |
|  | 9 | 4 | 4 | 15 | 23 | 9 | 4 | 0 |

```
116    % determine all sums P, 2P, 2P+P, 2P+P+P etc...
117    % start with result of P and 2P stored in oupn
118  - for k1=1:bend
119  -     xp=oupn(k1,1);
120  -     yp=oupn(k1,2);
121  -     xq=oupn(k1,4);
122  -     yq=oupn(k1,5);
123  -     moun(1,1,k1)=xp;
124  -     moun(1,2,k1)=yp;
125  -     moun(2,1,k1)=xq;
126  -     moun(2,2,k1)=yq;
127
128  -     for i1=3:bend
129  -         p11=isc16(yp,yq);
130  -         p12=isc16(xp,xq);
131  -         p13=munv(p12);
132  -         p14=im16(p11,p13);
133  -         p15=x2(p14);
134  -         p16=isc16(p14,p15);
135  -         p17=isc16(p16,xp);
136  -         p18=isc16(p17,xq);
137  -         xr=isc16(p18,af);
138  -         q11=isc16(xp,xr);
139  -         q12=im16(p14,q11);
140  -         q13=isc16(xr,q12);
141  -         yr=isc16(q13,yp);
142
143  -         pam1=isc16(yp,yq);
144  -         pam2=isc16(xp,xq);
145  -         ipam2=munv(pam2);
146  -         pam=im16(pam1,ipam2);
```

FIG. 27A

```
147            % xr=pam^2+pam+xp+xq+a
148  -         pamsq=x2(pam);
149  -         term1=isc16(pamsq,pam);
150  -         term2=isc16(term1,xp);
151  -         term3=isc16(term2,xq);
152  -         xr2=isc16(term3,af);
153  -         serm1=im16(pam,xp);
154  -         serm2=im16(pam,xr);
155  -         serm3=isc16(serm1,serm2);
156  -         serm4=isc16(serm3,xr);
157  -         yr2=isc16(serm4,yp);
158  -         moun(i1,1,k1)=xr;
159  -         moun(i1,2,k1)=yr;
160  -         ff=isc16(xp,yp);
161  -         gg=isc16(xr,yr);
162  -         moun(i1,3,k1)=ff;
163  -         moun(i1,4,k1)=gg;
164  -         moun(i1,5,k1)=i1;
165  -         moun(i1,6,k1)=xr2;
166  -         moun(i1,7,k1)=yr2;
167  -         moun(i1,8,k1)=(xp==xq)*99;
168  -         xq=xr;
169  -         yq=yr;
170  -         end
171  -     end
```

| | |
|---|---|
| 29 | 1 |
| 47 | 1 |
| 56 | 1 |
| 1 | 2 |
| 23 | 2 |
| 44 | 2 |
| 12 | 3 |
| 22 | 4 |
| 58 | 5 |
| 42 | 6 |
| 58 | 7 |
| 51 | 8 |
| 36 | 9 |
| 19 | 10 |
| 51 | 12 |
| 37 | 14 |
| 31 | 15 |
| 7 | 16 |
| 36 | 18 |
| 16 | 19 |
| 25 | 21 |
| 37 | 22 |
| 2 | 23 |

| | |
|---|---|
| 32 | 1 |
| 55 | 2 |
| 10 | 3 |
| 24 | 3 |
| 31 | 3 |
| 8 | 4 |
| 20 | 4 |
| 55 | 4 |
| 12 | 6 |
| 41 | 8 |
| 33 | 9 |
| 21 | 10 |
| 12 | 11 |
| 4 | 12 |
| 48 | 13 |
| 19 | 15 |
| 36 | 16 |
| 6 | 17 |
| 28 | 18 |
| 27 | 19 |
| 52 | 20 |
| 17 | 25 |
| 30 | 25 |
| 41 | 25 |
| 4 | 27 |

FIG. 29 col 1-15                                                                                                                        3200

| | | | | | | | | | | | | | | |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | ①  | 2 | 3 | 4 | 5 | 6 | 7 | 8 | 9 | 10 | 11 | 12 | 13 | 14 |
| 0 | 2 | 3 | 4 | 5 | 6 | 7 | 8 | 9 | 10 | 11 | 12 | 13 | 14 | 15 |
| 0 | 3 | 4 | 5 | 6 | 7 | 8 | 9 | 10 | 11 | 12 | 13 | 14 | 15 | 16 |
| 0 | 4 | 5 | 6 | 7 | 8 | 9 | 10 | 11 | 12 | 13 | 14 | 15 | 16 | 17 |
| 0 | 5 | 6 | 7 | 8 | 9 | 10 | 11 | 12 | 13 | 14 | 15 | 16 | 17 | 18 |
| 0 | 6 | 7 | 8 | 9 | 10 | 11 | 12 | 13 | 14 | 15 | 16 | 17 | 18 | 19 |
| 0 | 7 | 8 | 9 | 10 | 11 | 12 | 13 | 14 | 15 | 16 | 17 | 18 | 19 | 20 |
| 0 | 8 | 9 | 10 | 11 | 12 | 13 | 14 | 15 | 16 | 17 | 18 | 19 | 20 | 21 |
| 0 | 9 | 10 | 11 | 12 | 13 | 14 | 15 | 16 | 17 | 18 | 19 | 20 | 21 | 22 |
| 0 | 10 | 11 | 12 | 13 | 14 | 15 | 16 | 17 | 18 | 19 | 20 | 21 | 22 | 23 |
| 0 | 11 | 12 | 13 | 14 | 15 | 16 | 17 | 18 | 19 | 20 | 21 | 22 | 23 | 24 |
| 0 | 12 | 13 | 14 | 15 | 16 | 17 | 18 | 19 | 20 | 21 | 22 | 23 | 24 | 25 |
| 0 | 13 | 14 | 15 | 16 | 17 | 18 | 19 | 20 | 21 | 22 | 23 | 24 | 25 | 26 |
| 0 | 14 | 15 | 16 | 17 | 18 | 19 | 20 | 21 | 22 | 23 | 24 | 25 | 26 | ①  |
| 0 | 15 | 16 | 17 | 18 | 19 | 20 | 21 | 22 | 23 | 24 | 25 | 26 | ①  | 2 |
| 0 | 16 | 17 | 18 | 19 | 20 | 21 | 22 | 23 | 24 | 25 | 26 | ①  | 2 | 3 |
| 0 | 17 | 18 | 19 | 20 | 21 | 22 | 23 | 24 | 25 | 26 | ①  | 2 | 3 | 4 |
| 0 | 18 | 19 | 20 | 21 | 22 | 23 | 24 | 25 | 26 | ①  | 2 | 3 | 4 | 5 |
| 0 | 19 | 20 | 21 | 22 | 23 | 24 | 25 | 26 | ①  | 2 | 3 | 4 | 5 | 6 |
| 0 | 20 | 21 | 22 | 23 | 24 | 25 | 26 | ①  | 2 | 3 | 4 | 5 | 6 | 7 |
| 0 | 21 | 22 | 23 | 24 | 25 | 26 | ①  | 2 | 3 | 4 | 5 | 6 | 7 | 8 |
| 0 | 22 | 23 | 24 | 25 | 26 | ①  | 2 | 3 | 4 | 5 | 6 | 7 | 8 | 9 |
| 0 | 23 | 24 | 25 | 26 | ①  | 2 | 3 | 4 | 5 | 6 | 7 | 8 | 9 | 10 |
| 0 | 24 | 25 | 26 | ①  | 2 | 3 | 4 | 5 | 6 | 7 | 8 | 9 | 10 | 11 |
| 0 | 25 | 26 | ①  | 2 | 3 | 4 | 5 | 6 | 7 | 8 | 9 | 10 | 11 | 12 |
| 0 | 26 | ①  | 2 | 3 | 4 | 5 | 6 | 7 | 8 | 9 | 10 | 11 | 12 | 13 |

| 14 | 5 | 3 | 17 | 9 | 13 | 16 | 2 | 8 | 12 | 15 | 4 | 7 | 11 | 1 | 6 | 10 |
| 5 | 16 | 3 | 11 | 6 | 12 | 17 | 7 | 13 | 1 | 8 | 14 | 4 | 9 | 2 | 10 | 15 |
| 3 | 3 | 3 | 3 | 3 | 3 | 3 | 3 | 3 | 3 | 3 | 3 | 3 | 3 | 3 | 3 | 3 |
| 17 | 11 | 3 | 6 | 15 | 2 | 9 | 14 | 1 | 7 | 12 | 16 | 5 | 10 | 4 | 8 | 13 |
| 9 | 6 | 3 | 15 | 13 | 4 | 10 | 16 | 7 | 14 | 2 | 11 | 17 | 8 | 5 | 12 | 1 |
| 13 | 12 | 3 | 2 | 4 | 11 | 1 | 10 | 17 | 9 | 16 | 6 | 15 | 7 | 6 | 14 | 5 |
| 16 | 17 | 3 | 9 | 10 | 1 | 11 | 4 | 12 | 2 | 13 | 5 | 14 | 6 | 7 | 15 | 8 |
| 2 | 7 | 3 | 14 | 16 | 10 | 4 | 13 | 6 | 15 | 9 | 1 | 12 | 5 | 8 | 17 | 11 |
| 8 | 13 | 3 | 1 | 7 | 17 | 12 | 6 | 16 | 11 | 5 | 15 | 10 | 2 | 9 | 4 | 14 |
| 12 | 1 | 3 | 7 | 14 | 9 | 2 | 15 | 11 | 6 | 17 | 13 | 8 | 4 | 10 | 5 | 16 |
| 15 | 8 | 3 | 12 | 2 | 16 | 13 | 9 | 5 | 17 | 14 | 10 | 6 | 1 | 11 | 7 | 4 |
| 4 | 14 | 3 | 16 | 11 | 8 | 5 | 1 | 15 | 13 | 10 | 7 | 2 | 17 | 12 | 9 | 6 |
| 7 | 4 | 3 | 5 | 17 | 15 | 14 | 12 | 10 | 8 | 6 | 2 | 1 | 16 | 13 | 11 | 9 |
| 11 | 9 | 3 | 10 | 8 | 7 | 6 | 5 | 2 | 4 | 1 | 17 | 16 | 15 | 14 | 13 | 12 |
| 1 | 2 | 3 | 4 | 5 | 6 | 7 | 8 | 9 | 10 | 11 | 12 | 13 | 14 | 15 | 16 | 17 |
| 6 | 10 | 3 | 8 | 12 | 14 | 15 | 17 | 4 | 5 | 7 | 9 | 11 | 13 | 16 | 1 | 2 |
| 10 | 15 | 3 | 13 | 1 | 5 | 8 | 11 | 14 | 16 | 4 | 6 | 9 | 12 | 17 | 2 | 7 |

FIG. 31

| xP | yP | | x2P | y2P | 4301 |
|---|---|---|---|---|---|
| 4 | 2 | 1 | 14 | 8 | 1 |
| 6 | 2 | 1 | 7 | 4 | 2 |
| 10 | 2 | 1 | 8 | 7 | 3 |
| 7 | 4 | 1 | 4 | 2 | 4 |
| 17 | 5 | 1 | 1 | 7 | 5 |
| 1 | 7 | 1 | 10 | 2 | 6 |
| 8 | 7 | 1 | 8 | 17 | 7 |
| 11 | 7 | 1 | 17 | 14 | 8 |
| 14 | 8 | 1 | 11 | 12 | 9 |
| 14 | 11 | 1 | 11 | 7 | 10 |
| 1 | 12 | 1 | 10 | 17 | 11 |
| 8 | 12 | 1 | 6 | 2 | 12 |
| 11 | 12 | 1 | 17 | 5 | 13 |
| 17 | 14 | 1 | 1 | 12 | 14 |
| 7 | 15 | 1 | 4 | 17 | 15 |
| 4 | 17 | 1 | 14 | 11 | 16 |
| 6 | 17 | 1 | 7 | 15 | 17 |
| 10 | 17 | 1 | 8 | 12 | 18 |

| xP | yP | | x2P | y2P | 4302 |
|---|---|---|---|---|---|
| 4 | 1 | 1 | 4 | 11 | 1 |
| 9 | 2 | 1 | 15 | 10 | 2 |
| 15 | 4 | 1 | 3 | 2 | 3 |
| 8 | 5 | 1 | 14 | 6 | 4 |
| 14 | 6 | 1 | 13 | 15 | 5 |
| 14 | 7 | 1 | 13 | 14 | 6 |
| 8 | 8 | 1 | 14 | 7 | 7 |
| 3 | 9 | 1 | 15 | 4 | 8 |
| 15 | 10 | 1 | 3 | 9 | 9 |
| 4 | 11 | 1 | 4 | 1 | 10 |
| 1 | 14 | 1 | 8 | 8 | 11 |
| 13 | 14 | 1 | 1 | 15 | 12 |
| 1 | 15 | 1 | 8 | 8 | 13 |
| 13 | 15 | 1 | 1 | 14 | 14 |

FIG. 32

```
1    % make all elements of mult mg32 from polynomial
2    % based on P(x)=x^5+x^3+1 =d 41
3    mg32=zeros(32,32);% initialize table
4    for i1=0:31
5        for i2=0:31
6            di1=d2bn(i1,5)-1;% make 5 bit word of decimal i1
7            di2=d2bn(i2,5)-1;% make 5 bit word of decimal i2
8            g1=gf(di1,5,41); % GF array
9            g2=gf(di2,5,41); % GF array
10           px=gf([1 0 1 0 0 1],5,41);
11           % multiply terms
12           cp=conv(g1,g2);
13           % remainder by P(x)
14           [qc,rc]=deconv(cp,px);
15
16           act=g2dec(rc); % make decimal from rc
17           mg32(i1+1,i2+1)=act;
18       end
19   end
20   mg32
```

```
1    function y=g2dec(x);
2    % convert poly to decimal
3 -  lent=size(x);
4 -  len=lent(2);
5
6 -  y=0;
7 -  for i=1:len
8 -      p=(x(i)==1);
9 -      y=y+p*(2^(len-i));
10 - end
```
4701

```
1    function y=d2bn(x,n);
2    % make n bits of integer x
3 -  y=zeros(1,n);
4 -  p=x;
5 -  for i=1:n
6 -      y(i)=(p>=2^(n-i));
7 -      p=p-y(i)*(2^(n-i));
8 -  end
9 -  y;% binary word origin 1
```
4702

Columns 1 through 17

| 7 | 6 | 5 | 4 | 3 | 2 | 1 | 0 |
| 6 | 5 | 4 | 3 | 2 | 1 | 0 | 7 |
| 5 | 4 | 3 | 2 | 1 | 0 | 7 | 6 |
| 4 | 3 | 2 | 1 | 0 | 7 | 6 | 5 |
| 3 | 2 | 1 | 0 | 7 | 6 | 5 | 4 |
| 2 | 1 | 0 | 7 | 6 | 5 | 4 | 3 |
| 1 | 0 | 7 | 6 | 5 | 4 | 3 | 2 |
| 0 | 7 | 6 | 5 | 4 | 3 | 2 | 1 |

| 0 | 1 | 2 | 3 | 4 | 5 | 6 | 7 |
| 1 | 0 | 6 | 4 | 3 | 7 | 2 | 5 |
| 2 | 6 | 0 | 7 | 5 | 4 | 1 | 3 |
| 3 | 4 | 7 | 0 | 1 | 6 | 5 | 2 |
| 4 | 3 | 5 | 1 | 0 | 2 | 7 | 6 |
| 5 | 7 | 4 | 6 | 2 | 0 | 3 | 1 |
| 6 | 2 | 1 | 5 | 7 | 3 | 0 | 4 |
| 7 | 5 | 3 | 2 | 6 | 1 | 4 | 0 |

| 0 | 1 | 5 | 4 | 2 | 3 | 7 | 6 |
| 1 | 0 | 7 | 2 | 4 | 6 | 5 | 3 |
| 5 | 7 | 0 | 6 | 3 | 2 | 1 | 4 |
| 4 | 2 | 6 | 0 | 1 | 7 | 3 | 5 |
| 2 | 4 | 3 | 1 | 0 | 5 | 6 | 7 |
| 3 | 6 | 2 | 7 | 5 | 0 | 4 | 1 |
| 7 | 5 | 1 | 3 | 6 | 4 | 0 | 2 |
| 6 | 3 | 4 | 5 | 7 | 1 | 2 | 0 |

FIG. 42

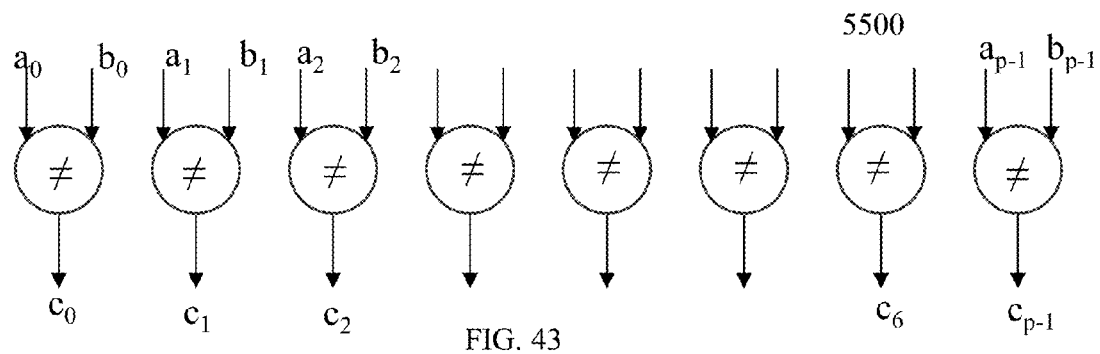
FIG. 43
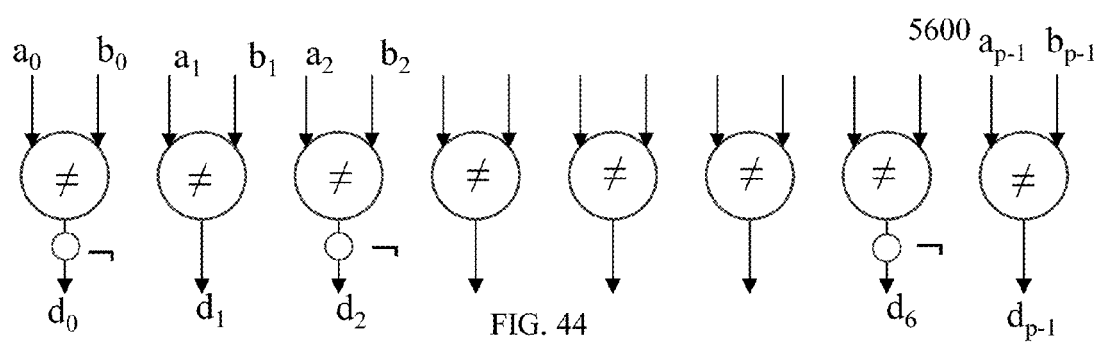
FIG. 44
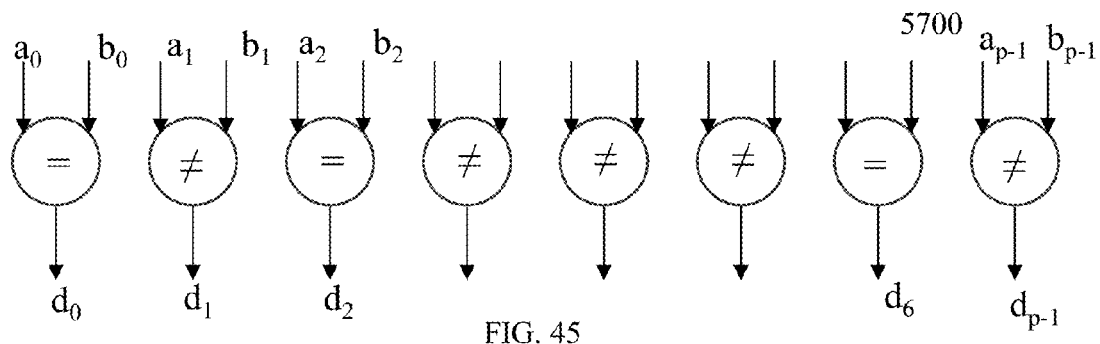
FIG. 45
FIG. 46

```
1    function y=labtransform(table,invert)
2    % lab-transform or L-transformation
3    % inverts n-state switching table 'table' with
4    % n-state inverter 'invert'at inputs and
5    %reversing inverter 'rinvert' at output
6    % the table and inverter are in origin 1
7    % Copyright 2017 Ternarylogic LLC. All right reserved
8
9    % determine size of 'table'
10 - lent=size(table);
11 - len=lent(2); % len is n
12
13   % initialize 'tableinv' and 'rinvert'
14 - rinvert=zeros(1,len);
15 - tableinv=zeros(len,len);
16
17   % determine 'rinvert' from 'invert'
18 - for i=1:len
19 -     ind=invert(i);
20 -     rinvert(ind)=i;
21 - end
22
23   % determine modified table 'tableinv'
24 - for i1=1:len
25 -     for i2=1:len
26 -         k1=invert(i1); % invert input 1
27 -         k2=invert(i2); % invert input 2
28 -         aa=table(k1,k2);
29 -         tableinv(i1,i2)=rinvert(aa);% invert output
30 -     end
31 - end
32 - y=tableinv; % the inverted switching table
```

FIG. 48

| 0 | 0 | 0 | 0 | 0 | 0 | 0 | 0 |
|---|---|---|---|---|---|---|---|
| 0 | 1 | 2 | 3 | 4 | 5 | 6 | 7 |
| 0 | 2 | 3 | 4 | 5 | 6 | 7 | 1 |
| 0 | 3 | 4 | 5 | 6 | 7 | 1 | 2 |
| 0 | 4 | 5 | 6 | 7 | 1 | 2 | 3 |
| 0 | 5 | 6 | 7 | 1 | 2 | 3 | 4 |
| 0 | 6 | 7 | 1 | 2 | 3 | 4 | 5 |
| 0 | 7 | 1 | 2 | 3 | 4 | 5 | 6 |

FIG. 49

```
function y=labtransform_indiv_mod(i1,i2,k,plus,n)
% lab-transform of individual operations
% this example uses op=multiplication mod-n
% inputs i1 and i2, inverse is *k mod-n, and offset is plus
% Copyright 2017 Ternarylogic LLC. All right reserved % begin body of individual Lab-transform
    k1=ruleinv(i1,k,plus,n);  % determine inverted first input
    k2=ruleinv(i2,k,plus,n);  % determine inverted second input out1=muln(k1,k2,n);       % result of (k1*k2) mod-n outr=rulerinv(out1,k,plus,n); % invert out1 with reversing
    % inverter wherein ruleinv and rulerinv combined are identity % end of body of individual Lab-transform y=outr; % output of labtransformed operation
```

7300

```
function y=ruleinv(i,k,plus,n)
% create inverter state from multiplication
% mod-n of input i with multiplier k and add plus mod-n
% Copyright 2017 Ternarylogic LLC. All right reserved y=mod((k*i)+plus,n); % multiplier row k +plus mod n
```

7301

```
function y=rulerinv(i,k,plus,n)
% create reverse inverter invr from multiplication
% mod-n at multiplier k and offset plus
% Copyright 2017 Ternarylogic LLC. All right reserved kinv=modinvn(k,n);    % mult inverse of k
r=mod(n-plus,n);      % position for which r+plus is 0
x=mod(r*kinv,n);      % offset x at multiplier kinv
y=mod((kinv*i)+x,n);  % inverse of i by reversing inverter
```

```
1  function y=labtransform_consec(i1,i2,k,plus,n)
2  % lab-transform of individual operations
3  % in consecutive n-state multiplication
4  % for inversion factor k and offset plus
5  % Copyright 2017 Ternarylogic LLC. All right reserved
6  k1=rule_inv_cons(i1,k,plus,n); % determine input invert
7  k2=rule_inv_cons(i2,k,plus,n); % determine input invert
8  ax=mulnp(k1,k2,n); % results of consec mult of k1 and k2
9  % determine reverse invert of output
10 bx=rule_rinv_consec(k,plus,ax,n);
11 y=bx; % y is result
```
7400

```
1  function y=rule_inv_cons(i,k,plus,n)
2  % create inversion in n-state consecutive
3  % multiplication with factor k as inverter
4  % and offset plus
5  % Copyright 2017 Ternarylogic LLC. All right reserved
6  if i==0 % check if input is 0
7      aa=0;
8  else
9      % result of consecutive multiplication with k
10     aa=mod((k+i-1),n)+(((k+i-1)>=n)*1);
11 end
12 y=mod(aa+plus,n); % offset
```
7401

```
1  function y=rule_rinv_consec(k,p,i2,n)
2  % create reverse inversion in n-state consecutive
3  % multiplication with factor k as inverter
4  % and offset plus
5  % Copyright 2017 Ternarylogic LLC. All right reserved
6      kinv=(n+1-k); % determine multiplicative inverse
7  % next step determines shift of multiplication kinv
8      m=(n-p+i2)*(i2<p)+(0)*(i2==p)+(i2-p)*(i2>p);
9      if m==0
10         mp=0;
11     else
12         % determine reverse inversion state
13         mp=mod((kinv+m-1),n)+(((kinv+m-1)>=n)*1);
14     end
15 y=mp; % output result
```
7402

```
1  function y=mulnp(i1,i2,p)
2  % Copyright 2017 Ternarylogic LLC. All right reserved
3  % determine n-state consecutive product
4  if i1*i2==0
5      mp=0;
6  else
7      mp=mod((i1+i2-1),p)+(((i1+i2-1)>=p)*1); % result
8  end
9  y=mp;
```
7403

FIG. 58

CRYPTOGRAPHIC MACHINES WITH N-STATE LAB-TRANSFORMED SWITCHING DEVICES

CROSS-REFERENCE TO RELATED CASES

This application claims the benefit of and is a continuation-in-part of patent application Ser. No. 15/244,985 filed on Aug. 23, 2016, which claims the benefit of U.S. Provisional Patent Application No. 62/209,331 filed on Aug. 24, 2015. Patent application Ser. No. 15/244,985 claims the benefit and is a continuation-in-part of patent application Ser. No. 14/975,841 filed on Dec. 20, 2015 which is a continuation-in-part and claims the benefit of patent application Ser. No. 14/622,860 filed on Feb. 14, 2015 now U.S. Pat. No. 9,218,158 issued on Dec. 22, 2015 which claims the benefit and is a continuation of patent application Ser. No. 14/064,089 filed on Oct. 25, 2013 which is a continuation in part of patent application Ser. No. 12/980,504 filed on Dec. 29, 2010 now U.S. Pat. No. 8,577,026 issued on Nov. 5, 2013. The instant application claims the benefit and is a continuation-in-part of patent application Ser. No. 14/975,841 filed on Dec. 20, 2015 which is a continuation-in-part and claims the benefit of patent application Ser. No. 14/622,860 filed on Feb. 14, 2015 now U.S. Pat. No. 9,218,158 issued on Dec. 22, 2015, which claims the benefit and is a continuation of patent application Ser. No. 14/064,089 filed on Oct. 25, 2013 which claims the benefit and is a continuation in part of Ser. No. 12/980,504 filed on Dec. 29, 2010 now U.S. Pat. No. 8,577,026 issued on Nov. 5, 2013. The instant application claims the benefit and is a continuation-in-part of patent application Ser. No. 14/752,997 filed on Jun. 28, 2015, which is a continuation-in-part of and claims the benefit of patent application Ser. No. 14/324,217 filed on Jul. 6, 2014 now U.S. Pat. No. 9,100,166 issued on Aug. 4, 2015, which is a continuation of and claims the benefit of patent application Ser. No. 13/118,767 filed on May 31, 2011 now U.S. Pat. No. 8,817,928 issued on Aug. 26, 2014, which claims the benefit of U.S. Provisional Patent Application No. 61/350,247, filed Jun. 1, 2010. This application claims the benefit of U.S. Provisional Patent Application No. 62/299,935 filed on Feb. 25, 2016. This application claims the benefit of U.S. Provisional Patent Application No. 62/435,814 filed on Dec. 18, 2016. This application claims the benefit of U.S. Provisional Patent Application No. 62/455,555 filed on Feb. 6, 2017. All of the above applications are incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Aspects of the present invention relate to machine cryptography. Data exchange between computing devices often takes place over communication channels that are not secure. Furthermore, networked devices are often a (unintended) gateway to the management, control and security of the network and devices attached to a network, wherein the network is often connected or part of a public network such as the Internet and may provide access to a bank account or access to a house, a garage, a car, a refrigerator, a camera, a thermostat, a cell phone, a tv device, a tablet, a PC, an industrial facility, the electricity network or other utility network, radar installation, or any other computing device that is enabled to communicate. It is important to guard against unauthorized access of connected devices and to keep the information that is exchanged as private as possible.

Cryptographic procedures performed by machines of authentication, public and private key generation and distribution, encipherment and decipherment rely on public and standard procedures wherein at least one aspect is user specific, but the steps of a procedure are known, including logic functions and/or logic circuits that are used. Many cryptographic procedures are for instance published as standards by the National Institute of Standards and Technology (NIST) of the US Department of Commerce. The advantage is that some of the best procedures are made publicly available. Because such procedures are so widely used they are also widely studied and susceptible to ever improving attacking procedures. Because the published security procedures are recognized as being among the best available, the general user is generally unable to develop a new procedure that is better than the standard ones.

It would increase security if one can modify existing procedures in an unpredictable or hard to predict way that would make attacks on security procedures harder to be successful while maintaining strong aspects of known security and cryptography programs and procedures.

Accordingly, novel and improved methods and devices are required that use difficult to predict parameters in modifying standard cryptographic methods and devices.

SUMMARY OF THE INVENTION

In accordance with an aspect of the present invention a cryptographic apparatus to modify one or more signals into one or more cryptographic signals is provided, comprising: an input to receive the one or more signals; an n-state Lab-transformed switching circuit with n>2 that is selected from the group consisting of: an n-state zero Lab-transformed switching device, an n-state one Lab-transformed switching device, an n-state zero-one Lab-transformed switching device and an n-state k-row Lab-transformed switching device, the n-state Lab-transformed switching circuit enabled to process signals related to the one or more signals; and an output to provide one or more cryptographic signals.

In accordance with another aspect of the present invention a cryptographic apparatus is provided, wherein the Lab-transformed switching device is characterized by a Lab-transformed modulo-n multiplication.

In accordance with yet another aspect of the present invention a cryptographic apparatus is provided, wherein the Lab-transformed switching device is characterized by a Lab-transformed multiplication over a finite field GF(n).

In accordance with yet another aspect of the present invention a cryptographic apparatus is provided, wherein the Lab-transformed switching device is characterized by a Lab-transformed multiplication over a finite field GF(n) or a multiplicative group.

In accordance with yet another aspect of the present invention a cryptographic apparatus is provided, wherein the n-state Lab-transformed switching device is characterized by a Lab-transformed addition over a finite field GF(n) or an additive group.

In accordance with yet another aspect of the present invention a cryptographic apparatus is provided, wherein the Lab-transformed switching device is characterized by a Lab-transformed modulo-n addition.

In accordance with yet another aspect of the present invention a cryptographic apparatus is provided, wherein the n-state Lab-transformed switching device is characterized by a two input operation characterized by an expression $mod((i1+i2-1),n)+(((i1+i2-1)>=n)*1)$ that is Lab-transformed, wherein mod means modulo, i1 indicates a state of a first input and i2 indicates a state of a second input.

In accordance with yet another aspect of the present invention a cryptographic apparatus is provided, wherein the n-state Lab-transformed switching device is characterized by a two input operation characterized by an expression $(e-i1-i2)mod-n$ that is Lab-transformed, wherein mod means modulo, i1 indicates a state of a first input and i2 indicates a state of a second input and e is an offset.

In accordance with yet another aspect of the present invention a cryptographic apparatus is provided, wherein the n-state Lab-transformed switching device is characterized by a two input operation characterized by an expression $mod((i1+i2-1),n)+(((i1+i2-1)>=n)*1)$ that is Lab-transformed, wherein mod means modulo, i1 indicates a state of a first input and i2 indicates a state of a second input.

In accordance with yet another aspect of the present invention a cryptographic apparatus is provided, wherein the n-state Lab-transformed switching device is characterized by k bitwise XOR operations of input states that is Lab-transformed, wherein a reversible inverter in the Lab-transform is characterized by an inversion of at least one XOR operation of the k bitwise XOR operations.

In accordance with yet another aspect of the present invention a cryptographic apparatus is provided, wherein the cryptographic apparatus performs a symmetric encryption or a symmetric decryption operation.

In accordance with yet another aspect of the present invention a cryptographic apparatus is provided, wherein the cryptographic apparatus performs substantially a Lab-transformed Advanced Encryption Standard (AES) operation.

In accordance with yet another aspect of the present invention a cryptographic apparatus is provided, wherein the cryptographic apparatus performs a public-key cryptography operation.

In accordance with yet another aspect of the present invention a cryptographic apparatus is provided, wherein the cryptographic apparatus performs a hashing or message digest operation.

In accordance with yet another aspect of the present invention a cryptographic apparatus is provided, wherein the cryptographic apparatus performs an elliptic curve cryptography operation.

In accordance with yet another aspect of the present invention a cryptographic apparatus is provided, wherein the cryptographic apparatus performs an authentication operation.

In accordance with a further aspect of the present invention a cryptographic apparatus to modify one or more signals into one or more cryptographic signals is provided, comprising: an input to receive the one or more signals; an n-state Lab-transformed switching circuit with n>2, the n-state Lab-transform is characterized as a modification of an n-state 2-input/output switching table, wherein input states on the 2-inputs are modified by a first reversible n-state inverter and an output state is modified by a second reversible n-state inverter that reverses the first reversible n-state inverter to identity to define a Lab-transformed n-state switching table, and wherein at least 2 rows in the Lab-transformed n-state switching table are different from corresponding rows in the n-state 2-input/output switching table, the n-state Lab-transformed switching circuit enabled to process signals related to the one or more signals; and an output to provide the one or more cryptographic signals.

In accordance with yet another aspect of the present invention a cryptographic apparatus is provided, wherein the n-state Lab-transformed switching circuit with n>2 is selected from the group consisting of: an n-state zero Lab-transformed switching device, an n-state one Lab-transformed switching device, an n-state zero-one Lab-transformed switching device and an n-state k-row Lab-transformed switching device.

In accordance with yet another aspect of the present invention a cryptographic apparatus is provided, wherein the n-state 2-input/output switching table is characterized by an n-state operation from the group of n-state operations consisting of: a modulo-n multiplication with n a prime number, a modulo-n addition with n a prime number, an addition over a finite field GF(n), an addition over a finite field $GF(n=2^p$ and $p>1)$, a multiplication over a finite field GF(n), a multiplication over a finite field $GF(n=2^p$ and $p>1)$, a multiplication in a multiplicative group, an operation defined by an expression $mod((i1+i2-1),n)+(((i1+i2-1)>=n)*1)$, wherein mod means modulo, i1 indicates a state of a first input and i2 indicates a state of a second input; an operation defined by an expression $(e-i1-i2)mod-n$, wherein mod means modulo, it indicates a state of a first input and i2 indicates a state of a second input and e is an offset, and k bitwise XOR operations.

In accordance with yet another aspect of the present invention a cryptographic apparatus is provided, wherein the cryptographic apparatus performs one cryptographic operation selected from the group consisting of: an encryption, a symmetric decryption, a hashing or message digest operation, authentication, a public-key cryptographic operation, an elliptic curve cryptography operation, an authentication operation and a digital signature operation.

In accordance with an aspect of the present invention an apparatus is provided to process cryptographic data, comprising: a memory enabled to store and to retrieve data including instructions; a processor enabled to process data in accordance with instructions retrieved from the memory; communication circuitry in connection with the processor; the processor being configured to select a private key from n data elements wherein n is an integer greater than 2; the processor configured to create a modified n-state 2-input/single output switching operation by applying an n-state inverter and its reversing n-state inverter to an n-state 2-input/single output switching operation; the processor configured to generate a public key based on the modified n-state 2-input/single output switching operation; the processor configured to receive via the communication circuitry a message based on the public key; and the processor is configured to determine a keyword by applying the private key, the modified n-state 2-input/single output switching operation and the received message.

In accordance with a further aspect of the present invention the apparatus is provided, wherein the modified n-state 2-input/output switching operation is applied by the processor to an elliptic curve operation.

In accordance with yet a further aspect of the present invention the apparatus is provided, wherein the modified n-state 2-input/output switching operation is applied to a Diffie Hellman operation.

In accordance with yet a further aspect of the present invention the apparatus is provided, wherein the apparatus is applied to sending data from a website displayed on a computing machine.

DESCRIPTION OF THE DRAWINGS

FIG. 1 is a diagram of a device that modifies a switching operation in accordance with various aspects of the present invention;

FIGS. 2, 3, 4 and 5 are screenshots of a switching table generated by a computing device in accordance with one or more aspects of the present invention;

FIG. 8 illustrates a representation of states of a linear feedback shift register;

FIGS. 9 and 10 illustrate switching tables generated by a computing device in accordance with one or more aspects of the present invention;

FIG. 11 is a screenshot of computer instructions that generate a switching table in accordance with one or more aspects of the present invention;

FIGS. 12 and 13 are screenshots of a switching table generated in accordance with one or more aspects of the present invention;

FIG. 14 is a screenshot generated by a computer of a list of points on an elliptic curve;

FIG. 15 is a screenshot generated by a computer of a list of points on an elliptic curve;

FIG. 16 is a screenshot of computer instructions that generate a switching table in accordance with one or more aspects of the present invention;

FIGS. 17, 18 and 19 illustrate switching tables generated by a computing device in accordance with one or more aspects of the present invention;

FIGS. 20, 21 and 22 are screenshots of computer instructions that generate a switching table in accordance with one or more aspects of the present invention;

FIG. 23 is a screenshot generated by a computer of a list of points on an elliptic curve in accordance with one or more aspects of the present invention;

FIG. 24 is a screenshot of computer instructions that generate points on an elliptic curve in accordance with one or more aspects of the present invention;

FIGS. 25 and 26 are screenshots generated by a computer of a list of points on an elliptic curve in accordance with one or more aspects of the present invention;

FIGS. 27A and 27B are screenshots of computer instructions that generate points on an elliptic curve in accordance with one or more aspects of the present invention;

FIGS. 28 and 29 are screenshots generated by a computer of a list of points on an elliptic curve in accordance with one or more aspects of the present invention;

FIG. 30 is a screenshot of a switching table generated by a computing device in accordance with one or more aspects of the present invention;

FIG. 31 is a screenshot of a switching table generated by a computing device in accordance with one or more aspects of the present invention;

FIG. 32 is a screenshot generated by a computer of a list of points on an elliptic curve in accordance with one or more aspects of the present invention;

FIG. 35 are screenshots of computer instructions in accordance with one or more aspects of the present invention;

FIGS. 36 and 37 are screenshots of switching tables generated by a computing device in accordance with one or more aspects of the present invention;

FIG. 40 illustrates an 8-state switching table that characterizes a switching device in accordance with an aspect of the present invention;

FIGS. 41 and 42 illustrate n-state switching tables with n=8 that characterize switching devices in accordance with an aspect of the present invention;

FIGS. 43, 44 and 45 illustrate modification of a plurality of binary switching devices in accordance with an aspect of the present invention;

FIG. 46 illustrates an n-state switching table with n=8 that characterizes a switching device in accordance with an aspect of the present invention;

FIG. 48 is a screenshot of a computer program listing that performs a Lab-transform in accordance with one or more aspects of the present invention; and FIGS. 49, 50, 51, 52, 53 and 54 are screenshots of n-state switching tables generated by a programmed processor.

FIG. 57 shows screenshots of related Matlab programs that perform steps in accordance with one or more aspects of the present invention; and FIG. 58 shows screenshots of related Matlab programs that perform steps in accordance with one or more aspects of the present invention.

DESCRIPTION OF THE INVENTION

Figures 1, 2, 3:
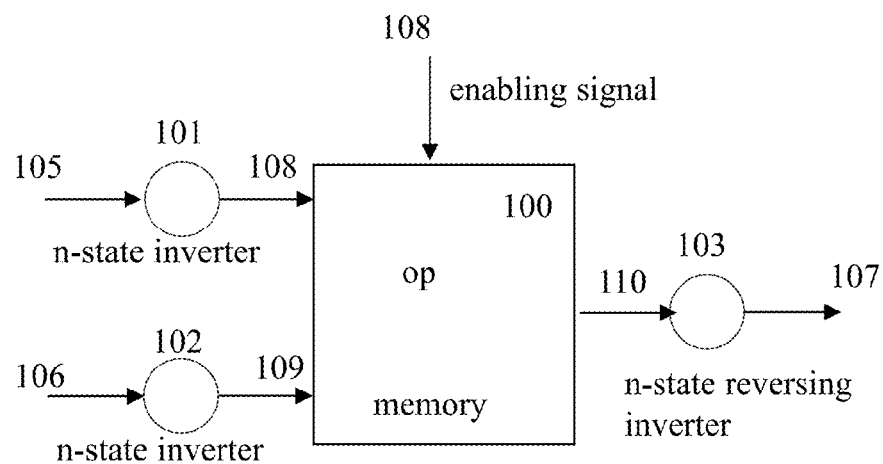

Embodiments of the present invention are directed to application of new n-state switching functions in cryptographic machines. A cryptographic machine is a processor or processor-type device, such as a Field Programmable Gate Array (FPGA), digital circuitry with discrete digital switching components, memory with stored programs and limited functional circuitry (micro-programmed device), an ASIC or any other digital circuitry, that is enabled or configured to receive and process signals that represent data and to generate signals being cryptographic data. Cryptographic data include, but is not limited to encrypted data, a digital signature, an authentication, a public key, a message digest or hash, a Cyclic Redundancy Code (CRC), scrambled data. In general cryptographic data is encoded data of which the original data from which it is derived is not easy to determine. Security or cryptography procedures include: generating and distributing public keys, authenticating messages, creating message digests or hash functions, generating digital signatures, enciphering and deciphering messages and others. A message herein is digital data that is represented by one or more signals. Signals are generated by a device and are received by a device. Data as processed by cryptographic devices are commonly represented in binary form. Transmission of signals can be wired or wireless. Signals can for instance be an electrical, a magnetic, an electromagnetic, or an optical signal. Signals may also be a mechanical signal such as a state of a device or a presence or absence of a material. Signals may be modulated and may be transduced from one form into another. Most data signals are in some form designated to represent binary data. Data signals are often represented or described by symbols. Both the signals and their descriptive symbols can be binary or non-binary or a combination thereof. For instance a QAM-n signals with n>2 are generated by devices. A QAM-n signal may be characterized by a discrete state of phase and/or amplitude in a constellation. In 64-QAM or QAM-64 each state may be characterized by or transmit 6 bits. ASCII characters such as in an alphabet may include at least 26 different lower case symbols. These symbols can be further described or represented by bytes of 7 or 8 bits. Internally a computing device uses the byte, but on a display 26-state symbols (lower case characters) are used.

Fundamental to digital circuits such as processors, FPGAs and memories is that they are state machines or switching machines. That is, for their useful purposes, digital circuitry changes a physical state, based on an input signal and provides an output signal due to a new state. Commonly, states of devices are characterized by their input and output signals and are represented by binary states, commonly indicated as "high" and "low" when discussed in a physical sense and commonly labeled as "1" and "0." The "0" and "1" are merely labels for true signals. It is understood herein that switching devices characterized by states "0" and "1" are physical devices that switch between physical states. A two input device that switches from state "0" to "1", for instance may change from physical state "ground" to +4.9 Volt. The device may be a logic "AND" gate and the change may take place because two inputs are placed in state "1". The literature sometimes as operational representation of the AND gate that the product of two input states is the output state, like a multiplication 1*1=1. It is to be understood that this is a human representation that does not correctly describe the physical reality of the AND gate. The physical reality is that 4.9 V on a first input and 4.9 V on a second input will generate 4.9 V on the output. No mathematical multiplication takes place inside the device. One of ordinary skill would realize that 4.9*4.9 is not 4.9.

The meaning of the term switching table herein means a table that labels physical states with symbols. The symbols correspond with measurable and detectable physical states. A switching table means herein also that it is realized or implemented on a physical device including a combinational circuit or a memory. Cryptographic devices generally operate on bits or words of bits. A bit herein means a binary signal that can assume one of two states. The use of the symbols "0" and "1" only indicate that a signal is "low" or "high" using signal levels that are common in the computer and switching devices industry. For convenience n-states are used in numerical form, usually in origin 0 in [0, 1, 2, . . . n–1] or in programs like Matlab in origin 1 in [1, 2, 3, . . . n]. It is to be understood that each of n states corresponds to a real physical state that may be a word of binary signals.

Accordingly, n-state switching tables herein correspond to physical switching and n-state switching devices and are physical devices. None of the devices herein performs any arithmetical operation, even though for convenience arithmetical terms may be used.

Characters and other symbols may be represented by a numerical or decimal or hexadecimal representation, while internally being processed as words of bits. Memories now exist wherein a memory is multi-level rather than binary. For ease of use nonbinary or multi-state representation for signals is used herein. Computers or processors have generally no awareness of a value or meaning of any representation. Such meaning is provided by the ways signals represented by symbols are processed by a processor. An example of that is a ripple adder in hardware. In binary form XOR devices and AND devices as switching devices are applied to perform functions that coincide with the modulo-2 addition and the modulo-2 carry generation.

Methods provided herein in accordance with one or more aspects of the present invention represent configurations or enablements of hardware devices that perform one or more switching tasks. A description may be provided in Matlab or any other computer language that is executable and executed on a processor with memory. A switching device is characterized by a matrix or a vector and can be realized in combinational circuitry or by addressable memory devices that store a switching matrix or vector. Many books and articles exist that describe "logic" representation of switching circuitry. One of the first articles on the subject is the Master Thesis by Claude Elwood Shannon, entitled A Symbolic Analysis of Relay and Switching Circuits and marked as Submitted in Partial Fulfillment of the Requirements for the Degree of Master of Science from the Massachusetts Institute of Technology 1940, which is incorporated herein by reference. Thus while formulas, expressions and tables are provided herein to describe or illustrate methods, procedures and devices it is to be understood that these all can and are realized in hardware and device form.

One aspect of the present invention relates to the use of non-binary or n-state inverters which can be reversible or non-reversible. An n-state inverter is characterized by n symbols of which each can assume one of n-states. For convenience a numerical representation is used running from 0 to (n–1) or from 1 to n. An n-state inverter is assumed to have n possible input states. Each input generates an output. The n-state inverter is represented by the vector expression: $[0\ 1\ 2\ \ldots\ n-1] \rightarrow [a_0\ a_1\ a_2\ \ldots\ a_{n-1}]$. The left side represents the possible input states and the right side the output, wherein $a_o$ is the output state generated by input state 0, $a_1$ is the output state generated by input state 1, $a_2$ is the output state generated by input state 2, and $a_{n-1}$ is the output state generated by input state n–1. The states of $a_0, a_1, a_2, \ldots a_{n-1}$ are selected from states 0, 1, 2, . . . n–1 and can be all different, in which case the inverter is reversible or at least two output states are the same, in which case the inverter is non-reversible.

An example of a reversible 4-state inverter is $[0\ 1\ 2\ 3] \rightarrow [2\ 0\ 3\ 1]$ in which input state 0 generates output state 2; input state 1 generates output state 0; input state 2 generates output state 3 and input state 3 generates output state 1. An example of a non-reversible 5-state inverters is $[0\ 1\ 2\ 3\ 4] \rightarrow [2\ 2\ 3\ 1\ 3]$. Both input states 0 and 1 generate output states 2. It is impossible in that case to determine from the output state what the input state was. The reversing n-state inverter reverses the n-state inverter back to [0 1 2 . . . n–1]. The reversing inverter of 4-state inverter $[0\ 1\ 2\ 3] \rightarrow [2\ 0\ 3\ 1]$ is $[0\ 1\ 2\ 3] \rightarrow [1\ 3\ 0\ 2]$.

There are $n^n$ n-state inverters of which n! are reversible including the identity. There are over 16 million 8-state inverters of which 40,320 are reversible and includes $[0\ 1\ 2\ 3\ 4\ 5\ 6\ 7] \rightarrow [0\ 1\ 2\ 3\ 4\ 5\ 6\ 7]$ which is the identity 8-state inverter. The number of reversible inverters becomes very large when n increases. For n=16 there are over $2*10^{13}$ reversible inverters. Accordingly, the probability to predict an n-state inverter or to analyze data to determine use of an n-state inverter becomes extremely low.

Cryptography and error correction codes commonly uses functions that determine a finite field or Galois Field GF(n). The functions that determine the Galois field are generally called the addition and multiplication. However, there is often no direct relation between "normal" or radix-n addition and multiplication and Galois Field addition and multiplication for extension fields of Galois Fields. All Galois Fields have a neutral element $e_{scn}$ for the operation "addition" designated by "scn" so that scn(ak,$e_{scn}$)=ak. Such neutral element is also called the "zero element." Its connection with the second operation which is usually called multiplication or "mn" is that operation mn(ak,$e_{scn}$)=$e_{scn}$. For understanding one can assume the Galois Field GF(5) wherein the addition operation is "sc5" and is the modulo-5 addition. The neutral element or zero element $e_{sc5}$ is 0. The multiplication operation "m5" is the modulo-5 multiplication, wherein multiplication of any element with $e_{sc5}$=0 provides 0. The operation "mn" also has a neutral element $e_{mn}$ so that mn(ak,$e_{mn}$)=ak. For the multiplication m5 over GF(5) the neutral element $e_{m5}$ is 1. The inventor found that this aspect of using field operations over GF(n) facilitates cryptanalysis and that modification of the finite field GF(n) into an alternate finite field aGF(n) with modified addition and multiplication and modified zero and neutral elements would make cryptanalysis much more difficult. These aspects are disclosed in for instance U.S. patent application Ser. No. 12/952,482 filed on Nov. 23, 2010, which is incorporated herein by reference ('the 482 application').

How to create an alternate finite field aGF(n) from GF(n) with reversible n-state inverters was disclosed earlier by the inventor in U.S. patent application Ser. No. 14/064,089 filed Oct. 25, 2013 (the "089 application") to which the instant disclosure claims benefit, and is repeated here to provide context. Now referring to FIG. 1, a switching table representing the n-state function "scn" or "mn" is stored in an addressable memory 100 with two inputs and one output. Different realizations of switching tables are possible as one of ordinary skill in the art knows. The input states represented by signals on inputs form the address of the memory where upon the output state is stored. The memory 100 has two inputs 108 and 109 which determine the address of memory elements that outputs its content on output 110. Reversible n-state inverter 101 with input 105 is connected to input 108 of memory 100. N-state inverter 102 which is identical to inverter 101 with input 106 is connected to input 109. The output 110 of memory 100 is connected to n-state inverter 103 with output 107. N-state inverter 103 reverses inverter 101 back to the identity state [0 1 2 . . . n–1]. An input 108 on the memory may be enabled to receive an enabling signal to make sure that memory 100 is ready to provide appropriate output.

An n-state inverter, which may be reversible, can be realized in different components, like the n by n switching table, as one of ordinary skill will know. An n-state symbol in binary technology in one embodiment of the present invention is represented by a binary word, which by itself is usually represented by a plurality of binary signals. A first realization of an n-state inverter is by storage of the inverter output states (or rather signals) in an addressable memory wherein an input state forms an address in the memory that is activated and the output is the inversed state stored at the memory address. A second realization is by way of a combinational binary circuit. One can for instance define the input and output states as binary words in a Karnaugh map and construct a combinational binary circuit on that basis as is known in the art. A third realization is on a processor with a memory. For instance in Matlab one defines a 4-state inverter as a 1 by 4 array, which may be called inverter 'invert4'. For example a Matlab instruction is: invert4=[4 3 2 1]. Matlab works origin 1. Assume one variable 'input1' has the value 3 or: input1=3. Matlab then inverts 'input1' to 'invinput1' in accordance with inverter invert4 by the instruction: invinput1=invert4(input1). The result is invinput1 is 2. And thus the input is inverted with an inverter.

The underlying realization of the instructions and inversion by the processor is known to one of ordinary skill in computer circuit design and is well aware of the physical processes that are being performed, even though a user may only see symbols on a screen. The symbols on a screen are only for human consumption and are not needed for performing the actual inversion. For instance a device may receive a signal representing a 256-state signal that needs to be processed, for instance in accordance with a 256-state inverter. The received signal is demodulated and otherwise processed to provide for instance an 8-bit byte to an inverter execution that generates the inverted 8-bit byte. The inverted 8-bit byte may be used for further processing by the processor or may be processed to be displayed on a screen by the processor. An example of this is provided for instance on line 2 of program screen shot 600 of Matlab program in FIG. 6.

The device illustrated in FIG. 1 transforms the n-state switching table that characterizes the device between inputs 108 and 109 and output 110 to a device with a transformed n-state switching table that characterizes the device between inputs 105 and 106 and output 107. The terminology is used herein that says that the original n-state switching table as stored and realized in memory or realized in a circuit is 'transformed' to a new or Lab-transformed n-state switching table that characterizes the device in FIG. 1 between 105, 106 and 107.

A Lab-transformed n-state switching table is a first n-state n by n switching table transformed by using identical n-state reversible inverters to transform first and second inputs to the first n-state n by n switching table and transforms the output with a reversing inverter to the n-state reversible inverter that combined with the n-state reversible inverter forms an n-state identity inverter. An input to a table is an index or address of a row or a column of a 2-dimensional n by n table. For convenience a top input of a 2-input device such as in FIG. 1 corresponds with a row index of an n-state switching table and a bottom input corresponds to a column index of the n-state switching table. One is again reminded that inputs on a device receive a signal, not a symbol or a state. The symbol or state indication is merely used for convenience to represent that a symbol represents a signal and that different symbols indicate different signals.

The switching table of 100 performs an operation that may be called 'op' for convenience or 'sc' for addition or 'm' for multiplication. One of ordinary skills knows that with known techniques, such as Karnaugh map, the switching table can be performed by a combinational digital circuit.

The effect of the device of FIG. 1 is that de addition and multiplication over GF(n) are modified in such a manner that the new operations also define a finite field which is called aGF(n). As an illustrative example a modification of a finite field GF(8) with 8-state inverter inv8:[0 1 2 3 4 5 6 7]→[2 3 4 5 6 7 0 1] and reversing inverter rinv8: :[0 1 2 3 4 5 6 7]→[6 7 0 1 2 3 4 5] is provided. FIG. 2 shows switching table 200 of sc8 as stored in memory and display on a screen of which FIG. 2 is a screen shot. The processor is controlled by Matlab® and all output matrices are in origin 1. To interpret 8-state table switching 200 in elements [0 1 2 3 4 5 6 7] a number 1 should be subtracted from the table elements. One can see that 0 (displayed as 1) is the zero element of sc8. FIG. 3 displays a screen shot of 8-state multiplication switching table m8 in origin 1. Herein 0 is the zero element (1 in the table) and 1 is the neutral multiplication element (2 in origin 1). As a reminder: a modified addition over aGF(n) continues to have the properties of an addition and a modified multiplication over aGF(n) continues to have the properties of a multiplication, be it with possibly different zero-and one- or neutral elements.

Figures 4, 5:
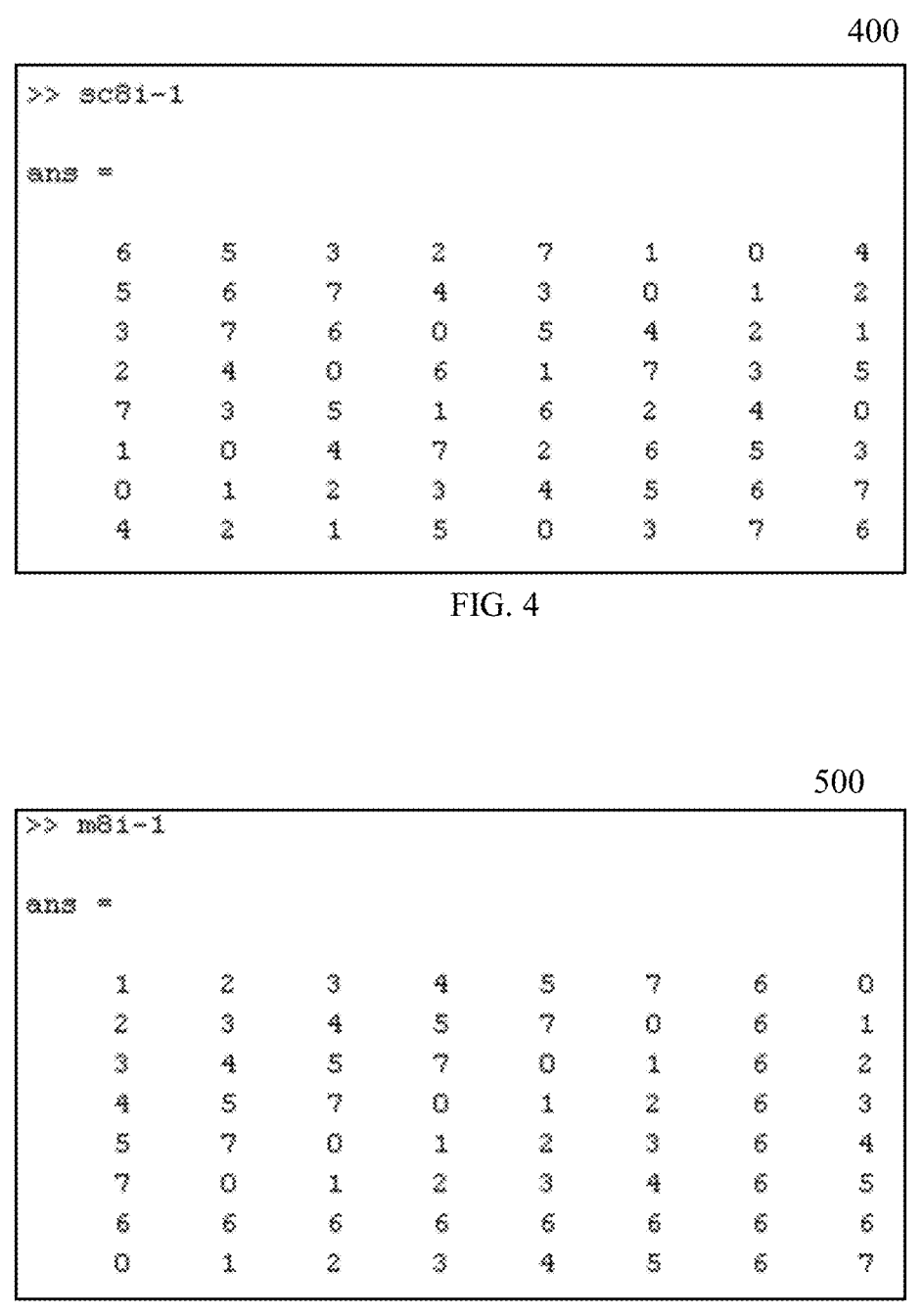
Figures 6, 7:
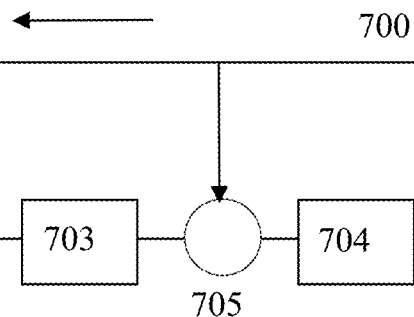
FIG. 6 is a screenshot of computer instructions that modify a switching table in accordance with one or more aspects of the present invention.
FIG. 7 illustrates a feedback shift register.

The 8-state switching table 400 in FIG. 4 shows a screenshot of the modified switching table 200 in origin 0. One can see that the element 6 is the zero element of switching table 400. FIG. 5 table 500 shows the 8-state switching table of m8i in origin 0 which is the modified table of m8. Herein element 6 is the zero element and 7 is the neutral element. One can test some of the finite field properties of aGF(8) (associativity and distributivity). FIG. 6 provides a screenshot 600 of the Matlab program that configures and enables the processor to realize the device of FIG. 1 in this 8-state example.

All operations that can be performed over a finite field GF(n) can be performed over the alternate finite field aGF(n). Furthermore, a modified addition of the alternate field $GF(n=2^p)$ is also the subtraction over the alternate finite field. In accordance with an aspect of the present invention the properties of the alternate finite field aGF(n) are kept confidential. For instance a cryptographic method applies one or more additions and/or multiplications over a standard finite field GF(n). A standard finite field GF(n) has as zero element for the addition 'scn' and the multiplication 'mn' the element 0. Thus scn(ak,0)=ak and mn(ak,0)=0 and the one element of the multiplication is 1 and thus mn(ak,1)=ak over a standard finite field. From the previous 8-state example it should be clear that sc8i(ak,6)=ak and m8i(ak,6)=6, while m8i(ak,7)=ak. So, an alternate finite field may be characterized by its zero element not being 0 and its one element not being 1.

The screenshot 600 in FIG. 6 illustrates a Lab-transform of 8-state functions sc8 and m8 which are an addition and a multiplication over GF(8) Lab-transformed with inv8=[2 3 4 5 6 7 0 1]+1 (origin 1), wherein sc8 and m8 are provided as illustrated in screenshot 200 in FIG. 2 and screenshot 300 in FIG. 3, respectively. A general n-state Lab-transform for an n-state switching table is provided in accordance with an aspect of the present invention in in screenshot 6300 in FIG. 48 in a general Matlab function labtransform(table,invert). A processor executing the instructions of this function is provided with an n by n n-state switching table 'table' and an n-state inverter 'invert.' Lines 10 and 11 determine 'n' from the dimensions of 'table.' Lines 18-21 determine the reversing (to identity) inverter of 'invert.' Lines 24-31 perform the Lab-transform and the Lab-transformed table 'tableinv' is outputted in line 32.

Figures 55, 56:
FIG. 55 shows a screenshot of a Matlab® program that performs steps in accordance with one or more aspects of the present invention.
FIG. 56 shows modified n-state switching tables that are generated and realized on a switching device in accordance with one or more aspects of the present invention.

Screenshot 7000 in FIG. 55 shows a Matlab program listing that generates an 11-state switching table in accordance with (eoffset-indexrow-indexcolumn) mod-11 and an n-state switching table in accordance with (indexrow*indexcolumn) mod-11. These 11-state switching tables are Lab-transformed in accordance with 11-state inverter invert 11=[6 9 4 2 1 11 8 7 10 3 5]. The Lab-transformed 11-state switching tables are shown in FIG. 56 screenshots 7101 and 7102. The switching tables in FIG. 56 are in origin 1.

It should be clear that many different modifications are possible, including those where the zero element remains 0 but the one element is not 1 or wherein the one element is 1 but the zero element is not 0. For instance the inverter [0 1 2 3 4 5 6 7]→[0 2 3 4 5 6 7 1] keeps the zero element as 0 but modifies the one element to 7. One may also change the field with an n-state inverter that keeps the zero element 0 and the one element 1.

Figure 50:

As illustrative examples of the Lab-transform the following modified 8-state switching functions are provided. The 8-state reversible inverter zz1=[3 1 5 7 2 0 4 6] is applied upon the table of 5300 in FIG. 41 and table 6400 of FIG. 49 with a Lab-transform, resulting in tables 6500 and 6501, respectively in FIG. 50. The 8-state reversible inverter zz2=[0 3 5 7 2 1 4 6] is applied upon the table of 5300 in FIG. 41 and table 6400 of FIG. 49 with a Lab-transform, resulting in tables 6502 and 6503, respectively in FIG. 50. In the above illustrative cases either state 0 or 1 is left unchanged. In on embodiment of the present invention both state 0 and state 1 are transformed in an n-state inverter applied in an n-state Lab-transform. The 8-state reversible inverter zz3=[6 3 5 7 2 0 4 1] is applied upon the table of 5300 in FIG. 41 and table 6400 of FIG. 49 with a Lab-transform, resulting in tables 6601 and 6602, respectively in FIG. 51 Table 5400 of FIG. 42 illustrates another modified 8-state switching table.

Figures 51, 52, 53, 54:

An n-state switching table may be characterized by scn (a,b)=(e-a-b) mod-n, wherein a and b are row and column index, respectively and e is an offset term mod-n (thus 0, 1, . . . , n−1) is self-reversing. That is if c=scn(a,b) then a=scn(c,b) and b=scn(a,c). An example is provided in table 5200 of FIG. 40. Table 6700 in FIG. 52 is a screenshot of an 8-state switching table generated from a table characterized by (7-a-b) mod-8 that is Lab-transformed with zz=[6 3 5 7 2 0 4 1]. Any Lab-transformed n-state self-reversing switching table is also self-reversing. Any Lab-transformed n-state reversible switching table is also reversible. Any Lab-transformed non-associative n-sate switching function is also non-associative. In certain cases it is advantageous to apply non-associative n-state switching functions, as it forces a particular order of signal processing by devices. In the alternative it is also true that any Lab-transformed n-state associative switching table is also associative.

Screenshot 6800 in FIG. 53 shows an 8-state switching table that is a Lab-transformed table characterized as a mod-8 addition switching table. The switching table characterized as a mod-8 addition is reversible, commutative and associative. The modified switching table in 6800 has also these properties. Any Lab-transformed n-state associative reversible switching table is also associative and reversible. Screenshot 6900 in FIG. 54 shows an 8-state switching table that is a Lab-transformed table characterized as a mod-8 multiplication switching table. The switching table characterized as a mod-8 multiplication is not reversible, commutative and associative. The modified switching table in 6900 has also these properties. Any Lab-transformed n-state associative and not-reversible switching table is also associative and not-reversible. The same applies to a set of switching tables that have distributive properties. When Lab-transformed, the transformed set of distributive switching tables and/or operations also have distributive properties.

In accordance with one or more aspects of the present invention the Lab-transformed n-state switching table is realized in a physical circuit being an addressable memory, a combinational circuit or a programmable processor with memory or storage.

It has been established that a Lab-transform as illustrated in FIG. 1 leaves certain properties of the Lab transformed switching table intact even when the representing states and/or their order are modified. The meta properties of one or more Lab-transformed switching tables are the same as the meta properties of the original (untransformed) switching tables. Meta properties include number of switching states, commutativity, associativity, reversibility, self-reversibility, having a neutral element 'e' so that op(a,e)=a and a zero element 'z' so that ap(a,z)=z, repeatability up$(a,a^k)$=e, invertibility so that ep$(a,a^{-1})$=e and distributivity of two switching tables. The terms 'op', 'ap', 'up' and 'ep' are shorthand for an n by n switching table and apply to any n-state element. It is to be understood that not every switching table has all meta properties, but may have only one, or have one or more meta properties. In certain cases an n-state switching table may have none of the above mentioned meta properties, and may still be useful for a certain purpose in Lab-transformed form.

The concept of performing a Lab-transformation on its face appears to be counter-intuitive. That is: modifying inputs with identical n-state inverters and then inverting back the output result of an operation on the modified inputs with an n-state inverter that reverses the inverter at the inputs to identity, may appear to be establishing an identity operation. That is: one may incorrectly believe that such a transformation would leave the original operation or table unaffected. But that is clearly not the case. One may try other transformations. For instance inverting the output result with the same inverter or with a different inverter that does not reverse the inverter at the inputs and it will generally also not preserve the meta-properties of a table or operation.

The specific states associated with a meta property of a switching table and/or switching operation may be changed by the Lab-transform. In particular the neutral states 'e' and 'z' may change in state, though the neutral states still exist. This is illustrated in an 8-state switching table 400 in FIG. 4 with neutral element state '6' which is a Lab-transform of another 8-state switching table with neutral element '0'. One may say that the original 8-state switching table 'sc8' has property sc8(a,a)=1 and the Lab-transformed table has sc8i-1(a,a)=6 or sc8i=7. The Lab-transformed table is still associative, reversible (self-reversing) and commutative and is distributive in relation to table m8i in table 500. The state of the neutral element has been modified by the Lab-transform, but the both the untransformed and Lab-transformed switching tables have a neutral element.

One is reminded that n-state switching tables provide labels or states of an output signal as a result of one or more input signals which are also labeled as states. Each one of n states corresponds to one of n different signals. But the state itself does not necessarily reflect the value or magnitude of its corresponding signal. For design and representation purposes, one commonly uses numeric symbols [0, 1, 2, . . . , (n−1)] as states. The numbers are commonly consecutive in order. Until a meaning is assigned to a signal, the switching table only indicates how different input signals generate an output signal. The physical meaning is provided by a device. For instance activating a key on a keyboard of a computer generates one or more signals. The symbol on the key that is activated may be 'a.' The physical signal generated by the activated key may be a generated scancode which in some PCs may be scancode hex 1E, which in binary is [00011110]. After accepting a scancode, a processor may convert the scancode to a standard ASCII representation which for the symbol 'a' is the 8-bit representation [01100001].

No matter what specific realization technology is used, all n-state switching tables can be represented with states ranging from 0 to (n−1). In accordance with an embodiment of the present invention each symbolic state in an n-state switching table corresponds to an actual signal characteristic. The characteristic may be a binary characteristic, expressed as L and H or 0 and 1, but are understood to correspond to a word of signals. Accordingly, an n-state switching table refers to an actual switching device that may be a combinational circuit or a memory circuit or a circuit in a processor. Transducers at input and/or output of a device determine what the physical meaning is of a signal that is represented entirely or in part by an n-state symbol. Processing of signals in accordance with different n-state switching tables in general will lead to different outputs. Accordingly, cryptographic devices provided in accordance with one or more aspects of the present invention are physical switching devices and n-state switching tables are a representation of a physical device. Methods provided in accordance with one or more aspects of the present invention are switching processes performed by physical machines.

What are some defining properties of the Lab-transformed n-state switching functions?

In accordance with one or more aspects of the present invention a step in a cryptographic operation is modified in accordance with a Lab-transformed n-state switching table or corresponding operations. A cryptographic operation but is not limited to data encryption, data decryption, message digest generation, message authentication, public key generation, digital signature generation. A size of n may be significantly different in different cryptographic operations. For instance 3DES and AES and certain hashing or message digest operations operate on relatively small size words of bits, for instance bytes. Other cryptographic operations operate on very large numbers, for instance RSA, Diffie Hellman and Elliptic Curve Cryptography commonly use numbers represented by for instance binary words of over 100 bits. The application of Lab-transformed n-state switching tables or Lab-transformed n-state switching operations in a standard cryptographic operation modifies the output result of such operation in an unpredictable way if the modification is not known. The provided keys or public parameters like public key, n, generating element, base element and message may be applied, but they will generate a different and unpredictable result when compared to the standard method. The modified approach benefits from the strengths of the standard approach and provides enhanced benefits by its further level of unpredictability when the applied Lab-transform is kept confidential.

There are two issues that are addressed next: 1) how is the Lab-transform implemented or realized, and 2) what are preferred properties of the Lab-transform or the resulting Lab-transformed operations?

Certain operations, such as SHA-2 or SHA-3 hashing and AES and 3DES have operations like bit-wise XORing that operate on for instance a byte of 8 bits or sometimes longer words. A byte operation is a 256-state operation. A 256-state Lab-transformed switching table occupies a memory size of 256*256*1=64 K bytes, which is not large in the context of memories with a size of Giga bytes. In those cases it is completely viable to store and retrieve switching tables on memory or storage device. One benefit is that Lab-transformed switching tables can be accessed directly in memory and there is no need to determine Lab-transforms and perform those on a processor. Cryptographic operations often involve "rounds" wherein the cryptographic operation is repeated to further diffuse and confuse data. In accordance with an aspect of the present invention at least two rounds in a cryptographic operation apply 2 different n-state Lab-transformed switching tables or operations of an original n-state switching table or operation. At a size of 64K B those switching tables are easily stored on a memory. However, at a larger size direct storage may be more constrained.

When n becomes fairly large in n-state switching, like at 32 bits words, storing an n-state reversible inverter will require $2^{32}*32$ bits. That is 16 Gbytes. That is possible, but may require too much memory for certain applications. The stored inverter is an $n=2^{32}$ state inverter. In one embodiment of the present inventing its reversing inverter is also stored. In one embodiment of the present invention elements of the reversing inverter are determined when needed from the n-state inverter, for instance by instructions as illustrated in lines 17-21 of screenshot 6300 in FIG. 48.

When n becomes large, for instance currently greater than 30 or greater than 50 or greater than 75, it may no longer viable to either store the n-state switching table or the n-state inverter corresponding to the Lab-transform. In that case it is preferable to apply a rule realized in a set of instructions that are performed by a stored program on a processor or in a combinational circuit, to determine an instance of an input transformed by an n-state inverter and its reversing rule to determine a transformed output state. Rules can be simple or complex. A simple rule is to add a number modulo-n to a state for inversion and subtract that number from a state modulo-n to reverse invert it. One may also invert by subtraction and reverse invert by addition. A rule may include some form of reversible transposition. An inversion rule may also involve XORing a binary representation of a word with a secret binary word. A radix-n number that is prime may be represented by a word of k bits, but the number n may not occupy all bit positions. For instance 19 is binary [1 0 0 1 1]. A modification may cause a number higher than 19. A number is not changed when the changed number falls outside the range.

A more complicated operation is a multiplication with a factor k mod-n. When n is a prime number, all multiplications by a factor k mod-n, except multiplication by 0, are operations that can be characterized by a reversible n-state inverter wherein state 0 is always inverted to 0. This 0 to 0 multiplication may be considered in some cases undesirable. This can be addressed by multiplication with a factor k, followed by an addition with a state p, all modulo-n.

The individual Lab-transform by mod-n multiplication modification and steps in accordance with one or aspects of the present invention are provided in Matlab function screenshots 7300, 7301 and 7302 in FIG. 57. The main Matlab function is labtransform_indiv_mod(i1,i2,k,plus,n) in 7300. The inputs are numbers i1 and i2, mod-n, the number k with which all numbers are multiplied mod-n and an offset plus which is added to the product mod-n. The inversion takes place in Matlab function ruleinv(i,k,plus,n) by Matlab instruction on line 6 in screenshot 7301. The reversing rule involves multiplication by the inverse of k which is kinv so that k*kinv=1. The inverse kinv is determined by a Matlab function modinvn on line 6 in 7302. This function executes Matlab standard function [a,b,c]=gcd(k,n) which returns the inverse as 'b'. In lines 7 and 8 the position in the inverter as vector is determined where r+plus mod n is 0 which is used in line 8 to calculate the reversing offset x in the reversing inverter. ((k*x)+plus) mod-n=0→(k*x) mod-n=(-plus) mod-n→(kinv*k*x) mod-n=kinv*(n-plus), because kinv*k=1:→x=kinv*(n-plus), which is the offset at the first position of the reversing inverter. The reversing inverter is thus the multiplier kinv mod-n with an offset x, as is determined in line 9 of 7302. This particular Lab-transform works for all values of n being a prime number.

In accordance with an aspect of the present invention a Lab-transform is provided for what is called a consecutive n-state multiplication. A consecutive n-state multiplication is characterized by the expression prod(i1,i2,n)=mod((i1+i2−1),n)+(((i1+i2−1)>=n)*1) for n>0 and prod(0,0,n)=0. Table 3200 in FIG. 30 shows part of a 27-state switching table that is characterized by the expression in provided for consecutive n-state multiplication. This operation is reversible, associative and has an inverse for which op(i,i$^{-1}$)=1, when the multiplication is represented as operation op. The inverse i$^{-1}$ of i is: i$^{-1}$=1 for i=1 and i$^{-1}$=(n−i+1) for i>1. The attractive property of this operation is that it can be applied for nay n, being prime or not-prime. Unfortunately, all states are very predictable, which may make it less attractive for cryptographic operations by itself. The operation may become more attractive if it is modified in a hard detect and unpredictable way by applying a Lab-transform. For relative small numbers (such as n=256) there are sufficient unpredictable 256-state inverters that can be stored and used. In applications such as RSA, Diffie Hellman and large number elliptic curve it is preferable that a rule based inversion and its reversing inversion rule are used.

The steps that are executed on a processor or by a combinational circuit are illustrated in FIG. 58 in screenshots 7400, 7401, 7402 and 7403. Screenshot 7400 illustrates the body of this individual n-state Lab-transform on inputs i1 and i2 with modification with factor k and offset 'plus'. On lines 6 and 7 of 7400 the instructions rule_inv_cons provide the inversion of inputs i1 and i2, respective, which is detailed in 7401. The inverted inputs are processed in accordance with the consecutive n-state multiplication on line 8 of 7400 and detailed in 7403. The result of that operation is reverse inverted on line 10 of 7400 by rule_rinv_consec as detailed in 7402. The operation of 7402 determines the inverse of k, named kinv on line 6 of 7402 and determines a relative shift of the consecutive n-state multiplication with kinv on line 8 and then performs that shifted multiplication on line 13 of 7402, thus completing the Lab-transform of 7400.

The consecutive n-state multiplication, which is an associative operation and has an inverse, can be applied for any value of n, not only for n is prime. The modulo-n addition can also be modified in accordance with the Lab-transform of 7400. However, the combination of a modulo-n addition and the consecutive n-state multiplication does generally not constitute a finite field or an extension of a finite field. In order to establish a finite field GF(n) for n is prime, one should use both the mod-n addition and mod-n multiplication. To establish an extension finite field GF($q^p$) with q a prime number, one may use the herein provided consecutive n-state multiplication in combination with an addition over GF($q^p$). If one uses the consecutive n-state multiplication in GF($q^p$) then it is required to match ordered states of a corresponding polynomial representation (or states of a corresponding n-state generating shift register with feedback) to generate the addition over GF($q^p$). For instance state [1 0 0 0] in a 16-state maximum length shift register with feedback may be the first state of the 15 states that this device generates. In that case, if one uses consecutive 16-state multiplication, [1 0 0 0] represents state 1 and not the "actual" decimal representation (which is 8) of the binary content. It has been shown elsewhere that a corresponding meta-state can be determined from a content of a shift register. For very large numbers this may be time consuming. The time limitation can be eased by storing intermediate states of the shift register and the corresponding meta state.

For very large numbers $q^p$ which are generally numbers $2^p$, or binary fields, one may use common binary representation and calculate multiplication products on a polynomial basis. Rapid architectures for binary polynomial multiplications are known and may be applied in combination with using common bit-wise XORing for the addition. Fast multiplication over a finite field, including over a binary finite field is known and is described in "Fast Software Exponentiation in GF($2^k$), C.Koc and T.Acar, Proceedings, 13th Symposium on Computer Arithmetic, T. Lang, J.-M. Muller, and N. Takagi, editors, pages 225-231, Asilomar, Cali., Jul. 6-9, 1997, Los Alamitos, Calif.: IEEE Computer Society Press." and "Efficient Finite Field Computations for Elliptic Curve Cryptography, Wangchen Dai, University of Windsor, Ontario, Canada, 2013" which are both incorporated herein by reference.

When a number is in GF($2^p$), then all numbers created by modifying one or more bits with an inverter as illustrated in diagrams 5500, 5600 and 5700 in FIGS. 43, 44 and 45 are also in GF($2^p$). For illustrative purposes switching tables are provided for the first 3 functions or devices of 5500 with outputs [c0 c1 c2] and the first three functions of 5600 or 5700 with outputs [d0 d1 d2], which are both 8-state switching tables. The 8-state table generated for [c0 c1 c2] represented in decimal form is illustrated in screenshot 5800 in FIG. 46 generated by a Matlab program and 5802 is the 8-state table generated by a Matlab program for [d0 d1 d2]. Both tables are significantly different.

One may not modify with inverters all bits of a prime number in a finite field GF(n) with n being a prime number. Accordingly, the binary inverter method is preferably applied to inversion of numbers over GF(n=$2^p$). The inversion rule as illustrated in FIG. 58 can be used for any Lab-transform. While it is illustrated with a consecutive n-state multiplication, it can also be applied to any n-state reversible operation, for instance a mod-n addition or an addition or multiplication over GF(n=$2^p$) or a multiplication mod-n when n is prime. The same applies to the inversion rule illustrated in FIG. 57. The only limitation is that n is a prime number. Accordingly, the consecutive n-state multiplication can be Lab-transformed with the method illustrated by FIG. 57 when n is prime.

Other rules can be formed. For instance, from the operation scn(a,b)=(e-a-b) mod-n, a row or column characterized by inv(i)=(r-i) mod-n may be applied for inversion. This inverter is self-reversing and reversing inversion rule 'filly' is identical to the inversion rule. This inversion rule can be applied for any n.

A next issue is what a preferred n-state switching function or n-state switching table should be. For illustrative purposes the original n-state switching function or switching table realized on an electric circuit or apparatus is indicated as c=os(a,b), 'c' is the n-state output signal, 'os' indicates the function or table and 'a' and 'b' are n-state input signals. A result of a Lab-transform is that an n-state switching function lab' is created characterized by a Lab-transformed n-state switching table and by an expression d=lab(a,b) with 'd' an n-state output signal, lab' indicates the Lab-transformed n-state function or table and 'a' and 'b' are n-state input signals. The meta-properties of 'os' and lab' are the same but may not have the same states or values. That is lab' and 'os' may both be associative and have a zero-element 'z' so that os(a,z1)=z1 for any state of 'a' and lab(a,z2)=z2 for any state of 'a'.

a) wherein os(0,0)=0 and the Lab-transformed n-state table/switching function lab(0,0)≠0;

b) wherein os(0,0)=0 and os(1,a)=a for any n-state 'a' and the Lab-transformed n-state table/switching functionlab(0,0)≠0 and lab(1,a)=a for any n-state 'a';

c) wherein os(a,1)=a for any n-state 'a' and the Lab-transformed n-state table/switching function lab(k,a)=a for any n-state 'a' and k≠1;

d) wherein os(0,0)=0 and os(1,a)=a for any n-state 'a' and the Lab-transformed n-state table/switching functionlab(0,0)≠0 and lab(k,a)=a for any n-state 'a' and k≠1;

e) wherein os(a,a)=c0 for any n-state 'a' and the Lab-transformed n-state table/switching function lab(a,a)=d0 for any n-state 'a' and d0≠c0;

f) wherein lab(a,b) is characterized as an addition over alternate finite field GF(n) wherein its neutral element is not represented by a 0 state or an all 0-bits word;

g) wherein lab(a,b) is characterized as a multiplication over alternate finite field GF(n) wherein its neutral element is not represented by a 0 state or an all 0-bits word;

h) wherein lab(a,b) is characterized as a multiplication over alternate finite GF(n) wherein the zero element is not represented by a 0 state or an all 0-bits word and wherein the neutral element is not represented by the state for a binary word that represents state 1;

i) wherein lab(a,b) is characterized as a multiplication modulo-n wherein the zero element is not represented by a 0 state or an all 0-bits word;

j) wherein lab(a,b) is characterized as a multiplication modulo-n wherein the neutral element is not represented by the state 1 or a binary word that represents state 1;

k) wherein lab(a,b) is characterized as being Lab-transformed from a consecutive n-state multiplication and wherein the zero element of lab(a,b) is not represented by a 0 state or an all 0-bits word;

l) wherein lab(a,b) is characterized as a consecutive n-state multiplication wherein the neutral or one-element is not represented by a 1 state or a binary word that represents state 1;

m) wherein lab(a,b) is characterized as an n-state multiplication over an extension finite field wherein the neutral or one-element is not represented by a 1 state or a binary word that represents state 1;

n) wherein lab(a,b) is characterized as an n-state multiplication over an extension finite field wherein the zero-element is not represented by a 0 state or a binary word that represents state 0;

o) wherein lab(a,b) is characterized as an n-state addition over an extension finite field wherein the neutral or one-element is not represented by a 0 state or a binary word that represents state 0;

p) wherein lab(a,b) is characterized as an n-state reversible function that is not an associative function and not all elements in a row of the 'lab' n-state switching table are consecutive modulo-n.

q) wherein lab(a,b) has one of the properties a-p as provided above and has a meta-property selected from the group consisting of: reversibility, associativity and distributivity.

r) wherein lab(a,b) is Lab-transformed from a consecutive n-state multiplication function and lab(a,b) itself is not a consecutive n-state multiplication;

s) wherein lab(a,b) is Lab-transformed from n-state function os(a,b) and lab(a,b)=os(a,b) for a=0 and a=1 and all states of b and are different for at least 2 other states of a;

t) wherein lab(a,b) is Lab-transformed from n-state function os(a,b) and lab(a,b)=os(a,b) for a=0 and a=1 and all states of b and are different for at least 3 other states of a;

u) wherein lab(a,b) is Lab-transformed from n-state function os(a,b) and lab(a,b)=os(a,b) for at least 2 states of a and all states of b and are different for at least 2 other states of a;

v) wherein lab(a,b) is Lab-transformed from n-state function os(a,b) and lab(a,b)=os(a,b) for at least 3 states of a and all states of b and are different for at least 2 other states of a.

In accordance with an aspect of the present invention a Lab-transform is performed on n-state data signals as illustrated in FIG. 1. In that regard there is no doubt that the resulting operation or switching table is a Lab-transformed operation. As provided above, a Lab-transformed operation or switching table may be determined and realized in a memory and/or combinational circuit. This is the case for n is relatively small, for instance for n=256 or n=$2^8$ or n=$2^p$ with p not greater than 32. A similar situation may arise for n=$2^p$ with p>1 wherein one or more bits in a binary word are modified by a binary inverter. In accordance with an aspect of the present invention an n-state switching operation or switching table has at least one of the above properties a-v, is reversible and is associative. In accordance with an aspect of the present invention an n-state switching operation or switching table has at least one of the above properties a-v, is associative and can be characterized as a multiplicative group. In accordance with an aspect of the present invention an n-state switching operation or switching table has at least one of the above properties a-v, is reversible and is associative and can be characterized as an additive group. In accordance with an aspect of the present invention an n-state switching operation or switching table has at least one of the above properties a-v, is reversible and is associative and has a corresponding n-state switching operation and/or switching table that together can be characterized as defining a finite field. In accordance with an aspect of the present invention all resulting n-state switching table and/or switching operations are excluded that are known. One may use an unknown table or operation and Lab-transform it into a known operation. Such a known table and/or operation does of course not contribute to making a cryptographic operation more unpredictable.

The input n-state signals 'a' and 'b' and the output n-state signal can be represented by an n-state symbol such as in decimal representation [0, 1, 2, . . . , (n–1)]. In general processors and circuits operate on binary signals that can be represented by their bit representation in 0s and 1s. In one embodiment of the present invention a 0 symbol is represented as an all 0 word. A 1 symbol is often represented as a binary word of bits with the least significant bit being 1. The representation of symbols may be different in for instance polynomial representation.

One way to represent the functions over a finite field is by way of the switching tables of these functions. It is known that elements (and their order) in a finite field can be generated by shift registers with feedback that are defined by primitive polynomials of degree k over a finite field GF(p) with p being a prime number or, in case of an extension field wherein p=$q^m$ with q a primitive number. The elements are usually described as polynomials over GF(p). For instance in a 16-state case, each element is generated by a feedback shift register defined by a primitive polynomial which is irreducible of degree 4. One such polynomial is: m(x)=$x^4$+x+1 over GF(2). A corresponding binary feedback shift register is shown in FIG. 7. Starting from an initial shift register state (for instance [0 0 0 1]) feedback shift register 700 with register elements 701, 702, 703 and 704 and XOR device 705 generates 15 different contents of the shift register after which it repeats. The state [0 0 0 0] in this case is the forbidden state and can be designated as the 0 element of the generated field.

FIG. 8 shows a table 800 which is the shift register content (consh-1) of the device 700 starting at initial content [0 0 0 1] for 16 steps thus ending up at the initial content [0 0 0 1] at step 16. The table is generated on a display by a processor executing a Matlab program. The –1 in 'consh-1' comes from origin 1 requirements in Matlab. The adjacent table 801 shows the presentation of the shift register states as polynomials of maximum degree 3.

In accordance with an aspect of the present invention there are at least three different, but equivalent, ways to process elements of a finite field determined by a primitive polynomial.

The first way is to process the representing polynomials of the elements in accordance with the requirements of the constituting field. So, in the 16-state case for addition one adds the polynomials in accordance with the addition of the binary finite field (which is the XOR). Because the coefficients of each term in the describing polynomial is 0 or 1, the addition is the XORing of corresponding coefficients. The result is automatically modulo-primitive polynomial or mod- m(x)=$x^4$+x+1 in the 16-state case. The multiplication of two elements is the remainder of multiplication of two polynomials modulo-primitive polynomial or mod- m(x)=$x^4$+x+1 in the 16-state case. For instance [1 1 0 1]*[1 1 1] over GF($2^4$) is ($x^3$+$x^2$+x)*($x^3$+$x^2$+x+1) mod ($x^4$+x+1), which is ($x^6$+$x^4$+$x^3$+x)-mod ($x^4$+x+1)=($x^2$+1) or [0 1 0 1]. This process can be performed on a programmable processor and different methods are available in the literature. An example how to program polynomial multiplications over a finite field (in casu GF(256=$2^8$)) is provided in detail including Java code by Neal R. Wagner on a website dated 2001 with URL http://www.cs.utsa.edu/~wagner/laws/FFM.html which is incorporated herein by reference.

A second method applies the order of the elements as generated by the feedback shift register. For instance element [1 1 1 0] is called 5, while the binary value of [1 1 1 0] is 14. The element 15 has as binary value 2. The assigned values of 0 to 15 are maintained in tables after initial assignment. The addition is first performed in binary XOR, but the resulting value is converted back into the assigned value. For instance XORing [1 0 0 1] and [0 1 1 1] results in [1 1 1 0]. The actual values are respectively 9, 7 and 14. From that perspective the addition over GF(16) of [1 0 0 1] and [0 1 1 1] would generate the decimal value 14 or 9⊕7→14. However [1 0 0 1] represents the element 2 and [0 1 1 1] represents 6 while [1 1 1 0] represents 5. Thus in a table sc16 the operation would be sc16(2,6)=5. This operation can easily be performed by a processor and the decimal representation of the 'addition' modified in accordance with the order of element generation is shown in 16-state switching table 900 in FIG. 9.

The advantage of renaming the elements of the field shows up in the table that represents the multiplication. Multiplication is in fact a number of steps in a feedback shift register from a set initial condition. (one may call this also a logarithmic representation or n-state consecutive multiplication). For instance 2 multiplied by 5 in GF(16) is placing the binary state representing 2 in the shift register and then running the shift register for 5 cycles which will create a state represented by 7. The states will cycle sequentially through representations 1-15. Representation 0 is a state wherefrom all states will remain 0. Running through all possible states generates the multiplication table 1000 in GF(16) as provided in FIG. 10. This provides a regular and predictable table that can be easily generated by fixed steps. The steps are shown for the 16-state case in screenshot 1100 of a Matlab program in FIG. 11. The steps can be easily adjusted for any m in GF($2^m$).

A second table based representation is to keep the decimal representation of binary elements of the finite field as the order of the elements. That means that no "translation" of elements is required and that binary words represent the actual order of elements in the field. The resulting "addition" table 1200 of sc16 is shown in FIG. 12 as a screenshot result of a Matlab program. The unmodified order of finite field elements affects a corresponding multiplication table. The corresponding multiplication table van be determined by using the above polynomial remainder method and the resulting "multiplication" that defines GF(16) is shown in switching table 1300 in FIG. 13 which is the result of an executed Matlab program of which FIG. 13 is a screenshot of a display.

A third method is by executing the XORing and polynomial remainder multiplication without translating and storing in a decimal (or as also used a hexadecimal) table. This allows results to be calculated without having to store a complete addition and multiplication table. In many applications availability of easily accessible switching tables is beneficial and for instance facilitates inversion. However, in some applications very large finite field are used, for instance wherein an element is represented by over 100 bits. In those cases table storage is not desirable.

In the following sections it will be shown how Lab-transformed n-state switching operations and/or switching tables can be used in cryptographic devices such as for Elliptic Curve Cryptography and public key cryptography Elliptic Curve Cryptography (ECC) is known and is used in different configurations, for instance in public key cryptography and includes but is not limited to elliptic curve Diffie-Hellman (ECDH), Elliptic Curve Integrated Encryption Scheme (ECIES), The Elliptic Curve Digital Signature Algorithm (ECDSA), The Edwards-curve Digital Signature Algorithm (EdDSA), The ECMQV key agreement scheme and others. Different types of fields are used to calculate points on a curve and different types of curves have been and are defined over finite fields. The usefulness of ECC is derived from the Elliptic Curve Discrete Logarithm Problem (ECDLP) and the intractability to solve the ECDLP problem over a finite field Fp faster than $O(\sqrt{p})$.

In Elliptic Curve Cryptograph (ECC) parties must use the same elliptic curve, defined by its domain parameters, which are provided as (p,a,b,G,n,h) for a prime field and (m,f(x), a,b,G,n,h) for extension fields which commonly are binary extension fields but in accordance with an aspect of the present invention are extension fields of any prime number. Herein p is a prime number defining the finite field; a and b are the curve parameters as in $y^2=x^3+ax+b$ (mod p) for the prime field and $y^2+x.y=x^3+ax^2+b$ (mod-f(x)) for a binary extension field which preferably is nonsupersingular; G is (xG,yG) which is a base point, n is the order of G; h is the cofactor; m is the power of p which is usually 2; f(x) is a polynomial of degree m that defines the finite field. One is reminded that the previous curves are among the most widely used. However, many other curves, including Hessian, Edwards, twisted and other curves exists, which are also covered by aspects of the present invention using Lab-transforms.

The following shows how to apply an alternate finite field to elliptic curve procedures. As an illustrative example the field GF($2^4$) will be used. The field will be applied to create an elliptic curve in accordance with the polynomial equation $y2+y.x=x^3+ax^2+b$. The selected curve is $y^2+yx=x^3+6x^2+1$. The point on the curve are determined using the finite field GF($2^4$) defined by the 16-state operations whereof the switching tables are provided in FIGS. 9 and 10. One is reminded that thus all arithmetical operations such as the '+' and '.' and '$y^2$', '$x^3$' and '$6.x^2$' operations are performed in accordance with the tables of FIGS. 9 and 10.

The known literature on elliptic curves provides the formulas for point addition and point doubling on an elliptic curve. The following formulas provides point addition and point doubling for elliptic curves over GF($2^m$) which may be defined by an irreducible or primitive polynomial of degree m.

Curve: $y^2+y.x=x^3+ax^2+b$ for finite field GF($2^m$) with points P(x1,y1) and Q(x2,y2) on the curve for R=P+Q wherein R has coordinates (x3,y3). The following expressions provide points addition and point doubling (R=2P with P=Q).

$$x_3 = \begin{cases} \left(\frac{y_1+y_2}{x_1+x_2}\right)^2 + \frac{y_1+y_2}{x_1+x_2} + x_1+x_2+a; P \neq Q \\ x_1^2 + \frac{b}{x_1^2}; P = Q \end{cases}$$

$$y_3 = \begin{cases} \left(\frac{y_1+y_2}{x_1+x_2}\right)(x_1+x_3)+x_3+y_1; P \neq Q \\ x_1^2 + \left(x_1+\frac{y_1}{x_1}\right)x_3+x_3; P = Q \end{cases}$$

The operations '+' and '.' are performed in accordance with the addition and multiplication over finite field GF(2). An m-bit word may be represented by a symbol as explained earlier above and the '+' and '*' operation have then to be performed in accordance with the corresponding switching tables and/or operations. One may also perform the operations on m-bit words wherein each word is considered to represent a polynomial and all operations have to be performed in accordance with modulo—'the generating polynomial.'

A generalized equation for an elliptic curve is $y^2+a1xy+a3y=x^3+a2x^2+a4x+a6$. The determining field has a characteristic 2, hence the curve $y^2+y.x=x^3+ax^2+b$.

The determination of (x3,y3) requires addition, multiplication and squaring and division or inversion. A division by an element is the same as multiplication with its inverse.

FIG. 14 table 1400 shows a screenshot of a list of points on the curve $y^2+yx=x^3+6x^2+1$ over the field GF(16) generated by generating polynomial $x^4+x+1$ starting with initial content [0 0 0 1]. The first 2 columns show the elements in GF(16) that comply with the curve. The fourth column shows (x1+y1) of (5,2) which is 6 and so (5,6) is the inverse of (5,2). All points are represented in Matlab origin 1, and thus a 1 should be subtracted for an origin 0 representation. The use of switching tables has considerable advantages. A processor does not have to perform polynomial multiplications which are time consuming. Furthermore, the multiplicative inverse of the multiplication which is needed for the point addition and doubling does not need to be calculated but is stored in a table. Commonly, the extended Euclidean algorithm is applied to determine an individual multiplicative inverse.

The multiplication table over GF(16) is shown in FIG. 10. In accordance with an aspect of the present invention the multiplicative inverses of the 'logarithmic' presentation of the multiplication over GF($2^m$) illustrated for GF(16) in FIG. 10, the multiplicative inverse is easily determined in accordance with an aspect of the present invention. The table in FIG. 16 is a screenshot of a Matlab generated switching table in origin 0. The multiplicative inverse pair of the multiplication $(x*x^{-1})=1$ enables in accordance with an aspect of the present invention to determine an multiplicative inverse. The row and column index (x,y) of the table of FIG. 10 for which the output is 1 in origin 0 forms a multiplicative inverse pair. Per definition the inverse of 0 is 0. The inverse of 1 is 1. From the table one can read that the inverse of 5 is 12 in GF(16).

The inverse has a regular form that is calculated in a program, for instance in Matlab. The script of such a program is shown in a screenshot 1600 in FIG. 16 for origin 1. The formula that is applied is minv16(i)=16-i+3. This approach can be applied for multiplicative inverses of all GF(n=$2^m$) using the 'logarithmic' representation through: 'minvn(i)→n-i+3' wherein i is the column (or row) index and minv is the corresponding row (or column) index so that i*minvn(i)=2 in origin 1. The first 2 inverses (for 1 and 2 in origin 1) are always 1 and 2. When GF(n) is not too large, for instance m=20, the inverses can be stored in a memory. For the 16-state case: minv16=[1 2 16 15 14 13 12 11 10 9 8 7 6 5 4 3].

In order to perform the above n-state multiplication inversion rule with tables, it is required to apply the element 'value' substitution as affected in the table of FIG. 9. The table approach can be used in elliptic curve calculations by applying an n-state inverter that defines the decimal 'value' equivalent of a binary word. For instance the binary word [1 0 0 1] represents the 'value' 3 in the switching table of FIG. 9 while its 'true' decimal value is 9. As an illustrative example, a modification vector for this field is el 16d=[0 1 9 13 15 14 7 10 5 11 12 6 3 8 4 2]. This vector is determined by positions of elements (0 . . . 15 in origin 0 and 1 . . . 16 in origin 1) and the decimal 'value' or label in that position. For convenience real decimal values are used as these are easier manipulated by a programming language such as Matlab. The vector el 16d thus provides a value 2 (position origin 0 in the vector) for the binary word of which the equivalent decimal value is 9. If desired, the bit words are XORed and transformed back to the 'value' presentation by the inverse vector that uses now the value as index and the position as content. This is illustrated in the 16-state case by a decimal inverse vector i16i=[0 1 15 12 14 8 11 6 13 2 7 9 10 3 5 4].

In accordance with an aspect of the present invention, finite field operations over a finite field GF($q^m$) including GF($2^m$) are performed by using transformation vectors and operational rules, without generating the complete modified addition and multiplication tables. For the n-state case the n-state switching tables are of size n by n, wherein, in for instance the binary case, each element in the table requires up to m bits. This may overwhelm the storage capacity of a computer. The vectors each are only 1 by n elements of for instance m bits. The savings in storage space are countered by a not prohibitive increase in processing time. For instance assume a field over GF($2^{20}$) which has over 1 million elements. Each operational table (addition and multiplication) may require $20*2^{20}*2^{20}$ bits or about $2^{45}$ bits or about 3,000 Gigabyte memory. A vector for that field requires $20*2^{20}$=20 million bits or about 3 Mbyte, which is very manageable.

Table 1500 in FIG. 15 shows point doubling of all the points on the curve. It uses the condition that the inverse of 0 is 0. The tables 1700 and 1800 in FIGS. 17 and 18 show lists of generated points P, 2P, 3P etc. for a base point P, followed by double point 2P in accordance with table 1400, followed by calculated points "previous point+P" of which 2P+P is identified.

In elliptic curve systems of key exchange and other elliptic curve cryptographic systems, security is derived from the intractability of matching a generated public key kG with a base point G to determine k. An elliptic curve cryptographic system wherein an elliptic curve has around 1 billion to 10 billion points and wherein the base point is kept secret has sufficient security at least for a period of months or even years if attacks are performed with pc type machines.

In accordance with an aspect of the present invention the intractability of finding a term k in kG, wherein k is a private key, in elliptic curve cryptography, is further enhanced by applying an n-state inverter. In accordance with one aspect of the present invention published points over a finite field GF($q^m$) are modified with a secret n-state inverter. In one embodiment of the present invention all published points are reversibly modified with an n-state inverter. For instance each point that is published (i.e. the base point if published and the public keys) is modified. In an embodiment of the present invention only one or two public keys are modified with the same n-state inverter and the base point is left unchanged. In an embodiment of the present invention only the base point is modified with an n-state inverter. In an embodiment of the present invention at least one of public keys and the base point are modified with an n-state inverter. In one embodiment of the present invention if a public key or a base point is modified, then each modification is different. In one embodiment of the present invention a modification is a shift of constituting elements. For instance in the 16-state case a point on an elliptic curve has 'value' 5. The representation of this 'value' is [1 1 1 0] (see in FIG. 8). A modification may be a shift to the left of 2 positions, i.e. [1 0 1 1]. This is the same as XORing with [0 1 0 1].

The 16-state case is provided herein for illustrative purposes as being easy to follow and display. A size of a public key or base points in elliptic curve cryptography may be several hundred bits, usually represented in hexadecimal symbols. In accordance with an aspect of the present invention only part of the public key, indicated by position of the bits or hexadecimal symbols are modified. All modifications have to be reversible. Inversion rules as provided herein above are applied to create operations over an alternate finite field. A receiving side is provided with the modifications which are reversed at the receiving side. In an embodiment of the present invention a modification includes one or more domain parameters of an elliptic curve, which includes the 'a' and 'b' parameters.

In order to prevent cryptanalysis, a modification itself is changed, for instance based on a time or number of cryptographic activities or any other verifiable event that is coordinated or at least accessible by cryptographic parties.

In one embodiment of the present invention, points on an elliptic curve are generated over an alternate finite field GF($q^m$) for instance with q=2 in accordance with a reversible n-state inverter. In one embodiment the operations of the alternate finite field are generated in accordance with a Lab-transform as illustrated in FIG. 1. Because the number of reversible n-state is n!, even for relatively small numbers of n, say q=2 and m=8, there are 256! reversible inverters. This number is greater than $10^{100}$. When the applied n-state inverter is kept secret, even at relatively short size keys of for instance 20 bits, the reconstruction of the curve becomes very difficult.

To illustrate using an alternate finite field aGF($q^m$) wherein in one illustrative example q=2 in elliptic curve cryptography a 16-state example will be provided. It is to be understood that aGF(16) is a relatively small field and is only provided for illustrative purposes. The approach provided in accordance with an aspect of the present invention is applicable to much larger fields.

In accordance with an aspect. In accordance with an aspect of the present invention a curve is generated over an alternate finite field aGF(n=$2^4$) by applying a 16-state reversible inverter. The reversible inverter in origin 0 to create the modified functions is inv16=[5 6 7 8 9 10 11 12 13 14 15 0 1 2 3 4]. Its reversing inverter in origin 0 is rinv16=[11 12 13 14 15 0 1 2 3 4 5 6 7 8 9 10]. Applying inv16 and rinv16 to the device of FIG. 1 generates the switching functions isc16 and im16 that define aGF(16) and of which a screenshot as generated by Matlab are shown as tables 1901 for isc16 and 1902 for im16 in FIG. 19 in origin 0. The 0-element of isc16 is 11 and the 0-element of im16 is also 11, while the 1-element of im16 is 12. A screenshot 2000 of a Matlab program listing that generates the switching tables of operations isc16 and im16 is shown in FIG. 20.

A curve over this aGF(16) is defined by $y^2 \oplus (y \otimes x) = x^3 \oplus (11 \otimes x^2) \oplus 6$ wherein $\oplus$=isc16 and $\otimes$=im16, wherein a$\oplus$b=isc16(a,b) and a$\otimes$b=im16(a,b) in Matlab notation (all executed in origin 1)

In case it is not possible or not desirable to use tables, but rather calculations, a value of isc16 or im16 is determined by modifying words of bits with a binary representation of an n-state inverter. For instance, each symbol or word of bits is modified by adding (XORing) 4 or [0 1 0 0] at the input. To complete the modification the output result should be reversed by the inverse of [0 1 0 0] in this example. Because XORing is self reversing, applying the reversing inverter 103 of FIG. 1 is the same as again XORing [0 1 0 0] to the output. This is simple for both addition (which is XORing of words of bits) and the mod-polynomial procedure described earlier. It is possible to select simple inversions that generate symmetric results. For instance the inverting inverter inv16 is a sum-mod16 of each value with 4. The multiplicative inverse $a^{-1}$ of symbol a in aGF(16) is defined as $a \otimes a^{-1}$=12. Table 1902 of im16 shows that the multiplicative inverse in this finite field is defined as regular diagonals shown in 1902 as circle marks. The regular pattern is interrupted at the zero-element (11) wherein the multiplicative inverse of 11 is 11 (as 0 has 0 as inverse). Screenshot 2100 in FIG. 21 shows a program in Matlab to generate the multiplicative inverse vector munv.

The elliptic curve over aGF(16) is different from the earlier one over GF(16). The generated points will be different from the earlier curve. Because vectors are used the quadratic results ($x^2$=im16(x,x)) and the cubed results ($x^3$=im16($x^2$,x)) are stored in vectors, but can also be determined on the fly.

Screenshot 2200 in FIG. 22 shows a program in Matlab to generate the points on the elliptic curve $y^2 \oplus (y \otimes x) = x^3 \oplus (11 \otimes x^2) \oplus 6$ over alternate finite field aGF(16). The points are shown in screenshot 2300 in FIG. 23 generated by the Matlab program in FIG. 22. It shows the x and y coordinates as well as test condition 'test' which is 0 if a point is not on the curve. There are 23 points identified on the curve. An additional test is if point additions (P, 2P, 2P+P, etc.) generate useful results. FIG. 24 shows a screenshot 2400 of a Matlab program that generates all point doubling of all points on the curve. Screenshot 2500 in FIG. 25 shows the points coordinates of the points 2P. Screenshot 2600 in FIG. 26 shows the points generated from base point (9,15) (all coordinates are in origin 1). The Matlab program that generates this and other tables is shown as screenshots 2701 and 2702 in FIGS. 27A and 27B. It can be seen in line 167 of screenshot 2702 that a number 99 is generated when previous point and base point have the same x-coordinate. This can be used as a test if the cofactor is small enough.

Similar calculations can be done for different curve parameters, different basepoints and different reversible 16-state inverters of which there are 16! (about $2*10^{13}$). In accordance with an aspect of the present invention at least the reversible inverter, and the basepoint are kept secret. In accordance with an aspect of the present invention also the curve parameters are kept secret. In accordance with an aspect of the present invention an element in a finite field GF($2^m$) and alternate finite field aGF($2^m$) is represented by not more than 4 bytes or 32 bits. This allows significant data to be stored in memory to be used in elliptic curve cryptography over binary finite fields with limited calculations, especially as it relates to multiplicative inverses and multiplications. It also allows to have a computer program run through all points on the curve and to select a best curve and best base point. A disadvantage of a relatively small number of points, compared to 300 bits elements, is countered by the enormous number of possible reversible n-state inverters.

In accordance with an aspect of the present invention a reversible inverter is built from "components." For instance Matlab has a statement 'perms(xx)' that generates all permutations of symbols in xx. A vector xx may have 10 different symbols for which all permutations are generated and from which one permutation is selected. A component of an inverter with t*10 symbols may be constructed by concatenating t permutations until t*10 is reached. The symbols in each concatenation vector are summed with k*10 to ensure that no duplicative symbols will occur.

In one embodiment of the present invention a number of n-state inverters is generated off-line and stored in a particular order. Pairs of n-state inverters are generated and stored on at least 2 devices that will exchange key data. At least one rule, for instance time or number of times used based, is stored on each machine to make sure that the 2 devices apply the same data, such as curve domain parameters and n-state inverters. In one embodiment of the present invention a device has access to at least 10, more preferably to at least 100, even more preferably to at least 1000, even more preferably to at least 100,000, even more preferably to at least 1,000,000 and most preferably to at least 100,000,000 reversible n-state inverters or inversion rules. In accordance with an aspect of the present invention a specific n-state inverter is only used in one complete cryptographic operation such as coding, decoding, authentication, access control and the like. Once a cryptographic operation is completed, access to the used n-state inverter or a corresponding rule is disabled. In one embodiment of the present invention use of a previously used n-state inverter is only enabled after all other available n-state inverters have been applied.

The above explained table and the vector approach can be used for any GF($p^m$) and aGF($p^m$) with p being a prime number. The tables for larger field such as GF(64) become unwieldy for display on paper. To illustrate the viability in a further illustrative example, a partial list of points on the curve $y^2+xy=x^3+2x^2+2$ generated by a Matlab program over a finite field GF($2^6$=64) defined by the polynomial $x^6+x+1$ is shown in screenshot 2800 in FIG. 28. This elliptic curve has 55 points of which 23 points with (x,y) coordinates are shown.

FIG. 29 in screenshot 2900 shows a number of points of the elliptic curve $y^2 \oplus (y \otimes x) = x^3 \oplus (11 \otimes x^2) \oplus 3$ over the alternate finite field aGF(64) which is created by modifying the previous finite field GF(64) with inverter inv64=[6 7 8 9 10 11 12 13 14 15 16 17 18 19 20 21 22 23 24 25 26 27 28 29 30 31 32 33 34 35 36 37 38 39 40 41 42 43 44 45 46 47 48 49 50 51 52 53 54 55 56 57 58 59 60 61 62 63 64 1 2 3 4 5]. The elliptic curve has 67 points of which 25 are shown in FIG. 29. All coordinates are generated by Matlab in origin 1.

In accordance with an aspect of the present invention a processor generates one or more points on an elliptic curve defined over an alternate finite field aGF(p) wherein p is a prime number greater than 3. The alternate finite field is created from a standard prime field modified with a p-state reversible inverter. In previous illustrative examples an n-state or p-state inverter was created by for instance adding modulo-n a number to each element of the identity inverter. This has as effect that the 0 element and the 1 element are still consecutive. In accordance with an aspect of the present invention an n-state (or p-state) inverter is applied that does not have zero element and one element as consecutive elements. In an illustrative example the 17-state (or mod-17) addition and multiplication are modified with inverter: inv17=[5 7 1 6 8 9 10 11 12 13 14 15 16 17 2 3 4] in origin 1 in accordance with the device and/or method as illustrated in FIG. 1. From the inverter it can be seen that the zero element (1 in origin 1) is inverted into 3 in origin 1 (or 2 in origin 0) and the one element (2 in origin 1) is transformed to 15 in origin 1 (or 14 in origin 0). For illustrative purposes the multiplication switching table im17 is shown in screenshot 4200 in FIG. 31 wherein it is clear that row 3 and column 3 represent the zero element and row and column 15 represent the one element or identity.

Screenshots 4301 and 4302 in FIG. 32 show point doubling on curves $x^3+2x+2$ over GF(17) and $x^3 \oplus 3x \oplus 15$ in origin 0 over finite field aGF(17) in accordance with inv17. Because of the transformation the zero element is not 0. One should consider this when publishing any point.

It has been demonstrated above that in accordance with various aspects of the present invention reversible n-state inverters can be used to create an alternate finite field aGF(n) with n a prime number or n being $p^m$ to create points on an elliptic curve and perform operations on these points, like point doubling, point tripling and point addition. In accordance with an aspect of the present invention any other operation that can be done with points of an elliptic curve over a finite field GF(n) can also be done with points on an elliptic curve defined over an alternate finite field. The reason should be clear to one of ordinary skill because an alternate finite field is a finite field for which the same properties apply.

For instance a key of 24 bits may generally not provide sufficient security. With current technology it is simple to generate and try any of 16 million 24 bits words. Accordingly, for instance off-line or time unlimited cryptanalysis may allow a processor to try and check any of 16 million 24 bits words. The situation is different if there is a lock-out after a limited number of trials. In that case it is required to know how to generate the right word. Elliptic curve cryptography at word length of 24 with standard finite field operations would be considered insecure. In accordance with an aspect of the present invention, an applied reversible inverter used to generate an alternate finite field and elliptic curve points over such field is kept secret. Even if all other parameters of the elliptic curve cryptography are published then still reconstruction of points on the curve would be difficult. This is because there are at least $2^{100}$ different n-state inverters with n around 16 million. Factorization or addition of a base point P to find k in kP is very doable for a field of size of 16 million elements. However, reconstruction without knowing the actual inverter that is applied is much harder and most certainly cannot be achieved in real time during access control or information requests.

One difference between known ECC and aspects of ECC as provided herein with various aspects of the present invention is that in known ECC all or most domain parameters are known and unwinding or detecting by reconstruction of k in kP is intractable because of the large number of points. Secure ECC requires a minimum number of points which may be around several hundreds of bits. In accordance with an aspect of the present invention an alternate finite field is generated and applied in ECC by using a Lab-transform that is held confidential or secret. The intractability of reconstruction of keywords with a smaller number originates from the incredibly large number of possible reversible inverters.

The elliptic curve domain parameters stored on a memory or a storage device that is accessed by a processor may include: a) type of a finite field such as prime/extended ($p/p^m$) including the size of the field (code example T0001-T9999).; b) reversible p-state or $p^m$-state inverter or rule how to generate the inverter (code example P0001-P9999; c) elliptic curve parameters (code examples EP0001-EP9999; d) base point P (code example: BP0001-BP9999); e) choice of private keyword k as in kP (code example PK0001-PK9999); f) choice of number of different words and different elliptic curves (code example NEC0001-NEC9999); g) choice of total length of combined word (code example SIZ0001-SIZ9999); h) coding/cipher rule (substitution/transposition) of individual and/or combined word (code example RUL0001-RUL9999); i) choice of stuffing data (code example SD0001-SD9999). Further data that may be stored rather than for instance calculated: 1) replacement value vector (code example RV0001-RV9999; 2) reversible inverter and/or its reversing inverter (code example RI0001-R19999; 3) the additive inverse vector (code example ADVN0001-ADVN9999); 4) the multiplicative inverse vector (code example MUNV0001-MUNV9999).

In an illustrative example, a 5 word combined word is generated from: 1: an Elliptic Curve over $2^{20}$ with (for instance code T0011), with an $2^{20}$-state inverter (for instance code P2012), with elliptic code parameters a1, b1 and c1 ($y^2+yx=x^3+a1x^2+b1$) (for instance with code EP0024); a base point in accordance with an example code BP0114, etc. So the total code has 6 portions for each word, including a stuffing word and a separate overall code for combined word length. In accordance with an aspect of the present invention, sets of elliptic curves have been formed and combined and are stored in a local memory or storage as a single code. For instance a code ECC00034 represents all data needed to generate the EC words and combine it into the combined word. In one embodiment of the present invention two devices work from the same database and synchronize communication. For instance in IoT (Internet of Things) a controllable device has a limited number of authorized controlling devices. Synchronization of configurations that allow access is not difficult. In one embodiment of the present invention, a device stores multiple configurations that each enables the generation of an EC word. Each configuration is only used once and disabled after use. After each use a new configuration may be formed of the available constituting parts. After a pre-determined number of uses, the available subparts may be changed or updated. Other ways of use of EC words are possible and are fully contemplated. The above is provided as an illustrative example to show that a strong EC combined encryption can be created by using relatively small words with the use of reversible inverters.

A second embodiment of the present invention relates to long EC words, preferably of over 30 bits, more preferably of over 50 bits and more preferably of over 70 bits. At those sizes one cannot reasonably store complete vectors as disclosed earlier. It is not possible to store an entire p-state reversible inverter of which each element is 50 bits. However, one can easily store several elements that determine an inversion rule: for instance the substitution for the zero element and the one-element and for instance an addition of all other elements with a number modulo-n. For instance in GF(n=7367575799) the new zero element is 577777 and the new one element is 345612311. All other remaining elements are subject to an addition with 8762322. By that rule each calculation involves the required inversion as explained related to FIG. 1.

In most cases for calculations an additive and/or a multiplicative operation is required. This can be performed by applying the rules of FIG. 1 which involve the inversion 'inv', its reversing inversion 'filly' and the operation 'op.' To illustrate the operation symbolically the figure of FIG. 1 is used as 4400 in FIG. 33 with symbolic representations rather than numerals. The top input is provided with a signal representing state 'a' and is inverted by 'inv' into 'x'. The bottom input is 'b' which is inverted by 'inv' into 'y' and processed by 'op' to generate'z' which is reversed inverted by 'filly' into 'c'. One is reminded that inv(rinv(x))=x. It is known (from standard multiplication and addition) that op(x,y)=z. It is also known that if 'y' is the multiplicative inverse of 'x' and 'op' is the standard multiplication over GF that op(x,y)=1 and that op(x,y)=0 if 'op' is the addition over GF and 'y' is the additive inverse of 'x' that op(x,y)=0. The standard inverses can be determined through known operations such as the extended Euclidean algorithm for the multiplicative inverse and the complement rule as explained earlier for the additive inverse.

For the multiplicative inverse of 'a' when 'op' is a modular multiplication: $x*y=1 \rightarrow inv(a)*inv(b)=1 \rightarrow inv(a)*inv(b)*inv(b)^{-1}=1*inv(b)^{-1} \rightarrow inv(a)=1*inv(b)^{-1} \rightarrow rinv(inv(a))=rinv(inv(b)^{-1}) \rightarrow a=rinv(inv(b)^{-1}) \rightarrow a=rinv(y^{-1})$. The term $y^{-1}$ is the multiplicative inverse of x=inv(a) which is determined via the extended Euclidean algorithm. A similar approach is applied for the additive inverse. The reversing inverter is determined by interchanging the position (or index) of a symbol in the inverter with its value. Accordingly, a processor is now enabled in accordance with an aspect of the present invention to calculate the additions and doubling and tripling of points in an elliptic curve modified by a reversible inverter by applying the known steps and novel rules based on the inverter.

In accordance with an aspect of the present invention an ECC operation includes the use of a reversible inverter of which the content is kept secret or confidential. For instance rules for inversion can be programmed in a system and synchronized or can be exchanged securely previously. The use of a secret Lab-transform renders the cryptanalysis of ECC less likely. One thus benefits from an increased security or apply smaller finite fields. For instance a standard size in ECC is a key of 384 bits which can be reduced to a lower size when an inverter is used. In accordance with an aspect of the present invention an ECC key or word generated with a secret inverter has a size preferably 10% smaller than an equivalent standard size and more preferably smaller than 20% of a standard size. Known standard sizes are 160 bits, 224 bits, 256 bits, 384 bits and 521 bits as NIST recommended key sizes.

There are different ways to generate desirable reversible inverters. One way for creating a reversible inverter is to select a row from a multiplication table in GF(p) with p being a prime number or an extension field $GF(p^m)$ so that all rows and columns (except the zero element row and column) are reversible inverters. There are some rows and columns that should be avoided as they have predictable patterns. The first row (all 0), the second row (the identity) and the final row (reverse order) have regular patterns. Furthermore, for low row numbers mod-p products follow normal products. For the field GF(521) one could select the rows greater than 100. For instance the predictable pattern disappears after the fifth column as 6*100 mod-521 is 79. This is a 'toy' example as in practice much larger fields are applied, such as prime fields wherein elements are about 256 bits wide. Even if one applies a field wherein elements are 100 bits wide then a processor still has to evaluate around $10^{30}$ element combinations to determine k1 from c(r,k1) while determination from r1 and c(r1,k1) is relatively simple.

The basis for determining k1 is that c(r1,k1)=r1*k1 mod-p. When r1 is known then $k1=r1^{-1}*c(r1,k1)$. Because a device is preprogrammed to perform the coding, a pair $(r1,r1^{-1})$ is stored in a memory in one or each device of the devices 1 and 2 in an embodiment of the present invention. Each device selects a value k (k1 for device 1 and k2 for device 2) and calculates c(r,k)=r*k mod-p. At a receiving end k is calculated by determining $k=r^{-1}*c(r,k)$ where $r^{-1}$ is already stored and needs in at least one embodiment of the present invention not to be calculated. The intractability comes from the fact that except for the all 0 row, each row has a k1 a k2 and thus a combination of k1 and k2. The key is made further intractable by applying a reversible inverter to the selected row, wherein a simple inverter inverses the zero and one element and perhaps a constant is added to other elements. In an embodiment of the present invention the new element that is generated or the newly generated key is coded or enciphered with an additional step like a hash function and/or an inverter which may be non-reversible. The secret key is of course not published, but further enciphering will make it more secure in case a key is derived from a known text.

A potential disadvantage of the above method is the requirement to potentially distribute and store sensitive data on a device. In accordance with an aspect of the present invention a series of general values 'r', if so desired $r^{-1}$, and its corresponding prime value p or value $p^m$ are stored in a memory and are activated on a condition that applies to device 1 and device 2. A preliminary unique signal or unique code may be applied to activate a particular configuration as described earlier. The design and use of unique and basically unpredictable codes has been explained in U.S. Pat. No. 9,100,166 issued on Aug. 4, 2015, which is incorporated herein by reference.

In an illustrative 'toy' example with very small numbers a configuration over a finite field GF(p=29) is activated with r=11 and $r^{-1}$=8. Devices 1 and 2 send public data c(r,k1)=8 and c(r,k2)=23 to each other, so c1=m29(r1,k1) and c2=m29 (r1,k2). Accordingly, $k1=m29(r^{-1},8)=m29(8,8)=6$ and $k2=m29(r^{-1},23)=m29(8,23)=10$. The operation m29 in this illustrative example is the multiplication modulo-29. Based on (k1, k2) the key m29(6,10) =2 is generated if a multiplication over GF(29) is used to generate the key.

In accordance with an aspect of the present invention, a reversible inverter inv29=[5 6 0 8 9 10 11 12 13 14 15 16 17 18 19 20 21 22 23 24 25 26 27 28 7 1 2 3 4] is used to modify the finite field GF(29) into alternate finite field aGF(29) according to rules illustrated by FIG. 1. An analysis of inv29 shows that the this inverter is created by two steps: most elements are created from the identity by adding 5 to each element or by shifting all elements rotationally 4 positions to the left, 0 becomes 5, 1 becomes 6, etc., with 2 important exceptions: element 2 (counting from origin 0) is now 0 (should be 7 if only shifted), and the 7 has gone to where the 0 would have been and element in position 24 is now 7. The 1 is now in position 25 and is the one or neutral element. By breaking up the adjacency of 0 and 1 the zero and one element are no longer adjacent. A program merely has to check the use of elements 2 and 7 to apply a specific inversion (2→0 and 24→7) and for all other elements the "add 5" rule can be applied.

The inverting inventor rinv29 or inv29 is rinv29=[2 25 26 27 28 0 1 24 3 4 5 6 7 8 9 10 11 12 13 14 15 16 17 18 19 20 21 22 23]. It is already known that elements 0, 2, 7 and 24 are special cases. All other elements can be reversed back with rule "subtract 5 or add 24 mod-29" with exception rule 0→2 and 7→24. In software inversion rules as explained above are very simple software loops. The complexity of calculations is not increased by large numbers, except perhaps to the extent of the mod-n part.

In accordance with an aspect of the present invention a reversible inverter is used to generate the public keys. For instance, assuming that two devices still apply keys k1=6 and k2=10 and row r=11 entirely different public keys will be generated: c1 which is c1(r,k1)=c(11,6)=26 from im29 (which is the switching table created from multiplication m29 of GF(29) by using inv29 and rinv29 in accordance with steps illustrated by FIGS. 1 and c2 which is c2(11,10)=3. While not stated explicitly every time a multiplication and an addition for this section means a multiplication and addition over GF(p) and thus in the case of GF(29) a modulo-29 operation. The multiplicative inverse in im29 is derived from im29(r,r$^{-1}$)=25. Accordingly, the multiplicative inverse of r=11 is r$^{-1}$=15. Accordingly device 1 calculates k2 from c2=3 from im29(15,3)=10. Device 2 calculates k1 from c1(r1,k1)=26 from im29(15,26)=6, which is of course correct. When r$^{-1}$ is given, the calculations can be performed in according with the methods illustrated in FIG. 1. One may also calculate the multiplicative inverse with the method described earlier herein.

In according with an aspect of the present invention a key is generated from an operation key(k1,k2) or selectively key(k2,k1) if the key function is not commutative. The function key may be identical to the multiplication function or the modified multiplication function. The key function may also be the addition over the field or a subtraction. The generated key will be used for a cryptographic operation, including access operations such as unlocking a mechanism.

For convenience the multiplicative inverse r$^{-1}$ of a selected row or multiplier r can be stored on the devices. In one embodiment of the present invention only the inverter (or inverter rule) is stored on each device and based on a common condition (such as date or location or temperature or status of a memory or processor for instance) a common term for r is generated and r$^{-1}$ is calculated or a common term r is preprogrammed with the corresponding value of r$^{-1}$ and stored in memory.

In accordance with an aspect of the present invention secret terms k1 and k2 are expressed in a result of an operation which may be a multiplication over a finite field GF(p). The terms k1 and k2 are reconstructed at separate devices using a term r which may be a multiplier in field GF(p). A new term based on recalculated terms k1 or k2 and known terms k2 and k1 at each device is determined by an operation in an alternate finite field aGF(p) generated from GF(p) by using a secret p-state inverter. In accordance with an aspect of the present invention secret terms k1 and k2 are expressed in a result of an operation which may be a multiplication over an alternate finite field aGF(p). The terms k1 and k2 are reconstructed at separate devices using a term r which may be a multiplier in field aGF(p). A new term based on recalculated terms k1 or k2 and known terms k2 and k1 at each device is determined by an operation in the original finite field GF(p) reconstructed from aGF(p) by using a secret p-state inverter. In accordance with an aspect of the present invention secret terms k1 and k2 are expressed in a result of an operation which may be a multiplication over an alternate finite field aGF(p). The terms k1 and k2 are reconstructed at separate devices using a term r which may be a multiplier in field aGF(p). A new term based on recalculated terms k1 or k2 and known terms k2 and k1 at each device is determined by an operation in the alternate finite field aGF(p). The finite field GF(p) may be a prime finite field. It may also be an extension field of a prime number.

The use of an inverter to modify GF(p) to aGF(p) dramatically increases the intractability of finding the correct private keys from published data. A 50 bits word has a size of about $10^{15}$ numbers. The combination (k1,k2) and related products all occur in multiplications over GF(p) and aGF(p). With the possibility of at least $10^{15}*10^{15}$ different reversible p-state inverters (for at least the 0 and 1 elements), the manner to reconstruct k1 and k2 becomes increasingly intractable. This is a very cheap way to generate hard to crack keys. Cheap in the sense of required processing power and memory or storage. If a key is 50 bits then memory requirements are limited to a number of 50 bits and a plurality thereof (for p, for r, for r$^{-1}$, for k1 and k2 and a rule for inversion with a limited number of exceptions.) Each configuration to generate a keyword would be perhaps several kB at most, if at all. This means that at least thousands and probably millions of configurations easily are stored on a device.

Because a multiplicative inversion is also stored there is very limited need for calculation. Thus one is able to arrange hard to crack ciphers at very little cost and high security if some basic rules are observed. A first rule is not to re-use a configuration or at least limit re-use. A second rule is to preferably work in a range wherein plain multiplication does not work. This means that at least a product r1*k1 in real numbers should not be smaller than p and should exceed p at least once, or in formula r1*k=c with c>p so that r1*k1=g*p+res with g>0. Optionally, a key is to be further inverted or derived by using a smaller field, for instance by using a multiplication over GF(q<p).

In illustrative examples above the term multiplier or row is used. A product is formed from a multiplicand and multiplier. For the purpose of the above embodiments of the present invention the term multiplicand may be substituted for multiplier. In that same sense the term row may be substituted by column as the multiplication switching table is merely a selected representation of the multiplication of a factor r with factors k1 and k2. One may also use the term dimension of a switching table. Accordingly one dimension (a row or a column, or a multiplier or multiplicand) is secret but known to each of the devices and two products (one by each device) are shared over a channel.

As discussed above a device calculates $c_i=r1*k_i$ mod-p, wherein the selection of p as a prime number or as an extension field number assures that rows and columns of the multiplication have no repeating products (or sums if one applies an addition, which is also possible). The number r1 is shared between the devices. In accordance with an aspect of the present invention, each device i is assigned a unique number $nm_i$-mod-p that has a unique multiplicative inverse $inm_i=(nm_i)^{-1}$. These numbers are known to all participating devices but are kept secret. Each device i calculates and transmits $c_i=r1*k_i*nm_i$ to the other devices. Each other device then calculates $k_i=c_i*r1^{-1}*nm_i^{-1}$ mod-p. If all devices share the same information or action then a common key is calculated key($k_1, k_2, \ldots, k_p$). One way to calculate the common key is key(k1,k2,k3)=k1*k2*k3 mod-p but may also be key2(k1,k2,k3)=k3*(k1+k2) mod-p or any other useful expression. In accordance with an aspect of the present invention, one or more terms are modified with a p-state inverter.

RSA Modified N=p*q

Encryption methods known as RSA (named after Ron Rivest, Adi Shamir and Leonard Adleman) relate to public/private key methods. A number n is formed from the product of two prime numbers p and q: n=p*q. The Euler totient function φ(n)=(p−1)*(q−1) is determined and a public key e that is coprime to φ(n). Also a private key d that is the multiplicative inverse of e to φ(n) is determined and kept private. The number n and public key e are shared with an encrypting machine which encrypts a message m as $m^e$ mod(n). A receiving machine decrypts the received message $m^e$ mod(n) by determining $(m^e)^d$ mod(n). The RSA method is used for encryption, message signing and key distribution. The RSA method has known enhancements and conditions such a padding schemes, selection of prime numbers. etc.

In accordance with an aspect of the present invention the RSA method is modified by applying one or more n-state reversible inverters with n>2 wherein the n-state inverter is preferably kept secret. In accordance with an aspect of the present invention, one or both of the shared key numbers (n,e) are modified with the n-state inverter and are restored at the encrypting machine which also has the (secret) n-state inverter. Because n is presumably very large (greater than 100 bits, more likely to be 1024 bits or greater or 2048 bits or greater) the possible size of modifications is also very large. One possible modification is to XOR the binary representation of n with a large modification word, which is kept secret and is known to the encrypting and decrypting machine. One may add (XOR) a binary word with the decimal value x to the binary representation of n (and/or e). The original number n or e can be restored by again adding (XOR) x to the received number. In accordance with a further aspect of the present invention the message to be encrypted is modified by XORing with x and/or the generated encrypted message is modified by XORing with x.

The modifications as provided above are already effective, but are subject to fairly simple but hopefully time consuming attacks. The modification does not change the RSA method itself fundamentally. In accordance with an aspect of the present invention, the fundamental operation in the RSA method which is exponentiation, (which in this case is repeating multiplication) is Lab-transformed in accordance with the method illustrated in FIG. 1. That is: for a multiplication input data are modified with n-state inverter invn and the output (product) of the multiplication, which may be a standard mod-n multiplication, is modified with the reversing inverter rinv of invn. The inversion is closed in the sense that each inversion generates a number smaller than n. The Lab-transformed switching operation remains a group or ring or finite field as needed. So, the inversions do not change the defining meta properties of RSA but change the outputs. Which means that the RSA methods can be applied using the modified multiplication as the operational function.

A much higher level of security is achieved by applying confidential n-state inverters to Lab-transform the operational function of RSA. As a result, one may use smaller numbers for n that are commonly required 1024 or 2048 bits and still achieve a high level of security.

The method as provided above will be illustrated with examples of small numbers. One of ordinary skill can easily check that this works for large and very large numbers. Assume RSA for p=5; q=11 and n=55 with φ(55)=(5−1)*(11−1)=4*10=40. Select e=7, which is coprime with 40 and has multiplicative inverse d=23. The public key is (e,n)=(7, 55). One can easily check that a message $m^7$ mod-55 is decrypted to m from $(m^7)^{23}$ mod-55. Apply a 55-state inverter inv55=[12 13 14 15 16 17 18 19 20 21 22 23 24 25 26 27 28 29 30 31 32 33 34 35 36 37 38 39 40 41 42 43 44 45 46 47 48 49 50 51 52 53 54 0 1 2 3 4 5 6 7 8 9 10 11]. This inverter is a shift (or rotation) of all elements of a 55-state identity inverter of 12 positions to the left. Many other different reversible 55-state inverters are possible (in fact 55!−1 reversible 55-state inverters). One should note that this inversion changes the 0 and 1 inverters to 44 and 45, respectively. The order (0,1) and (43,44) is maintained for simplicity and illustrative purposes but can also be broken up. One is cautioned that these numbers (43 and 43) or states are then not a candidate for being public or private keys.

The reversing inverter rinv55 =[43 44 45 46 47 48 49 50 51 52 53 54 0 1 2 3 4 5 6 7 8 9 10 11 12 13 14 15 16 17 18 19 20 21 22 23 24 25 26 27 28 29 30 31 32 33 34 35 36 37 38 39 40 41 42]. The inverters inv55 and rinv55 are applied to perform exponentiation by repeated multiplication for encryption and decryption. Reduction such as baby-step/giant step can be applied. The same keys e and d as in the unmodified operation can be used. However, the same modified operation applied in the encryption has to be applied in the decryption. For instance public key e=3 (corresponding to private key d=27) applied to the modified operation on a message m=38 generates encrypted message em=28 and decrypts correctly with d=27 to m=38. However, trying to decrypt em=28 with d=27 with the standard, unmodified, mod-55 multiplication leads to decrypted message md=52, which is incorrect of course.

For illustrative purposes another example is provided for p=7, q=13, n=91 and φ(91)=(7−1)*(13−1)=6*12=72. The inverter inv91 is the 91-state identity inverter of which all elements are rotated 7 positions to the left. The reversing inverted rinv9l is a sequence mod-91 of 91 consecutive elements starting with [84 85 . . . 83] and is the identity 91-state inverter rotated 7 positions to the right. The public key e=11 corresponds to private key d=59 in this example. A message m=82 is encrypted into em=38 and correctly decrypted into dm=82 by using the modified operation both for encryption and decryption. Using the unmodified operation with d=59 will generate the incorrectly decrypted message dm=12.

Diffie-Hellman Modified

Diffie Hellman key exchange is directed to information exchange between at least two parties of data to form a common keyword. Each party, being a device, uses a common operation over a field, group or ring using a common generator. The operation may be a p-state operator such as a mod-p multiplication and a common generator g is applied. Each device selects (preferably at random) a private key from the set over which the operation is defined, for instance a private key a by the first device which generates public key $g^a$-mod-p and sends it to a second device. The second device selects a private key b from the set and generates public key $g^b$-mod-p and sends it to the first device. The first device generates common key $(g^b)^a$-mod-p and applies it for encryption and/or decryption and the second device generates key $(g^a)^b$-mod-p and applies it for encryption and/or decryption. The keys $(g^b)^a$-mod-p and $(g^a)^b$-mod-p are identical when the same prime p and generator g are used. This is known as Diffie Hellman key exchange.

Security of Diffie-Hellman key exchange can be increased by changing some of the parameters or keeping parameters confidential. In accordance with an aspect of the present invention aspects of the public key are modified in accordance with a reversible modification which is kept confidential. In one embodiment of the present invention at least one of $g^a$-mod-p and $g^b$-mod-p is modified. A receiving device is programmed to change the modified public key back with the known modification. In general p is a prime number. Accordingly, if p is modified it should be modified so that the modified version of p is also a prime number.

In accordance with an aspect of the present invention a reversible p-state inverter is applied to the p-state operation of the Diffie-Hellman method, which is generally a mod-p multiplication, but may also be a mod-p addition or a mod-p subtraction, by applying a Lab-transform with a reversible inverter and its reversing inverter as illustrated in FIG. 1. The p-state inverter is kept confidential and may be distributed in accordance with the unmodified Diffie Hellman method. The determination of the discrete logarithm for large numbers is held to be intractable. Large numbers are generally accepted to be numbers represented by more than 512 bits or 1024 bits or 2048 bits. By modifying the p-state operation in accordance with a Lab-transform the fundamental (or meta) properties are preserved but the results are unpredictable because of the incredibly large numbers of possible p-state inverters. For instance the Lab-transformed mod-n or $GF(n=p^q)$ multiplication still defines a group, closed, associative and with a multiplicative inverse, though the state of the multiplicative inverse is modified by the Lab-transform.

Preferably a "rule based" p-state inverter is used, for instance as provided in illustrative examples herein earlier. Other rules are possible and contemplated and include rotation with modification of 0 and 1 element; interleaving of preset partial inverters, reverse order inverters and other schemes. One benefit of these modifications is that attacks on the generated public keys to determine the private keys or common key will be ineffective within a given time. By modifying the inverters on a regular basis, for instance after one or more uses, or on a timed basis, makes the modified Diffie Hellman method more secure and enables a reduction in the size of the required public keywords.

In an illustrative example p=29 and g=8. The private keys are a=4 and b=20. The public key $g^a$-mod-p=$8^4$-mod-29=27 and $g^b$-mod-p=$8^{20}$-mod-29=12. The common key is 26. Select a 29-state inverter inv29=[8 9 10 11 12 13 14 15 16 17 18 19 20 21 22 23 24 25 26 27 28 0 1 2 3 4 5 6 7] which is created by a rotation left of 8 positions of the corresponding 29-state identity inverter.

The reversing inverter can be easily determined and is rinv29 =[21 22 23 24 25 26 27 28 0 1 2 3 4 5 6 7 8 9 10 11 12 13 14 15 16 17 18 19 20] and is of course a right rotation of the 29-state identity inverter with 7 positions and can be applied rule based for every instance. Using the modified operation with the same private keys will generate $g^a$-mod-p=$8^4$-mod-29=15 and $g^b$-mod-p=$8^{20}$-mod-29 =22 and common key is 17. Because 0 and 1 are no longer the zero and one element of the operation, common keys 0 and 1 may be generated. In accordance with an aspect of the present invention a provision is included to not use the specific inverters and or private keys that generate undesirable private keys. For instance an undesirable common key may cause a signal to be exchanged that forces the devices to generate other private keys.

Figures 33, 34:
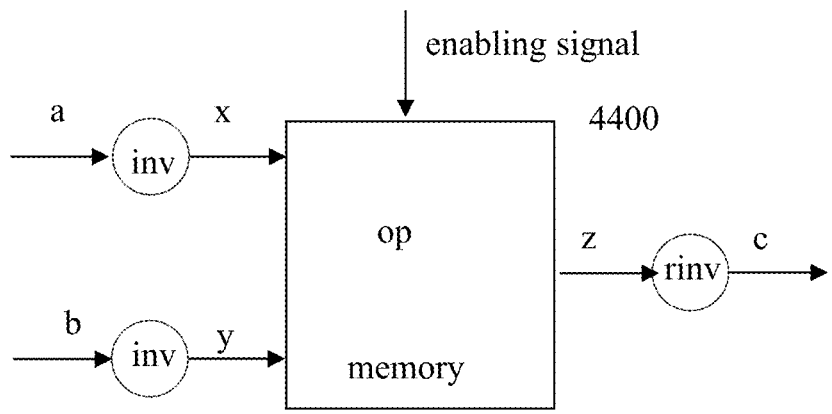
FIG. 33 illustrates a device that modifies a switching table in accordance with an aspect of the present invention.
FIG. 34 is a screenshot generated by a computer to generate a polynomial based switching table in accordance with one or more aspects of the present invention.
Figures 35, 36, 37:
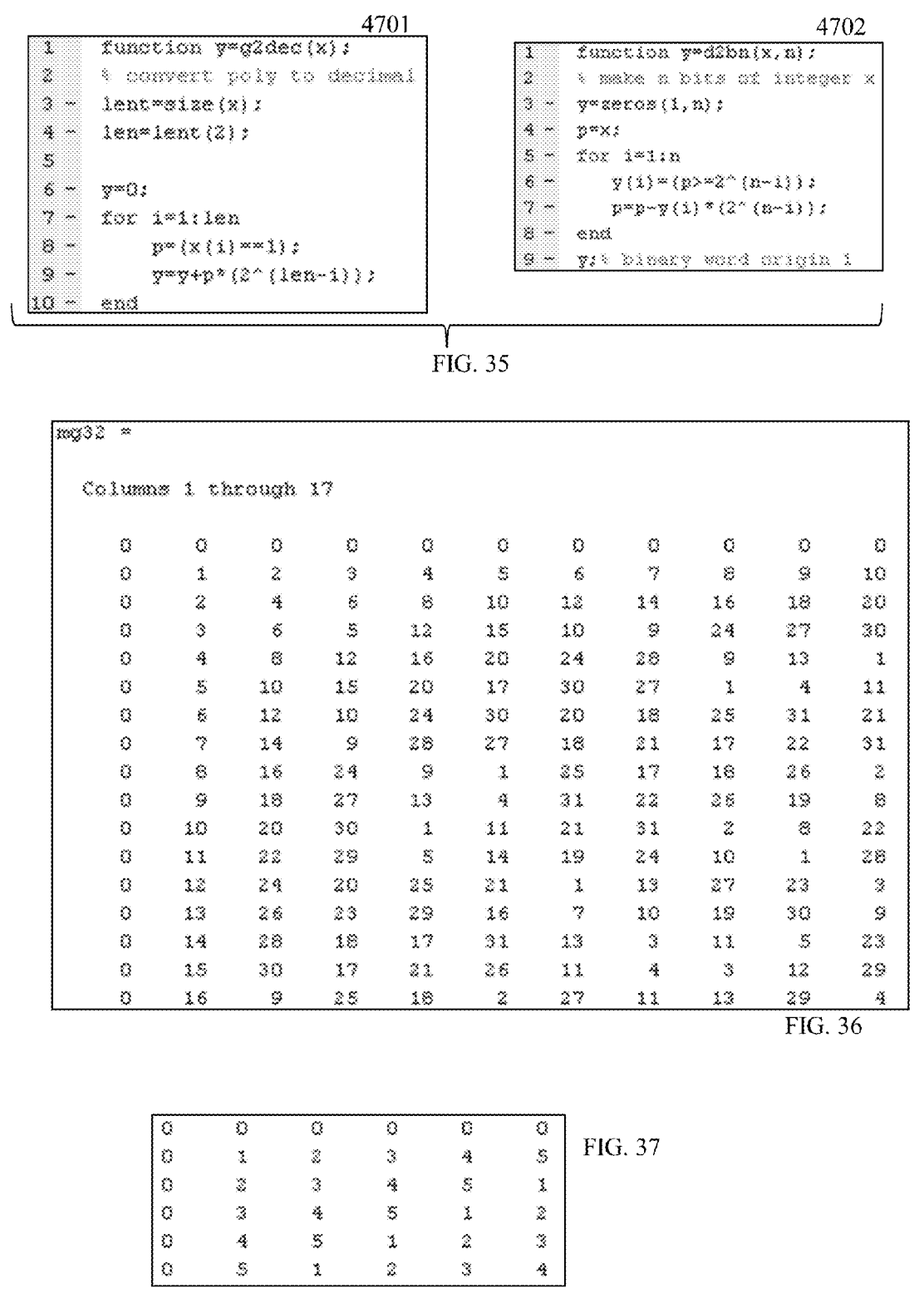

In accordance with an aspect of the present invention the operation is defined over an extension field $GF(p=2^m)$. This means that the operation is defined modulo-pol_p wherein pol_p is an irreducible polynomial over GF(2) of degree m. This approach is applied as an illustrative example to generate the multiplicative table of $GF(p=2^5=32)$. FIG. 34 is a screenshot of a Matlab program listing that uses polynomial representation to create a decimal table m32. FIG. 35 is a screenshot of Matlab program listings 4701 and 4702 that uses the binary coefficients of the generated polynomial presentation of the elements of a table to generate a decimal presentation and to generate a binary word from an integer, respectively. A combinational binary circuit can perform the actual polynomial multiplication and a conversion to decimal representation is not needed.

FIG. 36 is a partial screen capture of the decimal representation of the polynomial multiplication over GF(32). Only part of the table is shown for illustrative purposes. The table (32 rows by 32 columns) is too large for adequate print out.

The multiplication over GF(32) is modified in accordance with the method illustrated by FIG. 1 with the inverter inv32 which in an illustrative example is the 32-state identity inverter left rotated by 8 elements. The reversing inverter rinv32 in the illustrative example is the 32-state identity inverter right rotated by 8 elements.

Thus p=32 and take g=8 as in the previous example. The private keys are a=4 and b=20. The public key $g^a$-mod-p=$8^4$-mod-$32_{pol}$=6 and $g^b$-mod-p=$8^{20}$-mod-$32_{pol}$=2. The common key is 21. The numbers for the inverter modified operation (multiplication) become: The private keys still are a=4 and b=20. The public key $g^a$-mod-p=$8^4$-mod-$32_{mod}$=23 and $g^b$-mod-p=$8^{20}$- mod-$32_{mod}$=31. The common key is 5.

This approach can be extended to very large numbers of $p=q^m$ with q being prime and m being an integer and many different inverters, which preferably are rule based.

Figures 38, 39:
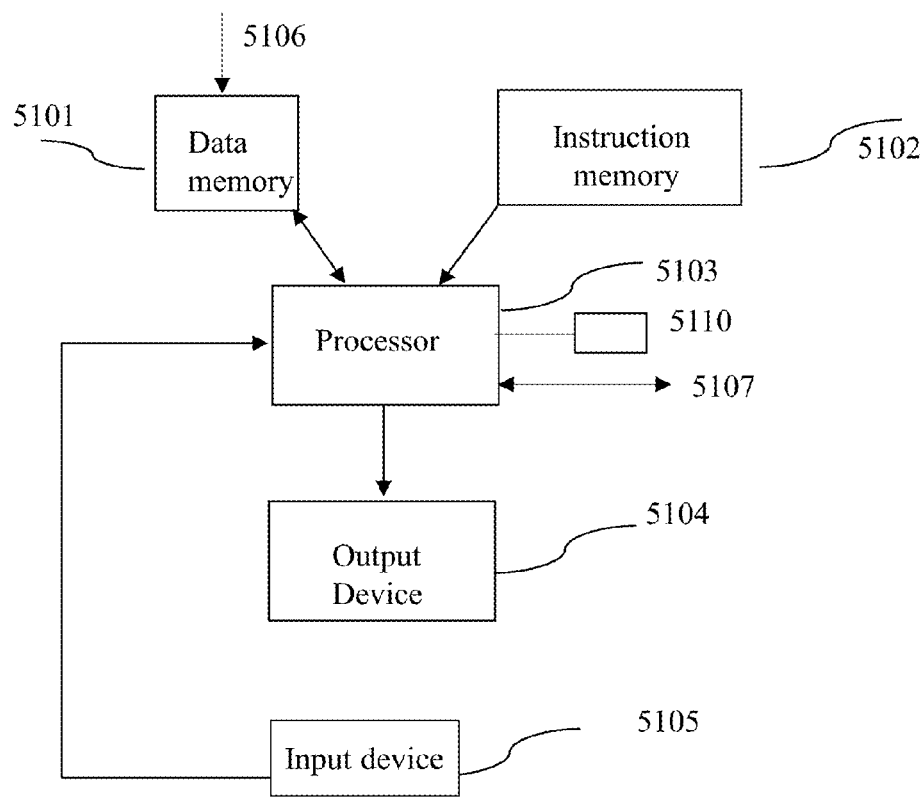
FIG. 38 is a screenshot of computer instructions that generates a switching table in accordance with one or more aspects of the present invention.
FIG. 39 is a block diagram of a computing device in accordance with an aspect of the present invention.

In accordance with an aspect of the present invention the Diffie Hellman key exchange method is used for any value of p for which a standard operation is defined that is modified with an inverter per the method as illustrated in FIG. 1. The operation is defined by a regular shift in columns of a table as illustrated in FIG. 37 for p=6 in mod-6. The rule for generating elements of this table is illustrated in FIG. 38 as a screen shot of a program that generates table n-state switching table mp which has the properties of a multiplication. This operation can be used as an operation defining a multiplicative group for any integer number (not only prime or extension fields) by using the general expression as represented in Matlab script: mp(i1+1,i2+1)=mod((i1+i2−1),p)+(((i1+i2−1)>=p)*1); with i1 and i2 ranging from 1 to (p−1).

A disadvantage of this type of operation or multiplication is that it is of course very predictable, especially when generator g and number p are provided. In accordance with an aspect of the present invention the operation (generating elements of mp) is modified with an inverter in accordance with the method illustrated by FIG. 1. Preferably a rule based inverter is used so that individual elements of the inverter can be determined. For illustrative purpose, an operation m30 (p=30) generated in accordance with the above rule is used to create a common keyword. The operation is modified in accordance with inv30=[21 6 20 5 19 4 18 3 17 2 16 1 15 0 14 29 13 28 12 27 11 26 10 25 9 24 8 23 7 22]. This inverter is created by a) a left rotation of 8 elements of a reversed 30-state identity inverter, followed by a splitting of the inverter in two equal parts and interleaving the two parts. This inverter can be applied rule based on each individual state. The reversing inverter is rinv30= [13 11 9 7 5 3 1 28 26 24 22 20 18 16 14 12 10 8 6 4 2 0 29 27 25 23 21 19 17 15]. For large numbers the reversing inverter rinv30 is also applied based on a rule on each state to which the reversing inverter has to be applied. The rules for inversion and reversal of inversion can be programmed in a processor or realized in a combinational circuit.

The rule for inversion reversal in the above example is determined from the inversion rule applied to the rule that: If "inv(i)=y" then "rinv(y)=i." The inversion rule is that for even indices i (using origin 0 and mod-30) including 0, inv30(i)=(21−(i)/2) mod-30, wherein (21−(i/2)) is in the range [21 20 . . . 8 7] and for i is odd starting from 1 origin inv30(i)=6-(i−1)/2) mod-30 with the inverter value is in the range: [6 5 4 3 2 1 0 29 . . . 23 22]. Manual calculation easily confirms that inv30(0)=21, inv30(28)=(21−14)mod-30=7 and inv30(1)=6 and inv30(29)=(6-14) mod-30=−8mod-30=22. The rule for rinv30(k) is then: rinv30(k)=(42−2k) mod-30 for k in [21 20 . . . 8 7] and rinv(k)=(13−2k) mod-30 for k in [6 5 4 3 2 1 0 29 . . . 23 22]. These rules are easy to program.

The results for the inverter modified operation (multiplication) become: The private keys still are a=4 and b=20 and g=8. The public key $g^a$-mod-p=$8^4$-mod-$30_{mod}$=27 and $g^b$-mod-p=$8^{20}$-mod-$30_{mod}$=6. The common key is 25.

The inverter based modifications with inverters that are kept confidential allow for high security generation of secret keywords both in RSA and Diffie Hellman based encryption. The inverter based approach requires that both the first and second device have access to the specific inverter, which should preferably be kept secret.

In accordance with an aspect of the present invention n-state inverters and/or the rules to generate inverters and their reversing inverters are stored in a memory. The memory may be in the first and second device or may be on a remote server. Each rule or inverter is provided with a unique ID number that identifies the rule, but does not teach anything about the rule. For instance a rule may have ID 12436. The ID on the memory refers to a specific rule: for instance inverter rule 12436=[30|Reverse|Left|Split 15/15 and Interleave high/low]. This rule says apply an identity inverter of 30 elements|in reverse order|left rotate by 7 elements|split in 2 halves and interleave the halves with a high number followed by a low number. Each element of the inverter 12436 can be calculated individually and by reversing the rule also the elements of the reversing inverter can be determined. The reversing rule, as illustrated earlier, is determined and programmed or embedded in the memory for use by the processor.

A public key thus can include ($g^a$, ID) from one device and ($g^b$) from the other device wherein ID is an ID of and inverter rule which also refers to a corresponding reversing rule. The use of a specific IDed inverter may be determined by pre-programmed conditions that both devices are provided with, such as a date or time of day. In that case it is not necessary to share an inverter ID. In accordance with an aspect of the present invention, both the first and second device contain one or more IDed n-state inverter rules. Which inverter and corresponding reversing inverter to use is determined by one device which includes its ID in its public key, which initiates the use of that inverter in the other device. The private keys a and b of the two devices may be pre-set or may be generated at random. However a check may be performed to make sure that not a non-desirable key will be formed. In many cases two devices need to apply a keyword wherein the two devices are both intended to uniquely communicate with each other. In that sense the two devices are not unknown to each other and they do not need to comply with general public/private key exchange but may assume to share pre-programmed confidential information about message exchange (such as from which n and g and inverter ID to select). In accordance with an aspect of the present invention at least one, preferably at least 2, more preferably at least 5, and more preferably at least 1000 and most preferably at least 1 million different configurations that include at least an inverter rule and may include a value for g and/or a value for n, are provided with a unique ID and stored on a memory.

The use of a specific configuration may depend on a condition. A configuration may also be a limited time use configuration, which may be one time or multiple times after which a used configuration is removed or disabled in the list of configurations on a device. A specific configuration ID refers to the same configuration on the first and the second device.

Other exponentiation cryptographic methods and apparatus are known, such as the ElGamal method. The methods and apparatus provided in accordance with one or more aspects of the present invention are applied to cryptographic exponentiation wherein in accordance with an aspect of the present invention an exponentiation is a repeated operation applied to a term, wherein the operation is an n-state operation (commonly a multiplication or an addition) modulo a common term (polynomial) or number (n) that is modified with an n-state inverter in accordance with a method as illustrated in FIG. 1.

Exponentiation as a repeated application of an operation is also used in machines for generating and checking digital signatures and for Message Authentication Codes (MACs). In accordance with an aspect of the present invention one or more methods provided herein are applied in digital signatures and MACs generation and checking.

Symmetric Cryptography

Many of the methods and illustrative examples provided above relate to asymmetric cryptography. Symmetric cryptography can also benefit from the modifications as provided herein. Symmetric encryption is known to use XOR functions on binary signals because the XOR function is reversible. Symmetric cryptography is usually defined in a published standard: DES, TripleDES and AES (the Advanced Encryption Standard) are examples thereof. Because the encryption is standardized it is open to attacks. For added security of communication between related machines, it is beneficial to use a modified symmetric encryption method that is a modified version of the standard encryption. In accordance with an aspect of the present invention a symmetric encryption method or machine that applies XOR functions to a word of bits is replaced by a method wherein a plurality of XOR functions is replaced by a device that executes a single n-state reversible function, wherein the n-state reversible function is created by applying a reversible n-state inverter in accordance with the method illustrated in FIG. 1. The Advanced Encryption Standard is published as Federal Information Processing Standards Publication 197, Nov. 26, 2001 and issued by National Institute of Standards and Technology (NIST) and made available by National Technical Information Service (NTIS), 5285 Port Royal Road, Springfield, Va. 22161 and which is incorporated herein by reference.

AES operates on relatively small binary words of 1 byte (8 bits) or on even bits in a byte. In accordance with an aspect of the present invention one or more XOR operations that operate in parallel on words of bits, preferably on 4 bits or 8 bits, are replaced by n-state operations, wherein n>2 and preferably is 2<n<512 and most preferably is n=256 in AES, wherein the n-state operation is formed by modifying an n-state addition determined by $\log_2 n$ parallel XOR operations is replaced by an n-state operation formed by modifying the n-state addition with an n-state inverters and its reversing inverter in accordance with the method illustrated in FIG. 1. In accordance with an aspect of the present invention a modification as described above is applied in at least one of the operations in AES wherein 8 XOR functions are applied to combine 2 bytes. In accordance with an aspect of the present invention a modification as described above is applied in two or more of the operations in AES wherein 8 bitwise XOR functions are applied to combine 2 bytes. In accordance with an aspect of the present invention k bitwise XOR operations with k greater than 1 or k>2 or k>4 or k greater or equal to 8 are replaced by a $2^k$-state switching function and/or switching table. The $2^k$ state switching function or switching table in one embodiment of the present invention is formed by a Lab-transform of an addition over GF(n=$2^k$). In one embodiment of the present invention k=8 or n=256. In accordance with an aspect of the present invention at least two different Lab-transforms are applied in a modification of AES. In accordance with an aspect of the present invention at least two different Lab-transforms are applied in a modification of AES. In accordance with an aspect of the present invention an n-state reversible operation with n=$2^k$ which is not associative is Lab-transformed and is applied to modify bitwise operation in AES.

In accordance with an aspect of the present invention a symmetric encryption operation and/or device that includes but is not limited to AES and 3DES and that applies bitwise XOR-ing on a word of at least k bits with k being greater than 2, or k greater than 4 or k equal to 8 or k greater than 8, is modified to replace the k-bitwise XOR-ing by an n-state switching operation or n-state switching table in an n-state switching device with n=$2^k$, wherein the n-state switching operation or n-state switching table is equivalent to a Lab-transformed addition over GF(n).

In paragraph 5.3.3 of FIPS-197 requires InvMixColumns which is a multiplication of which the resulting bytes are XORed. In accordance with an aspect of the present invention the 8 XOR operation upon a byte of 8 bits is replaced by a modification of an addition defined by 8 XOR functions by a 256-state addition that is created by applying a 256-state inverter and its reversing inverter in accordance with the method illustrated by FIG. 1.

The inverter and its reversing inverter are preferably kept confidential within the participating devices. Participating devices are identified and authorized, for instance by providing one or more n-state inverters and their reversing inverters.

The AES standard in paragraph 5.1.1 describes a SubBytes Transformation that determines an S-box table in FIG. 7 which is a substitution for a byte [x y] (x and y being each a 4 bit part of the byte). In accordance with an aspect of the present invention the content of the S-box is modified by applying a 256 state inverter not being an identity to the content of the S-box: that is the content of the S-box serves as the index to the 256-state inverter. There are 256! different reversible 256-state inverters. In accordance with an aspect of the present invention two devices communicating and using AES apply a 256-state inverter to encrypt a message. An inverse S-box is applied in 5.3.2 for decryption. The inverse S-box is determined by applying the reversing 256-state inverter that was used to modify the S-box of 5.1.1.

In accordance with an aspect of the present invention, the 256-state inverter to modify the S-box of the AES standard is selected from one or more 256-state inverters, based upon a condition. The condition for change may include a data, a time period, a time, a location and/or number of times that a 256-state inverter has been applied. After changing the 256-state inverter the previously used 256-state inverter may be disabled for a period or may be completely removed from re-use.

The Lab-transform as provided herein enables modification of encryption/decryption, digital signature, MAC, message digest, keyword distribution and any other encryption and/or decryption or authentication operation that may be symmetric or asymmetric, block based or streaming between at least 2 devices. In accordance with various aspects of the present invention a modification is applied to a standard or at least published cryptographic operation. Known cryptographic operations have a known level of security. By changing the known methods in accordance with various aspects of the present invention, at least the basic level of security is maintained as the principles of the methods do not change. By applying n-state inverters that are selected from enormous (n!) possible variations and very hard to guess or determine from generated public data, the level of security is increased substantially without the need to increase the amount of generated data. In fact less data (such as keywords) can be used while still maintaining a previous level of security. In general the known cryptographic operation is difficult to hack or attack based on some property of the operation, either size, confidentiality of keyword or intractability of operations and the like. By applying a confidential modification to a cryptographic operation a level of security is increased or a same level of security is achieved with smaller operations or smaller amounts of data such as keywords.

Some cryptographic operations require multiple cryptographic steps. For instance Elliptic Curve Digital Signature Algorithm (ECDSA) requires at least 2 cryptographic steps: a) determination of a hash or message digest of a message 'm' as e=HASH(m) wherein HASH is for instance SHA-2. b) a curve point (x1,y1) is determined on an elliptic curve from a random number k by calculating k×G wherein G is a curve basepoint. ECDSA is sufficiently known to one of ordinary skill. As described herein and elsewhere by the inventor both the hash function and the elliptic curve primitives can be Lab-transformed. Only part (Ln bits) of 'e' is used in generating the signature. Because of the difference in size of the hash and the ECC calculating, different Lab-transforms have to be applied: one to the hash and one to the field for elliptic curve calculations; or only one of the hash function and the elliptic curve calculation are Lab-transformed. In one embodiment of the present invention at least two different sized (n1 and n2) reversible inverters are used for ECDSA determination with Lab-transform, wherein either none or one of the reversible inverters is the identity inverter. A first Lab-transform is applied to a bitwise XOR operation in the e=HASH(m) operation, wherein m is a message and HASH is a message digest operation that applies a bit-wise XOR. A second Lab-transform is applied to a finite field over which an elliptic curve is defined. The finite field GF(k) may be defined for n is primitive or as an extension finite field GF(k=$q^p$) wherein q is primitive. The Lab-transformed operation are then applied to generate a signature (r,s) with (r=x1 mod n) and s=$k^{-1}$*(z+r*dA) mod n with k an integer on [1, n−1], n is the integer order of basepoint G (n×G=0). One is reminded that 'x' in ECC is repetitive addition of points on an elliptic curve. The term z is created from Ln left bits of e, wherein Ln is the length of the binary representation of n. The term dA is the multiplier in Qa=dA×G for public curve point Qa.

A description of ECDSA can be in the article "The Fundamentals of an ECDSA Authentication System" by Bernhard Linke of Maxim Integrated, dates May 16, 2014, downloaded from http://pdfserv.maximintegrated.com/en/an/TUT5767.pdf and which is incorporated herein by reference. This reference relates to part DS28E35 called Deep-Cover Secure Authenticator of Maxim Integrated of San Jose, Calif. Other devices with ECC and ECDSA functionality are devices ATECC508A and ATECC108A of Atmel of San Jose, Calif.

The article "The Elliptic Curve Digital Signature Algorithm (ECDSA) by Johnson et al, Certicom Research, 2001, downloaded from http://cs.ucsb.edu/~koc/ccs130h/notes/ecdsa-cert.pdf also provides a description to ECDSA and is incorporated herein by reference.

It is noted that the final determination of s=$k^{-1}$*(z+r*dA) mod n, with n the order of the elliptic curve requires a modulo-n addition and modulo-n multiplication. These operations are modified by a Lab-transform in accordance with an aspect of the present invention.

The cryptographic methods and devices as provided herein are realized by programmable processors with memory or combinational circuitry possibly with memory where convenient or a mixture thereof. There are always at least two computing devices that communicate data by signals, which may be wired or wireless. A computing device may be a computer, a mobile computer, a phone, a tablet, a portable and mobile device with a processor, a smart card, a chip card or any other computing device with processing capability and an interface to communicate with another device.

A card may be applied in an access system or an automatic teller machine (ATM) or to a card reader to perform or complete a transaction. Application may be in exchange of messages such as in e-mail, transactional applications such as placing a purchase, placing an order, obtaining money from a machine, access control, executing a transaction or any operation wherein information is kept confidential or a source or message has to be authenticated or authorized or indicated as not having been modified when it left its source. In accordance with an aspect of the present invention one or more of the methods and devices provided herein are applied to an exchange of data between two devices. In accordance with an aspect of the present invention one or more of the methods and devices provided herein are applied to sending and/or receiving of data from a computing device. In accordance with an aspect of the present invention one or more of the methods and devices provided herein are applied to sending data from a website displayed on a display of a computing device.

N-valued switching functions and n-state inverters with n equal to or greater than 2 may be implemented in different ways: as n-state switching devices, as binary switching devices wherein a binary word of multiple bits represents an n-state symbol, combinational circuits and as switching tables that are stored in a memory as illustrated in the herein provided Matlab code.

A system illustrated in FIG. 39 and as described herein is enabled for receiving, processing and generating data. The system is provided with data that can be stored on a memory 5101. Data may be obtained from a sensor or may be provided from a data source. Data may be provided on an input 5106. The processor is also provided or programmed with an instruction set or program executing the methods of the present invention is stored on a memory 5102 and is provided to the processor 5103, which executes the instructions of 5102 to process the data from 5101. Data, such as an image or any other signal resulting from the processor can be outputted on an output device 5104, which may be a display to display data or a loudspeaker to provide an acoustic signal. The processor also has a communication channel 5107 to receive external data from a communication device and to transmit data, for instance to an external device. The system in one embodiment of the present invention has an input device 5105, which may be a keyboard, a mouse, a touch pad or any other device that can generated data to be provided to processor 5103. The processor can be dedicated hardware. However, the processor can also be a CPU or any other computing device that can execute the instructions of 5102. The processor 5103 in some embodiments has integrated or connected to it communication circuitry 5110 with a customized physical interface. A customized interface may be a connector, an antenna, a reader or read/write interface or any other physical interface to transmit and/or receive signals to or from an external device. Accordingly, the system as illustrated in FIG. 39 provides a system for data processing resulting from a sensor or any other data source and is enabled to execute the steps of the methods as provided herein as an aspect of the present invention.

Aspects of the present invention can be advantageously used for and in devices that belong to a controlled community. A controlled community herein means that two devices are instructed, either by locally stored data or from a shared computing device, which cryptographic method to use and how a modified n-state switching function or device is to be determined. Preferably such information is kept confidential between two devices and, if needed, a server. In accordance with an aspect of the present invention, such data is available from a secure server over a secure communication channel. A computing device herein is a device that contains at least one digital device that generates one or more signals in accordance with at least one switching table. The digital device may be but is not limited to a processor, a controller, a memory or storage device such as RAM, DRAM, Flash memory, ROM, PROM, ePROM, disk drive or any other data storage device, combinational circuitry, integrated circuits, FPGA, PLA and the like. Illustrative examples of a computing device include but are not limited to any computer, a desktop computer, a server computer, a blade computer, a processor, a controller, a laptop computer, a tablet computer, a smartphone, a chip card, a smart card, an RFID, a FPGA, a phone, an opening device such as a FOB, a TV set, a media player. A computing device may be a stand-alone device. A computing device may be part of a system wherein the computing device provides and/or receives and/or processes signals such as data signals.

Figure 47:
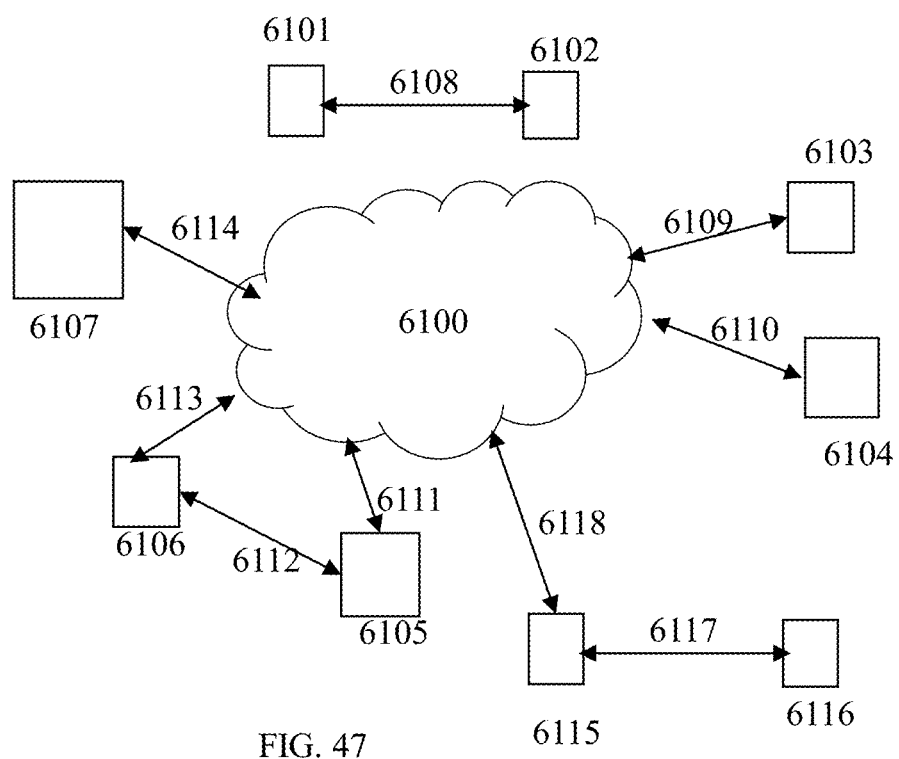
FIG. 47 illustrates network configurations in accordance with various aspects of the present invention.

Several computing device community configurations are illustrated in FIG. 47. FIG. 47 has a communication network

6100. Network 6100 may be a single network such as a wireless or wired network or a combination of networks such as the Internet. The network may be a switched network or a packet based network, a private network or a public network or a virtual private network or any other communication network that enables connection of 2 computing devices and of 3 or more computing devices. In one configuration two computing devices 6101 and 6102 with communication circuitry to transmit, receive or transmit/receive signals are provided. The communication circuitry of 6101 and 6102 can transmit signals over a channel 6108. The channel 6108 is identified as a double arrow. This indicates that the channel is bi-directional, but it does not necessarily mean that 6101 and 6102 do both have to transmit and receive, though they may. For instance 6101 is an opening device or a smartcard or any other transmitting device and 6102 is a computing device that is part of an access mechanism that is being activated by one or more signals from 6101. Device 6101 for instance has cryptographic circuitry that generates opening signals that have to be detected and decrypted by 6102. For that application wherein each device has the appropriate instructions and data stored to complete an authenticated transaction, like opening. In one embodiment of the present invention there is thus only one way transmission by 6101 and receiving of data by 6102. The channel is a direct channel, like a wireless or wired or Near Field Communication (NFC) channel, a USB connection, a Bluetooth connection or any other direct connection. For the transaction itself no other channel is required. The devices 6101 and 6102 may have other communication capabilities, such as equipment to connect to network 6100, but are not shown. Devices 6101 and 6102 have different modified n-state switching functions stored on local memory. These may be updated from time to time.

Devices 6101 and 6102 may also perform some mutual authentication or for instance key exchange. In that case 6108 is a dual use (send and receive) channel and the devices 6101 and 6102 both have send a receive equipment. The same applies to devices 6103, 6104, 6105, 6106, 6107 and 6115 and 6116 and communication channels 6109, 6110, 6117, 6118, 6111, 6112, 6113 and 6114.

Computing devices 6103 and 6104 communicate with each other via channels 6108 and 6110 via network 6100. Cryptographic n-state switching functions may be stored locally and may be provided by secure server 6107 which is connected to network 6100 via channel 6114.

Device 6115 and 6116 communicate directly via a channel 6117. Device 6115 is also able to communicate with secure server 6107 via channel 6114. Devices 6105 and 6106 can directly communicate with each other over channel 6112 and with server 6107 via 6100 over channels 6111 and 6113, respectively. As needed 6105 and 6106 can also communicate via 6111 and 6113 via network 6100. Any of the communication channels, even though illustrated by double sided arrows may be single direction as dictated by practical circumstances.

For instance devices 6115 and 6116 communicate directly via 6112 to complete a transaction, such as withdrawing money from an ATM 6115 machine with a smartcard 6116 and 6115 uses 6118 for verification from 6107 via network 6100. Assume 6116 to be a chipcard or smartcard which is connected to 6115. During an established connection 6116 can be updated with additional or replacement modified n-state switching functions.

Computing devices can be mobile or fixed. For instance 6103 and 6104 are two computing devices that are connected to the Internet, for instance 6103 is a computer, such as a PC, a smartphone, a tablet and 6104 for placing an order and 6104 is a server for processing the order. For instance 6103 is a computing device which may be a server, a PC, a smartphone, a tablet and the like to monitor and/or control an IoT (Internet of Things) device 6104 with a processor such as a camera, a medical device, a security device such as a lock or fire monitor, a thermostat, an appliance, a vehicle or any other IoT device.

Many transactions between computing devices are unique and ephemeral and require one time protection, access, authentication. It is in many cases bad security practice to re-use all the same security parameters. The use of different modified n-state switching tables conforms nicely with security requirements and prevents or at least minimizes the use of dictionary tables and rainbow tables. In accordance with an aspect of the present invention two devices apply not only different modified n-state switching tables but also different cryptographic methods. For instance two devices are configured with at least 2 different hashing methods, for instance at least SHA-3 and MD5. Condition based, the devices select one of the pre-programmed hashing methods and apply modifications as provided herein. This makes cryptanalysis much more difficult. In accordance with an aspect of the present invention the message digest that is generated is padded that makes it hard to determine from size alone which method was used.

In other cases, such as in exchange or storage of information, it is important to protect confidentiality of information. The use of different encryption methods, such as at least 2 different methods, such as AES and 3DES, each method being modified as provided herein makes cryptanalysis much more difficult.

Illustrated examples have been provided using Matlab to describe devices. A processor programmed with instructions and that receives signals on an input and generates signals represented data on an output is a device. Matlab is a convenient way to describe the device. Matlab is a script that is interpreted or compiled into executable code that together with a hard coded instruction set on the processor forms a dedicated computing machine that is a customized, usually electronic, switching machine or structure. Other switching mechanisms are known and include optical switching and quantum-mechanical switching devices.

Matlab programs have been provided herein as illustrated examples and with results generated by a computer running Matlab. The Matlab programs were run under Matlab 7.1 on a Dell Inspiron 660 with Intel® Core™ i3-3240 CPU @3.40 GHz with 8 GB memory and a 64-bit Operating System under Windows 7 Home Premium.

In accordance with an aspect of the present invention, the Lab-transform creates one or more n-state switching table that are realized in a device and that is characterized by properties as discussed above earlier, including but not limited to being at least one of: reversible, self-reversing, associative, commutative, distributive, having a multiplicative inverse, having an additive inverse, having a multiplicative inverse that is not represented by a binary word representing state 1, having a multiplicative zero-element that is not represented by a binary word representing state 0, having an additive zero element that is not represented by a binary word representing state 0, with n being a prime number, with $n=2^q$, with $n=p^q$ with p being prime. As a further requirement, the Lab-transformed n-state table that characterizes the device was not known prior to the earliest priority date of the filing of the instant disclosure or the cases it claims the benefit of An n-state two input/single output switching device that is characterized by a reversible Labtransform that applies an n-state inverter wherein an n-state symbol 0 is not inverted to n-state symbol 0 is called herein an n-state zero Lab-transformed switching device. An n-state two input/single output switching device that is characterized by a reversible Lab-transform that applies an n-state inverter wherein an n-state symbol 1 is not inverted to n-state symbol 1 is called herein an n-state one Lab-transformed switching device. An n-state two input/single output switching device that is characterized by a reversible Lab-transform that applies an n-state inverter wherein an n-state symbol 0 is not inverted to n-state symbol 0 and an n-state symbol 1 is not inverted to n-state symbol 1 is called herein an n-state zero-one Lab-transformed switching device.

A Lab-transformed device is characterized by a Lab-transformed n-state switching table. A Lab-transformed n-state switching table herein is a Lab-transform of an n-state switching table with n>2 of an n-state switching operation characterized by an operation in a multiplicative or additive group or an n-state operation in a finite field, wherein a zero element is represented by 0 and a one element is represented by 1 and wherein at least 2 rows in the Lab-transformed n-state switching operation are different from corresponding rows in the n-state switching table that has been Lab-transformed, unless explicitly stated differently. A zero Lab-transformed n-state switching device is characterized by an n-state switching table wherein at least the zero element is not represented by 0. A one Lab-transformed n-state switching device is characterized by an n-state switching table wherein at least the one element is not represented by 1. A zero-one Lab-transformed n-state switching device is characterized by an n-state switching table wherein at least the zero element is not represented by 0 and the one element is not represented by 1. A k-row Lab-transformed n-state switching device is characterized by an n-state switching table wherein at least k rows in the Lab-transformed n-state switching operation are different from corresponding rows in the n-state switching table that has been Lab-transformed, with k preferably being 2, more preferably being 7, even more preferably being 127 and most preferably being greater than 256.

In accordance with an aspect of the present invention, the device characterized by the Lab-transformed switching table is used in a cryptographic device that applies an n-state switching operation that is characterized as at least one of: an addition over at least an additive group, an addition over a finite field, a multiplicative operation over at least a multiplicative group, a multiplicative operation over a finite field, a reversible commutative non-associative operation, an addition over an elliptic curve, a consecutive n-state multiplication.

In accordance with an aspect of the present invention, the device characterized by a Lab-transformed switching table is used in a cryptographic device operated completely or substantially in accordance with a published standard. Substantially in this requirement means that one of ordinary skill in cryptography recognizes that over 50% of operating steps comply with a cryptographic standard. Standards include but are not limited to the following published standards or updated versions thereof: SP 800-67, Revision 1, Recommendation for the Triple Data Encryption Algorithm (TDEA) Block Cipher, 2012; FIPS PUB 46-3 Data Encryption Standard (DES), FIPS PUB 180-4 Secure Hash Standard (SHS) 2015 defines the SHA family; FIPS PUB 186-4 Digital Signature Standard (DSS) 2015; FIPS PUB 202 SHA-3 Standard: Permutation-Based Hash and Extendable-Output Functions, 2015; FIPS PUB 198-1, The Keyed-Hash Message Authentication Code (HMAC), 2008; FIPS PUB 197- Advanced Encryption Standard, (AES), 2001; RSA Laboratories PKCS #1 v2.2: RSA Cryptography Standard, Oct. 27, 2012; RSA Laboratories PKCS#3: Diffie-Hellman Key Agreement Standard Revised Nov. 1, 1993; The Elliptic Curve Digital Signature Algorithm (ECDSA), Johnson et al. 2001, Certicom Corporation 2001; Standards For Efficient Cryptography SEC 1: Elliptic Curve Cryptography, version 2, Certicom Research, 2009; OpenPGP Message Format, Memo, Callas et al., 2007, RFC4880, downloaded from https://tools.ietf.org/html/rfc4880; which are all incorporated herein by reference.

The Lab-transform as provided herein modifies existing cryptographic methods and apparatus and/or provides novel cryptographic methods and apparatus. It is believed that underlying approaches of cryptography are known to one of ordinary skill and well documented in technical literature and standards. One book that describes basic symmetric and asymmetric cryptographic approaches is Understanding Cryptography, by Paar et al., Springer-Verlag, Berlin 2010, which is incorporated herein by reference.

The devices, switching tables and methods related to the Lab-transform can be applied in different fields, including Reed-Solomon error correcting coding, convolutional error correcting coding and n-state Low Density Parity codes for instance, and other applications that apply switching tables characterized by polynomial arithmetic. This wide range of applications is excluded from embodiments of the present invention unless specifically included.

A Lab-transformed n-state switching table has a similar meaning as a binary switching table (such as XOR, AND, NAND, etc.) or of a Karnaugh switching table or map which are realized in a circuit that is a memory circuit, a combinational circuit or any other circuit that processes signals. Relationship between realization of digital devices (realization) and functional description of these devices (implementation) is explained in Digital System Implementation by Gerrit A. Blaauw, Prentice Hall, Englewood Cliffs, N.J., 1973 which is incorporated herein by reference.

The terms "2-input/output" and "2-input/single output" are used herein. This indicates a minimum configuration wherein a device has at least 2 inputs and one output and is characterized at least by an n by n matrix wherein one index (for instance row index) represents a state of first input and another index (for instance column index) represents a state of a second input and a content of the matrix defined by the two indices defines a state of the output.

Cryptography devices are used at signal transmitting and signal receiving devices. In certain cases the transmitting devices perform encryption and the receiving devices perform decryption. In other cases both side devices perform the same operation such as hashing of a message. In other cases transmitting and receiving devices perform complementary operations, such as in some public key operations. The herein provided embodiments expressly include a transmitting side cryptographic device and a receiving side cryptographic side.

The following patent applications, including the specifications, claims and drawings, are hereby incorporated by reference herein, as if they were fully set forth herein: (1) U.S. Non-Provisional patent application Ser. No. 10/935, 960, filed on Sep. 8, 2004, (2) U.S. Non-Provisional patent application Ser. No. 10/936,181, filed Sep. 8, 2004, (3) U.S. Non-Provisional patent application Ser. No. 10/912,954, filed Aug. 6, 2004, (4) U.S. Non-Provisional patent application Ser. No. 11/000,218, filed Nov. 30, 2004, (5) U.S. Non-Provisional patent application Ser. No. 11/139,835 filed May 27, 2005, (6) U.S. Non-Provisional patent application Ser. No. 12/137,945 filed on Jun. 12, 2008; (7) U.S. Non-Provisional patent application Ser. No. 11/679,316, filed on Feb. 27, 2007; (8) U.S. Non-Provisional patent application Ser. No. 11/964,507 filed on Dec. 26, 2007; (9) U.S. Non-Provisional patent application Ser. No. 12/273,262, filed on Nov. 18, 2008.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention.

The invention claimed is:

1. A cryptographic apparatus to modify one or more signals into one or more cryptographic signals in a message transmitted to a receiving device, comprising:
   an input of the cryptographic apparatus to receive the one or more signals;
   an n-state Lab-transformed switching circuit with n>2 containing an n-state switching circuit with a first n-state reversible inverter at a first and at a second input and with at an output a second n-state inverter, wherein the first and second n-state reversible inverters in combination establish identity wherein an n-state signal is modified by the first n-state inverter into a modified n-state signal and the second n-state inverter has a structure that modifies the modified n-state signal into the n-state-signal and wherein the first n-state inverter is one of n! (factorial n) n-state inverters, the n-state Lab-transformed switching circuit being characterized by a modification of an n-state switching table that characterizes the n-state switching circuit and the n-state Lab-transformed switching circuit is enabled to process signals related to the one or more signals; and
   an output of the cryptographic apparatus to provide on a communication channel to the receiving device the one or more cryptographic signals that are based on one or more signals processed by the n-state Lab-transformed switching circuit, wherein cryptographic signals generated from a first set of n-state input signals by the cryptographic apparatus with the n-state switching circuit without applying the first and second inverters are different from cryptographic signals generated from the first set of n-state input signals by the cryptographic apparatus applying the n-state Lab-transformed switching circuit; and
   wherein the n-state switching circuit is characterized by one of: an addition over a finite field GF(n), a multiplication over a finite field GF(n), and a multiplication modulo-n and the n-state Lab-transformed switching circuit is part of the cryptographic apparatus to perform one of: an Advanced Encryption Standard encryption or decryption, a Rivest-Shamir-Adleman (RSA) based encryption or decryption, a Diffie-Hellman based key generation, an Elliptic Curve Cryptography (ECC) operation, a message digest generation as defined in a Federal Information Processing Standards Secure Hash Standard (SHS).

2. The cryptographic apparatus of claim 1, wherein the n-state switching device is characterized by a modulo-n multiplication.

3. The cryptographic apparatus of claim 1, wherein the n-state switching device is characterized by a multiplication over a finite field GF(n).

4. The cryptographic apparatus of claim 1, wherein the n-state switching device is characterized by an addition over a finite field GF(n).

5. The cryptographic apparatus of claim 1, wherein the n-state switching device is characterized by a modulo-n addition.

6. The cryptographic apparatus of claim 1, wherein the n-state switching device is characterized by a two input operation characterized by an expression $\mod((i1+i2-1),n)+(((i1+i2-1)>=n)*1)$, wherein mod means modulo, i1 indicates a state of a first input and i2 indicates a state of a second input.

7. The cryptographic apparatus of claim 1, wherein the n-state switching device is characterized by a two input operation characterized by an expression $(e-i1-i2) \mod-n$, wherein mod means modulo, i1 indicates a state of a first input and i2 indicates a state of a second input and e is an offset.

8. The cryptographic apparatus of claim 1, wherein the cryptographic apparatus performs a symmetric encryption or a symmetric decryption operation.

9. The cryptographic apparatus of claim 8, wherein the cryptographic apparatus performs substantially a Lab-transformed Advanced Encryption Standard (AES) operation.

10. The cryptographic apparatus of claim 1, wherein the cryptographic apparatus performs a public-key cryptography operation.

11. The cryptographic apparatus of claim 1, wherein the cryptographic apparatus performs a hashing or message digest operation.

12. The cryptographic apparatus of claim 1, wherein the cryptographic apparatus performs an elliptic curve cryptography operation.

13. The cryptographic apparatus of claim 1, wherein the cryptographic apparatus performs an authentication operation.

14. The cryptographic apparatus of claim 1, wherein the n-state switching device is characterized by an addition or a multiplication over a Finite Field $GF(n=p^k)$ with p a prime number greater than 1 and k an integer greater than 1 and the n-state Lab-transformed circuit is characterized by an n-state switching table that has a zero-element that is different from the n-state switching table that characterizes the n-state switching circuit.

15. The cryptographic apparatus of claim 1, wherein the n-state switching device is characterized by a multiplication over a Finite Field $GF(n=p^k)$ with p a prime number greater than 1 and k an integer greater than 1 and the n-state Lab-transformed circuit is characterized by an n-state switching table that has a different one-element than the n-state switching table that characterizes the n-state switching circuit.

16. The cryptographic apparatus of claim 1, wherein the cryptographic apparatus is part of the group consisting of a desktop computer, a server computer, a blade computer, a processor, a controller, a laptop computer, a tablet computer, a smartphone, a chip card, a smart card, an RFID, a FPGA, a phone, an opening device, a FOB, a TV set, and a media player.

17. A method for cryptographic communications of one or more cryptographic signals based on one or more signals between a first computer device and a second computer device over a communication channel, comprising:
   receiving on an input of the first computer device the one or more signals;
   generating signals based on the one or more signals by an n-state Lab-transformed switching circuit with n>2, the n-state Lab-transformed switching circuit containing an n-state switching circuit with a first n-state reversible inverter at a first and a second input and with at an output a second n-state inverter that in combination with the first n-state reversible inverter establish identity wherein an n-state signal is modified by the first n-state inverter into a modified n-state signal and the second n-state inverter has a structure that modifies the modified n-state signal into the n-state-signal and wherein the first n-state inverter is one of n! (factorial n) n-state inverters, the n-state Lab-transformed switching circuit being characterized by a modification of an n-state switching table that characterizes the n-state switching function; and providing by the first computer device to the second computing device over the communication channel the one or more cryptographic signals that are based on the signals generated by the n-state Lab-transformed circuit, wherein cryptographic signals generated from a first set of signals by the first computer with the n-state switching device without the first and second inverters are different from cryptographic signals generated from the first set of signals by the first computer with the n-state Lab-transformed circuit; and wherein the n-state switching circuit is characterized by one of: an addition over a finite field GF(n), a multiplication over a finite field GF(n), and a multiplication modulo-n and the n-state Lab-transformed switching circuit is part of the cryptographic apparatus to perform one of: an Advanced Encryption Standard encryption or decryption, a Rivest-Shamir-Adleman (RSA) based encryption or decryption, a Diffie-Hellman based key generation, an Elliptic Curve Cryptography (ECC) operation, a message digest generation as defined in a Federal Information Processing Standards Secure Hash Standard (SHS).

18. The method of claim 17, wherein the n-state Lab-transformed circuit is characterized by an operation selected from the group consisting of: an n-state zero Lab-transformed switching device, an n-state one Lab-transformed switching device, an n-state zero-one Lab-transformed switching device and an n-state k-row Lab-transformed switching device.

19. The method of claim 17, wherein the n-state switching circuit is characterized by an n-state operation from the group of n-state operations consisting of: a modulo-n multiplication, a modulo-n addition, an addition over a finite field GF(n), an addition over a finite field GF($n=2^p$ and p>1), a multiplication over a finite field GF(n), a multiplication over a finite field GF($n=2^p$ and p>1), an operation defined by an expression mod((i1+i2−1),n)+(((i1+i2−1)>=n)*1), wherein mod means modulo, i1 indicates a state of a first input and i2 indicates a state of a second input; an operation defined by an expression (e-i1-i2)mod-n, wherein mod means modulo, i1 indicates a state of a first input and i2 indicates a state of a second input and e is an offset, and an operation characterized by k bitwise XOR operations.

20. The method of claim 17, wherein the method is part of a cryptographic operation selected from the group consisting of: an encryption, a decryption, a hashing or message digest operation, a public-key cryptographic operation, an elliptic curve cryptography operation, an authentication operation and a digital signature operation.

* * * * *